(12) United States Patent
Carter et al.

(10) Patent No.: US 8,399,684 B2
(45) Date of Patent: Mar. 19, 2013

(54) SULFONAMIDE-BASED ORGANOCATALYSTS AND METHOD FOR THEIR USE

(75) Inventors: Rich Garrett Carter, Corvallis, OR (US); Hua Yang, Corvallis, OR (US)

(73) Assignee: State of Oregon acting by and through the State Board of Higher Education on behalf of Oregon State University, Corvallis, OR (US)

( * ) Notice: Subject to any disclaimer, the term of this patent is extended or adjusted under 35 U.S.C. 154(b) by 221 days.

(21) Appl. No.: 12/726,212

(22) Filed: Mar. 17, 2010

(65) Prior Publication Data

US 2010/0184986 A1      Jul. 22, 2010

Related U.S. Application Data

(63) Continuation-in-part of application No. PCT/US2008/076688, filed on Sep. 17, 2008.

(60) Provisional application No. 60/994,199, filed on Sep. 17, 2007.

(51) Int. Cl.
C07D 207/09 (2006.01)
C07D 209/14 (2006.01)
C07C 311/50 (2006.01)

(52) U.S. Cl. ............................ 548/495; 548/537; 564/91

(58) Field of Classification Search ........................ None
See application file for complete search history.

(56) References Cited

FOREIGN PATENT DOCUMENTS

EP          0 099 709         2/1984
JP       2001249435 A   *    9/2001
WO     WO 02/10101 A1       2/2002

OTHER PUBLICATIONS

Wang, et al. Org. Lett., 9:1343 (Mar. 10, 2007).*
Machine translation of WO/0210101 (Feb. 7, 2002) claims and description (publicly available from JPO website).*
Wu, et al., Organic Letters, 8:4417 (Sep. 2, 2006).*
Bastero et al., "Catalytic Ethylene Polymerisation in Carbon Dioxide as a Reaction Medium with Soluble Nickel (II) Catalysts," *Chemistry—A European Journal* 12:6110-6116, 2006.
Baumann et al., "The Proline-Catalyzed Asymmetric Amination of Branched Aldehydes," *European Journal of Organic Chemistry* pp. 266-282, 2007.
Behera et al., "Dye-surfactant interaction: solubilization of styryl pyridinium dyes of varying alkyl chain in alfa-olefinic sulfonate and linear alkyl benzene sulfonate solutions," *Journal of Photochemistry and Photobiology A: Chemistry* 169:253-260, 2005.
Berkessel et al., "Proline-Derived N-Sulfonylcarboxamides: Available, Highly Enantioselective and Versatile Catalysts for Direct Aldol Reactions," *Adv. Synth. Catal.* 346:1141-1146, 2004.
Binisti et al., "Structure-activity relationship in platelet-activating factor (PAF), 11-Form PAF-antagonism to phospholipase $A_2$ inhibition: syntheses and structure—activity relationship in 1-arylsulfamido-2-alkylpiperazines," *European Journal of Medicinal Chemistry* 36:809-828, 2001.
Buckel et al., "Synthesis of Functionalized Long-Chain Thiols and Thiophenols for the Formation of Self-Assembled Monolayers of Gold," *Synthesis* 6:953-958, 1999.
Cobb et al., "Organocatalysis with prline derivatives: improved catalysts for the asymmetric Mannich, nitro-Michael and aldol reactions," *Org. Biomol. Chem.* 3:84-96, 2005.
Corrie et al., "Synthesis and evaluation of photolabile sulfonamides as potential reactions for rapid photorelease of neuroactive amines," *J. Chem. Soc., Perkin Trans. 1*, pp. 1583-1593, 1996.
Darses et al., "Efficient Access to Perfluoroalkylate Aryl Compounds by Heck Reaction," *Eur. J. Org. Chem.*, pp. 1121-1128, 2001.
Hartwig, "Evolution of a Fourth Generation Catalyst for the Amination and Thioetherification of Aryl Halides," *Acc. Chem. Res.* 41(11):1534-1562, Nov. 18, 2008.
Holfter et al., "Insertion of $\gamma$-$SO_3$ into Perfluoroalkyl- and Polyfluoroalkoxysilanes," *Inorganic Chemistry* 33(26):6369-6372, 1994.
Hyde et al., "Palladium-Catalyzed $\gamma$-Arylation of $\beta,\gamma$-Unsaturated Ketones: Application to a One-Pot Synthesis of Tricyclic Indolines," *Angew. Chem. Int. Ed.* 47:177-180, 2008.
Lapinte et al., "Surface initiated ring-opening metathesis polymerization of norbornene onto Wang and Merrifield resins," *Journal of Molecular Catalysis* 276:219-225, 2007.

(Continued)

*Primary Examiner* — Michael Barker
(74) *Attorney, Agent, or Firm* — Klarquist Sparkman, LLP

(57) ABSTRACT

Organocatalysts, particularly proline sulfonamide organocatalysts, having a first general formula as follows are disclosed.

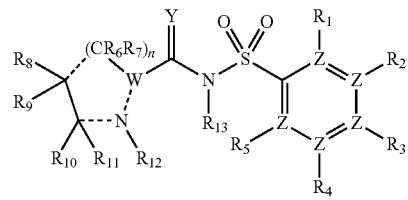

Embodiments of a method for using these organocatalysts also are disclosed. The method comprises providing a disclosed organocatalyst, and performing a reaction, often an enantioselective or diastereoselective reaction, using the organocatalyst. Solely by way of example, disclosed catalysts can be used to perform aldol reactions, conjugate additions, Michael additions, Robinson annulations, Mannich reactions, $\alpha$-aminooxylations, $\alpha$-hydroxyaminations, $\alpha$-aminations and alkylation reactions. Certain of such reactions are intramolecular cyclizations used to form cyclic compounds, such as 5-or 6-membered rings, having one or more chiral centers Disclosed organocatalysts generally are much more soluble in typical solvents used for organic synthesis than are known compounds. Moreover, the reaction yield is generally quite good with disclosed compounds, as is their enantioselective and diastereoselective effectiveness.

19 Claims, No Drawings

OTHER PUBLICATIONS

Longbottom et al., "Practical Organocatalysis with (S)- and (R)-5-Pyrrolidin-2-yl-1H-tetrazoles," *Aldrichimica Acta* 41(1):3-11, 2008.

McLoughlin et al., "A Route to Fluoroalkyl-Substituted Aromatic Compounds Involving Fluoroalkylcopper Intermediates," *Tetrahedron* 25:5921-5940, 1969.

Milburn et al., "*ortho*-Anisylsulfonyl as a Protecting Group for Secondary Amines: Mild $Ni^0$-Catalyzed Hydrodesulfonylation," *Angew. Chem. Int. Ed.* 43:92-894, 2004.

Paciorek et al., "Perfluoroalkylbenzenesulfonyl Chlorides, Perfluoroalkylnaphtha-lenesulfonyl Chlorides, and Their Metal Salts," *Journal of Fluorine Chemistry* 53:355-367, 1991.

Sawada et al., "Trifluoromethylation of Aromatic Compounds with Bis(trifluoroacetyl) Peroxide," *Journal of Fluorine Chemistry* 46:423-431, 1990.

Sundén et al., "Novel organic catalysts for the direct enantioselective α-oxidation of carbonyl compounds," *Tetrahedron Letters* 46:3385-3389, 2005.

Surry et al., "Biaryl Phosphane Ligands in Palladium-Catalyzed Amination," *Angew. Chem. Int. Ed.* 47:6338-6361, 2008.

Voronkov et al., "Bis(trimethylsilyl) Sulfate as an Organosilicon Synthon," *Synthesis* 1982(4):277-280, 1982.

Yang et al., "Enantioselective Total Synthesis of Lycopodine," *Journal of the American Chemical Society* 130(29):9238-9239, 2008.

Yang et al., "*N*-(*p*-Dodecylphenylsulfonyl)-2-pyrrolidinecarboxamide: A Practical Proline Mimetic for Facilitating Enantioselective Aldol Reactions," *Organic Letters* 10(20):4649-4652, 2008.

Yang et al., "Enantioselective Mannich Reactions with the Practical Proline Mimetic *N*-(*p*-Dodecylphenylsulfonyl)-2-pyrrolidinecarboxamide," *Journal of Organic Chemistry* 74(5):2246-2249, 2009.

Yang et al., "Asymmetric Construction of Nitrogen-Containing [2.2.2] Bicyclic Scaffolds Using *N*-(*p*-Dodecylphenylsulfonyl)-2-pyrrolidinecarboxamide," *Journal of Organic Chemistry* 74(15):5151-5156, 2009.

\* cited by examiner

SULFONAMIDE-BASED ORGANOCATALYSTS AND METHOD FOR THEIR USE

CROSS REFERENCE TO RELATED APPLICATION

This is a continuation-in-part of international application No. PCT/US2008/076688 filed Sep. 17, 2008, which claimed the benefit of the earlier filing date of U.S. provisional application No. 60/994,199 filed Sep. 17, 2007, both of which applications are incorporated herein by reference in their entirety.

ACKNOWLEDGMENT OF GOVERNMENT SUPPORT

This invention was made with government support under grant No. GM63723 awarded by National Institutes of Health. The government has certain rights in the invention.

FIELD

The present disclosure concerns a novel organocatalyst, more particularly a proline mimetic organocatalyst, that is particularly useful for facilitating asymmetric syntheses, particularly enantioselective and diastereoselective reactions.

BACKGROUND

Since the early days of enantioselective Robinson annulations facilitated by proline, organocatalysis has garnered the attention of the synthetic community. Organocatalysis typically employs mild conditions, are relatively easy to execute, and can be used for a wide variety of chemical transformations. Much of the key reactivity in organocatalysis concerns activating carbonyl moieties via formation of a chiral iminium ion, which resembles nature's method for forming alkaloid natural products. Despite this similarity, relatively little attention has been focused on the application of organocatalysis to alkaloid synthesis. Furthermore, while an intramolecular conjugate addition is often a key ring forming strategy in the synthesis of polycyclic natural products, only limited examples of organocatalyzed, intramolecular Michael addition have been reported.

Certain proline sulfonamides are known. For example, the following proline sulfonamides have been disclosed in the literature.

Proline and Select Proline Mimetics

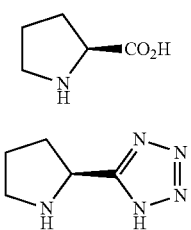

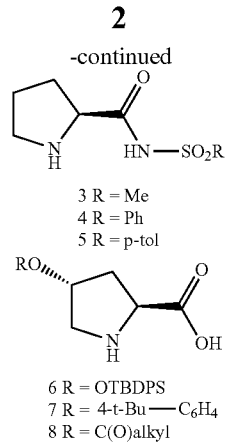

The solubility for compounds 1-5 is quite poor (<5 mg/mL of dichloromethane). These poor solubilities substantially limit the usefulness of such compounds both for research purposes, and more importantly for catalytic reactions used to make commercial chemicals. Compounds 6-8 are substantially more expensive to make and use than are catalyst embodiments disclosed in the present application. Furthermore, only one enantiomer is available for making each of compounds 6-8.

SUMMARY

Accordingly, new organocatalysts are needed to supplement such known compounds, and which improve on both there usefulness, particularly for commercial applications, and effectiveness, particularly for performing enantioselective or diastereoselective reactions. Thus, certain embodiments of the present invention concern catalysts, typically organocatalysts, particularly proline sulfonamide organocatalysts, having a first general formula as follows.

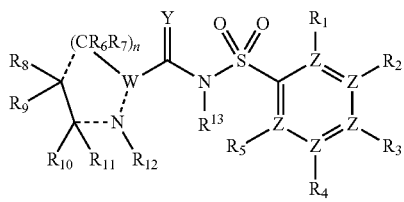

With reference to this first general formula, $R_1$-$R_5$ are independently selected from aliphatic, substituted aliphatic, alkoxy, substituted alkoxy, amine, substituted amine, amide, substituted amide, aryl, substituted aryl, aryl alkyl, substituted aryl alkyl, cyclic, substituted cyclic, ester, ether, formyl, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, polymer support, such as a polymer-bound ester or are bonded together to form a ring, at least one of such substituents preferably comprises 4 or more carbon atoms, at least one of $R_1$ and $R_5$ preferably is hydrogen or halogen, and if $R_1$-$R_5$ is aryl, the aryl group is directly bonded to one of $R_1$-$R_5$ and the compound is other than (S)—N-(1-napthylsulfonyl)-2-pyrrolidinecarboxamide. $R_6$-$R_{11}$ independently are selected from aliphatic, substituted aliphatic, alkoxy, substituted alkoxy, amine, substituted amine, amide, substituted amide, aryl, substituted aryl, aryl alkyl, substituted aryl alkyl, azide, cyclic, substituted cyclic, ester, ether, formyl, halogen, heterocyclic, substituted heterocyclic, heteroaryl, substituted heteroaryl, pyrrolidine, hydrogen, hydroxyl, ketone, substituted ketone, nitro, nitroso, protecting groups, silyl, silyl ether, silyl ester, thiol, thiol ether, thiol ester, or are bonded together to form a ring. $R_{12}$-$R_{13}$ are independently selected from hydrogen and lower alkyl, particularly hydrogen. Y is nitrogen, oxygen, or sulfur. W is nitrogen or $CR_{14}$ where $R_{14}$ typically is hydrogen or aliphatic. If W is nitrogen then it typically is bonded to the carbon atom bearing $C_6$-$C_7$. The subscript n is 0-2 atoms, and if n=0 W is bonded to the carbon bearing $R_8$ and $R_9$. If W is not bonded to the nitrogen bearing $R_{12}$, then at least one additional hydrogen atom is bonded to W and the nitrogen bearing $R_{12}$. Z is carbon, nitrogen or phosphorous, and if Z is nitrogen or phosphorous, then $R_1$-$R_5$ may or may not be bound thereto.

Certain embodiments of the present invention concern catalysts having a second general formula as follows.

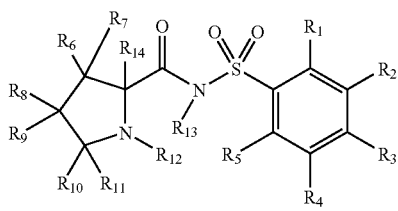

With reference to this second general formula, $R_1$-$R_5$ are independently selected from aliphatic, substituted aliphatic, alkoxy, substituted alkoxy, amine, substituted amine, amide, substituted amide, aryl, substituted aryl, aryl alkyl, substituted aryl alkyl, cyclic, substituted cyclic, ester, ether, formyl, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, polymer-bound support, such as a polymer-bound ester, or are bonded together to form a ring. At least one of $R_1$ and $R_5$ preferably is hydrogen or halogen. At least one of the $R_1$-$R_5$ substituents typically comprises 4 or more carbon atoms, generally carbon atoms in an aliphatic chain. This contributes substantially to the organic solvent solubility of such compounds, and provides a substantial benefit relative to known compounds. This is evidenced by the generally increased reactivity and enantioselectivity of disclosed embodiments of the organocatalyst. If $R_1$-$R_5$ is aryl, the aryl group is directly bonded to one of $R_1$-$R_5$ and the compound is other than (S)—N-(1-napthylsulfonyl)-2-pyrrolidinecarboxamide, a known compound. More typically, $R_1$-$R_5$ are independently selected from aliphatic groups having 4 or more carbon atoms, hydrogen or halogen, including chlorine, fluorine, bromine and iodine. The aliphatic group also can be halogenated. Fluorinated compounds do provide some known benefits relative to the other halogens. For example, such compounds generally are easier to purify and recover the catalyst using, for example, chromatography.

In certain embodiments, one of $R_2$-$R_4$ is aliphatic or substituted aliphatic, often alkyl, having 4 or more carbon atoms, and most typically having a chain length of from 4 to 24 carbon atoms. Again, for these embodiments, at least one of $R_1$-$R_2$ and $R_4$-$R_5$ typically is a hydrogen or halogen, and at least one of $R_2$-$R_4$ also may be a halogenated alkyl, such as a fluorinated alkyl.

$R_6$-$R_{11}$ independently are selected from aliphatic, substituted aliphatic, alkoxy, substituted alkoxy, amine, substituted amine, amide, substituted amide, aryl, substituted aryl, aryl alkyl, substituted aryl alkyl, azides, cyclic, substituted cyclic, ester, halogen, heterocyclic, substituted heterocyclic, heteroaryl, substituted heteroaryl, hydrogen, hydroxyl, ketone, substituted ketone, nitro, nitroso, protecting groups, thiol, thiol ether, thiol ester, silyl, silyl ether, silyl ester, or are bonded together to form a ring. For certain disclosed embodiments, $R_6$-$R_{11}$ are independently selected from aliphatic, carbonyl, ether, hydrogen, hydroxyl, nitro, nitroso, or are atoms in an aryl, heteroaryl, cyclic, or heterocyclic ring, and even more typically are independently selected from hydrogen, lower alkyl, hydroxyl, nitro, nitrso, ether, carbonyl, cyclohexyl or phenyl.

$R_{12}$ and $R_{13}$ are independently selected from aliphatic, most typically alkyl, and hydrogen. Without being bound to a theory of operation, but based on current mechanistic understanding, it is preferable that $R_{12}$ and $R_{13}$ are both hydrogen.

A person of ordinary skill in the art will appreciate that the first and second general formulas are stereoambiguous. That is, these formulas do not indicate the relative or absolute stereochemistry of the potential stereoisomers. This is to indicate that all such stereoisomers are within the scope of the disclosed organocatalysts. Particular stereoisomers are more likely to be used than others, based on certain criteria, such as commercial availability of starting materials, or effectiveness as a catalyst. For example, certain disclosed catalysts have a formula

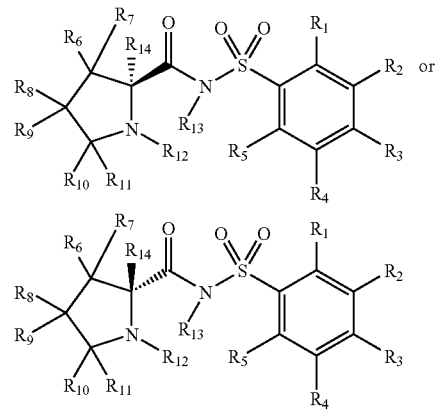

where the substituents are as stated above.

Embodiments of a method for using disclosed catalysts also are disclosed. The method comprises providing a disclosed catalyst, and performing a reaction, often an enantioselective or diastereoselective reaction, using the catalyst. A person of ordinary skill in the art will appreciate that a wide variety of different reactions can be performed using such catalysts. However, solely by way of example, disclosed catalysts can be used to perform aldol reactions, conjugate additions, such as Michael additions, Robinson annulations, Mannich reactions, α-aminooxylations, α-hydroxyaminations, α-aminations and alkylation reactions. Certain of such reactions are intramolecular cyclizations used to form cyclic compounds, such as 5- or 6-membered rings, having one or more chiral centers.

The effectiveness of disclosed catalysts can be described in several different ways. First, disclosed organocatalysts generally are much more soluble in typical solvents used for organic synthesis than are known compounds. Moreover, the reaction yield is generally quite good with disclosed compounds, and most typically is greater than 50%, and more typically is 60% or greater. The reactions often also are used to produce compounds having new chiral centers. The enantioselective and diastereoselective effectiveness of such catalysts to perform these reactions also is very high. For example, for certain embodiments, the enantioselective reaction provides an enantiomeric excess of at least about 70%, such as greater than 80%, or greater than 90%, and in some cases up to at least 99%. Similarly, the dr typically is greater than 10:1, such as 20:1, often as high as 50:1 and can be as high as 99:1 or greater.

The foregoing and other objects, features, and advantages of the invention will become more apparent from the following detailed description, which proceeds with reference to the accompanying figures.

DETAILED DESCRIPTION

I. Terms

The following term definitions are provided to aid the reader, and should not be considered to provide a definition different from that known by a person of ordinary skill in the art. And, unless otherwise noted, technical terms are used according to conventional usage.

As used herein, the singular terms "a," "an," and "the" include plural referents unless context clearly indicates otherwise. Similarly, the word "or" is intended to include "and" unless the context clearly indicates otherwise. Also, as used herein, the term "comprises" means "includes." Hence "comprising A or B" means including A, B, or A and B. It is further to be understood that all nucleotide sizes or amino acid sizes, and all molecular weight or molecular mass values, given for nucleic acids or polypeptides or other compounds are approximate, and are provided for description.

Aldehyde: Is a carbonyl-bearing functional group having a formula

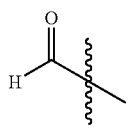

where the line drawn through the bond indicates that the functional group can be attached to any other moiety, but that such moiety simply is not indicated.

Aldol Reaction: A carbon-carbon bond forming reaction that involves the nucleiphilic addition of a ketone enolate to an aldehyde to form a β-hydroxy ketone, or "aldol" (aldehyde+alcohol), a structural unit found in many naturally occurring molecules and pharmaceuticals. Sometimes, the aldol addition product loses water to form an α,β-unsaturated ketone in an aldol condensation.

Aliphatic: A substantially hydrocarbon-based compound, or a radical thereof (e.g., $C_6H_{13}$, for a hexane radical), including alkanes, alkenes, alkynes, including cyclic version thereof, and further including straight- and branched-chain arrangements, and all stereo and position isomers as well.

Amide: An organic functional group characterized by a carbonyl group (C=O) linked to a nitrogen atom and having the following general formula, where R, R' and R" are the same or different, and typically are selected from hydrogen, aliphatic, and aryl.

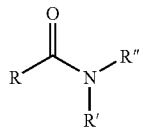

Analog, Derivative or Mimetic: An analog is a molecule that differs in chemical structure from a parent compound, for example a homolog (differing by an increment in the chemical structure, such as a difference in the length of an alkyl chain), a molecular fragment, a structure that differs by one or more functional groups, a change in ionization. Structural analogs are often found using quantitative structure activity relationships (QSAR), with techniques such as those disclosed in Remington (*The Science and Practice of Pharmacology*, 19th Edition (1995), chapter 28). A derivative is a biologically active molecule derived from the base structure. A mimetic is a molecule that mimics the activity of another molecule, such as a biologically active molecule. Biologically active molecules can include chemical structures that mimic the biological activities of a compound.

Aryl: A substantially hydrocarbon-based aromatic compound, or a radical thereof (e.g. $C_6H_5$) as a substituent bonded to another group, particularly other organic groups, having a ring structure as exemplified by benzene, naphthalene, phenanthrene, anthracene, etc.

Arylalkyl: A compound, or a radical thereof ($C_7H_7$ for toluene) as a substituent bonded to another group, particularly other organic groups, containing both aliphatic and aromatic structures.

Carbonyl: Refers to a functional group comprising a carbon-oxygen double bond, where the carbon atom also has two additional bonds to a variety of groups, including hydrogen, aliphatic, such as alkyl, aryl, substituted aryl, heteroaryl, substituted heteroaryl, and the like.

Carboxylic Acid: Refers to a carbonyl-bearing functional group having a formula

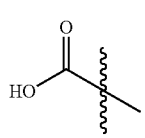

Cyclic: Designates a substantially hydrocarbon, closed-ring compound, or a radical thereof. Cyclic compounds or substituents also can include one or more sites of unsaturation, but does not include aromatic compounds. One example of such a cyclic compound is cyclopentadienone.

Enantiomer: One of two stereoisomers that are not superimposable mirror images.

Enantiomeric Excess: Refers to chemical mixtures where one enantiomer is present more than the other. Enantiomeric excess is defined as the absolute difference between the mole fraction of each enantiomer.

$$ee = |F_+ - F_-|$$

where $$F_+ + F_- = 100\%$$

Enantiomeric excess is most often expressed as a percent enantiomeric excess. Enantiomeric excess is used to indicate the success of an asymmetric synthesis. For mixtures of diastereomers, analogous definitions are used for diastereomeric excess and percent diastereomeric excess. As an example, a sample with 70% of R isomer and 30% of S will have an enantiomeric excess of 40%. This can also be thought of as a mixture of 40% pure R with 60% of a racemic mixture (which contributes 30% R and 30% S to the overall composition). The use of enantiomeric excess has established itself because of its historic ties with optical rotation. These concepts of ee and de may be replaced by enantiomeric ratio or er (S:R) or q (S/R) and diastereomeric ratio (dr).

Ester: A carbonyl-bearing substituent having a formula

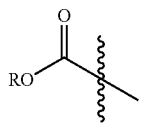

where R is virtually any group, including aliphatic, substituted aliphatic, aryl, arylalkyl, heteroaryl, etc.

Ether: A class of organic compounds containing an ether group, that is an oxygen atom connected to two aliphatic and/or aryl groups, and having a general formula R—O—R', where R and R' may be the same or different.

Halogen: Refers to flourine, chlorine, bromine and iodine.

Heteroaryl: Refers to an aromatic, closed-ring compound, or radical thereof as a substituent bonded to another group, particularly other organic groups, where at least one atom in the ring structure is other than carbon, and typically is oxygen, sulfur and/or nitrogen.

Heterocyclic: Refers to a closed-ring compound, or radical thereof as a substituent bonded to another group, particularly other organic groups, where at least one atom in the ring structure is other than carbon, and typically is oxygen, sulfur and/or nitrogen.

Ketone: A carbonyl-bearing substituent having a formula

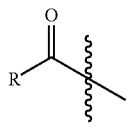

where R is virtually any group, including aliphatic, substituted aliphatic, aryl, arylalkyl, heteroaryl, etc.

Lower: Refers to organic compounds having 10 or fewer carbon atoms in a chain, including all branched and stereochemical variations, particularly including methyl, ethyl, propyl, butyl, pentyl, hexyl, heptyl, octyl, nonyl, and decyl.

Michael addition: Refers generally to addition of a compound containing an electron withdrawing group, Z, which, in the presence of a base, add to olefins of the form C=C—Z, as indicated below.

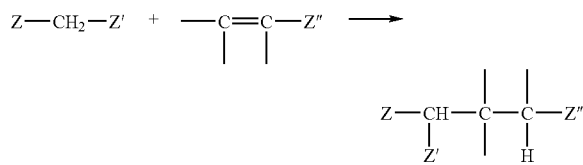

Z can be a variety of groups, including C=C, CHO, COR (including quinones), COOR, CONH$_2$, CN, NO$_2$, SOR SO$_2$R, etc. With reference to addition using a nucleophile Y$^-$, the mechanism is believed to be as follows.

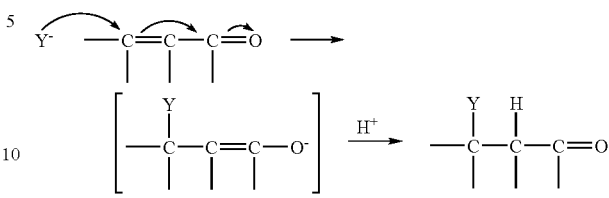

Protecting or Protective Group: To synthesize organic compounds, often some specific functional group cannot survive the required reagents or chemical environments. These groups must be protected. A protecting group, or protective group, is introduced into a molecule by chemical modification of a functional group in order to obtain chemoselectivity in a subsequent chemical reaction. Various exemplary protecting or protective groups are disclosed in Greene's Protective Groups in Organic Synthesis, by Peter G. M. Wuts and Theodora W. Greene (Oct. 30, 2006), which is incorporated herein by reference.

Silyl: A functional group comprising a silicon atom bonded to different functional groups, and typically having a formula

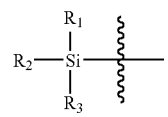

Where $R_1$-$R_3$ independently are selected from various groups, including by way of example aliphatic, substituted aliphatic, cyclic aliphatic, substituted cyclic aliphatic, aryl, substituted aryl, heteroaryl, and substituted heteroaryl.

Substituted: A fundamental compound, such as an aryl or aliphatic compound, or a radical thereof, having coupled thereto, typically in place of a hydrogen atom, a second substituent. For example, substituted aryl compounds or substituents may have an aliphatic group coupled to the closed ring of the aryl base, such as with toluene. Again solely by way of example and without limitation, a long-chain hydrocarbon may have a substituent bonded thereto, such as one or more halogens, an aryl group, a cyclic group, a heteroaryl group or a heterocyclic group.

Although methods and materials similar or equivalent to those described herein can be used in the practice or testing of the present disclosure, suitable methods and materials are described below. In case of conflict, the present specification, including explanations of terms, will control. In addition, the materials, methods, and examples are illustrative only and not intended to be limiting. All publications, patent applications, patents, and other references mentioned herein are incorporated by reference in their entirety, unless the context clearly indicates otherwise.

II. Proline-Based Organocatalysts

The present invention is directed to organocatalysts, particularly proline sulfonamide organocatalysts. Certain embodiments of the present invention concern proline sulfonamide organocatalysts, having a first general formula as follows.

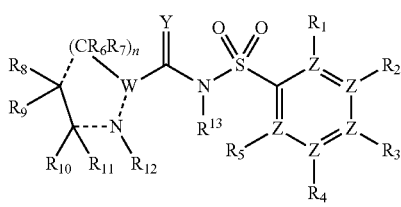

With reference to this first general formula, $R_1$-$R_5$ are independently selected from aliphatic, substituted aliphatic, alkoxy, substituted alkoxy, amine, substituted amine, amide, substituted amide, aryl, substituted aryl, aryl alkyl, substituted aryl alkyl, cyclic, substituted cyclic, ester, ether, formyl, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, polymer support, such as a polymer-bound ester, or are bonded together to form a ring. At least one of such substituents preferably comprises 4 or more carbon atoms. At least one of $R_1$ and $R_5$ preferably is hydrogen or halogen. If $R_1$-$R_5$ is aryl, the aryl group is directly bonded to one of $R_1$-$R_5$ and the compound is other than (S)—N-(1-napthylsulfonyl)-2-pyrrolidinecarboxamide. $R_6$-$R_{11}$ independently are selected from aliphatic, substituted aliphatic, alkoxy, substituted alkoxy, amine, substituted amine, amide, substituted amide, aryl, substituted aryl, aryl alkyl, substituted aryl alkyl, azide, cyclic, substituted cyclic, ester, ether, formyl, halogen, heterocyclic, substituted heterocyclic, heteroaryl, substituted heteroaryl, pyrrolidine, hydrogen, hydroxyl, ketone, substituted ketone, nitro, nitroso, protecting groups, silyl, silyl ether, silyl ester, thiol, thiol ether, thiol ester, or are bonded together to form a ring. $R_{12}$-$R_{13}$ are independently selected from hydrogen and lower alkyl, particularly hydrogen. Y is nitrogen, oxygen, or sulfur. W is nitrogen or $CR_{14}$ where $R_{14}$ typically is hydrogen or aliphatic. If W is nitrogen then it typically is bonded to the carbon atom bearing $C_6$-$C_7$. The subscript n is 0-2 atoms, and if n=0 W is bonded to the carbon bearing $R_8$ and $R_9$. If W is not bonded to then nitrogen bearing $R_{12}$, then at least one additional hydrogen atom is bonded to W and the nitrogen bearing $R_{12}$. Z is carbon, nitrogen or phosphorous, and if Z is nitrogen or phosphorous, then $R_1$-$R_5$ may or may not be bound thereto.

Particular disclosed embodiments of the catalyst have a second general formula,

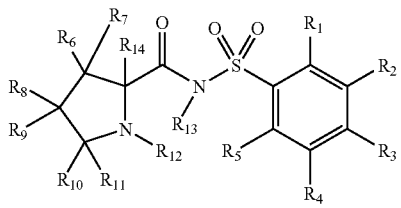

With reference to this second general formula, $R_1$-$R_5$ are independently selected from aliphatic, substituted aliphatic, alkoxy, substituted alkoxy, amine, substituted amine, amide, substituted amide, aryl, substituted aryl, aryl alkyl, substituted aryl alkyl, cyclic, substituted cyclic, ester, ether, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, polymer-bound support, such as a polymer-bound ester, or are bonded together to form a ring. At least one of $R_1$ and $R_5$ is hydrogen or halogen. At least one of the $R_1$-$R_5$ substituents typically comprises 4 or more carbon atoms, such as carbon atoms in an aliphatic chain. This contributes substantially to the organic solvent solubility of such compounds, and provides a substantial benefit relative to known compounds. This is evidenced by the generally increased reactivity and enantioselectivity of disclosed embodiments of the organocatalyst. If $R_1$-$R_5$ is aryl, the aryl group is directly bonded to one of $R_1$-$R_5$ and the compound is other than (S)—N-(1-napthylsulfonyl)-2-pyrrolidinecarboxamide, a known compound. More typically, $R_1$-$R_5$ are independently selected from aliphatic groups having 4 or more carbon atoms, hydrogen or halogen, including chlorine, fluorine, bromine and iodine, and generally fluorine. The aliphatic group also can be halogenated.

In certain embodiments, one of $R_2$-$R_4$ is aliphatic or substituted aliphatic, often alkyl, having 4 or more carbon atoms, and most typically having a chain length of from 4 to 24 carbon atoms. Again, for these embodiments, at least one of $R_1$-$R_2$ and $R_4$-$R_5$ typically is a hydrogen or halogen, and at least one of $R_2$-$R_4$ also may be a halogenated alkyl, such as a fluorinated alkyl. $R_6$-$R_{11}$ independently are selected from aliphatic, substituted aliphatic, alkoxy, substituted alkoxy, amine, substituted amine, amide, substituted amide, aryl, substituted aryl, aryl alkyl, substituted aryl alkyl, azides, cyclic, substituted cyclic, ester, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, or are bonded together to form a ring. $R_{12}$-$R_{14}$ are independently selected from hydrogen and lower alkyl, and preferably are hydrogen For certain disclosed embodiments, $R_6$-$R_{11}$ are independently selected from aliphatic, carbonyl, ether, hydrogen, hydroxyl, nitro, nitroso, or are atoms in an aryl, heteroaryl, cyclic, or heterocyclic ring, and even more typically are independently selected from hydrogen, lower alkyl, hydroxyl, nitro, nitrso, ether, carbonyl, cyclohexyl or phenyl.

A person of ordinary skill in the art will appreciate that the first general formula is stereoambiguous. That is, it does not indicate the relative or absolute stereochemistry of all potential stereoisomers. This is to indicate that all such stereoisomers are within the scope of the disclosed organocatalysts. Particular stereoisomers are more likely to be used than others, based on certain criteria, such as commercial availability of starting materials, or effectiveness as a catalyst. For example, certain disclosed catalysts have a formula

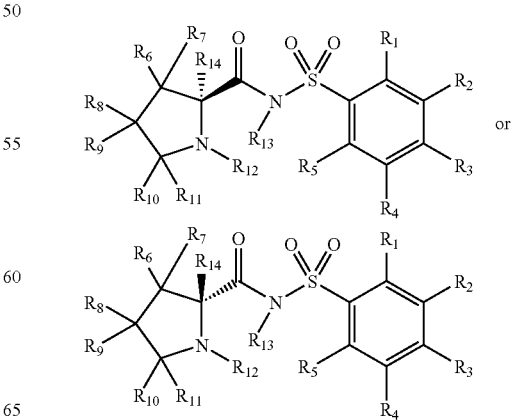

$R_1$-$R_5$ often are alkyl. Thus, second general formulas that describe disclosed embodiments are provided below.

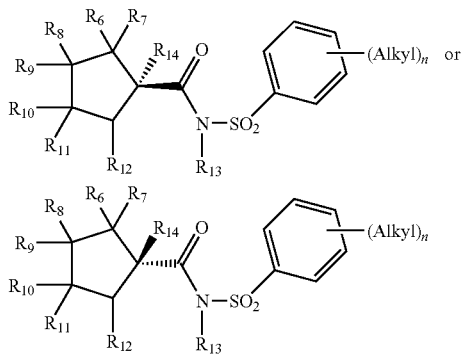

With reference to these formulas, n is from 1-5. Each of the alkyl substituents has 4 or more, typically from 4 to about 24, carbon atoms. These substituents may be in any position on the phenyl ring, including the ortho, meta and para positions relative to the sulfonamide functional group. Thus, certain disclosed compounds have a formula

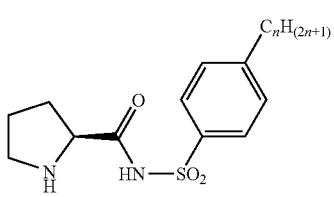
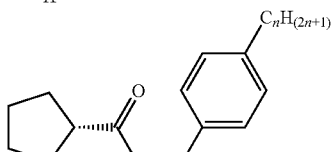
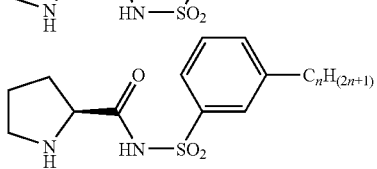
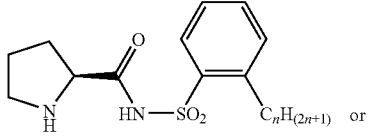
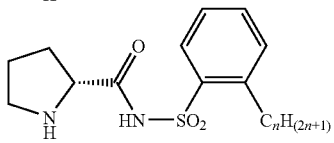

where n is from 4 to about 24, more typically from about 8 to about 20, carbon atoms. One particular working embodiment is provided below, having a dodecyl substituent in the para position.

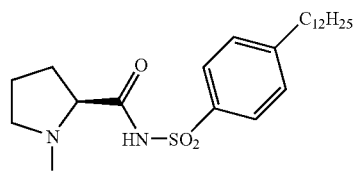
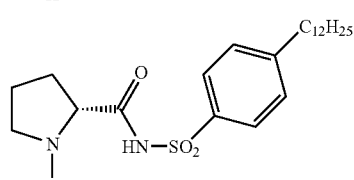

Certain disclosed embodiments are directed to amine compounds. For example, certain disclosed embodiments have a formula

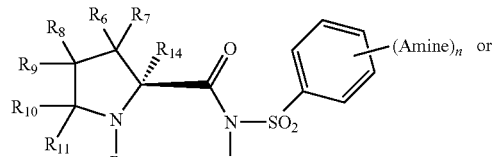
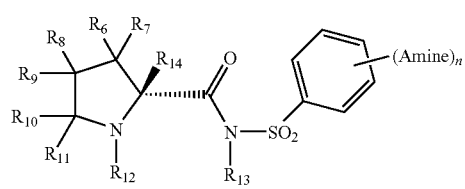

With reference to these amine-type compounds, n is from 1 to 5. Moreover, the amine typically has at least one substituent comprising at least 4 carbon atoms. Again, the amine substituents may be in any position on the phenyl ring, including the ortho, meta and para positions relative to the sulfonamide functional group, and hence further general formulas include

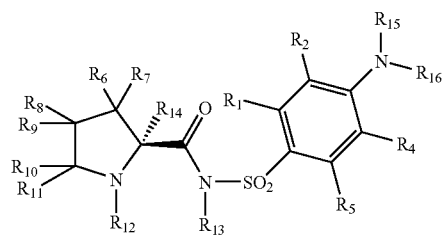
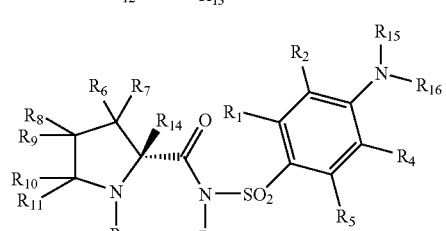

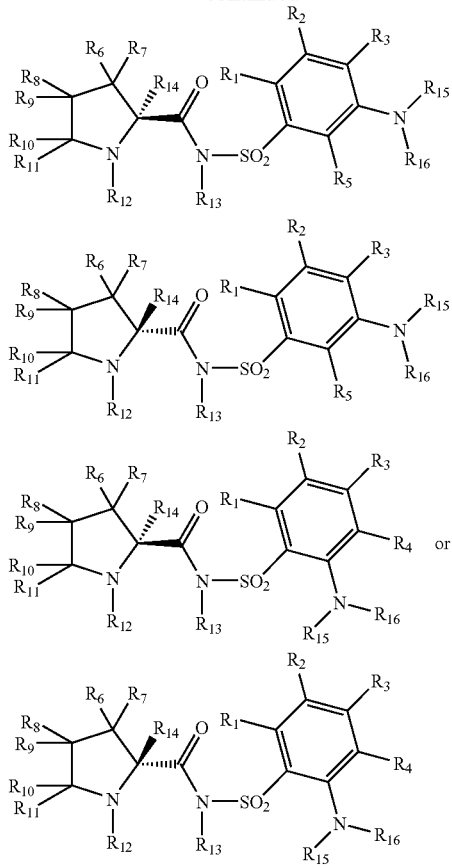

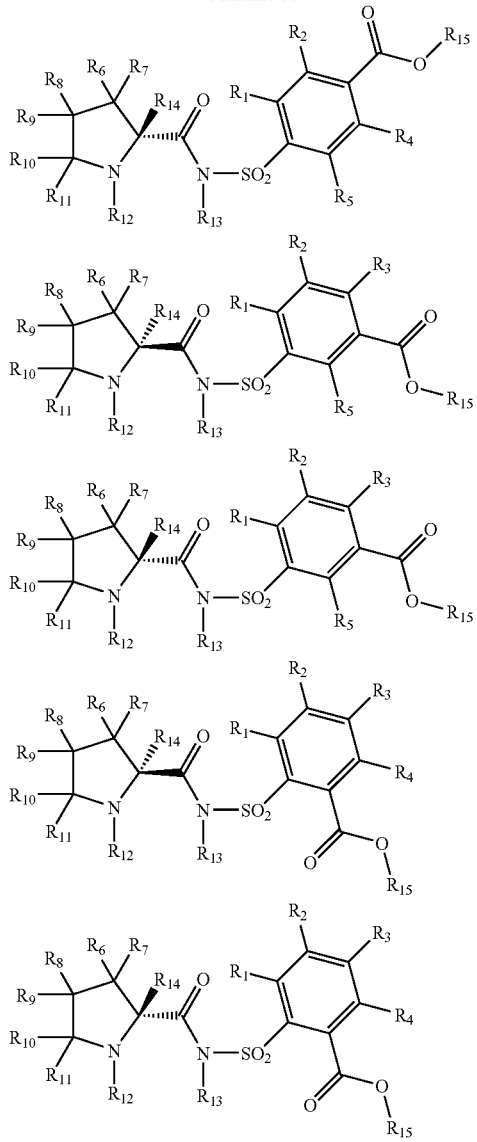

$R_{15}$ and $R_{16}$ generally are independently selected from hydrogen and aliphatic substituents. Moreover, at least one of $R_{15}$ and $R_{16}$ typically comprises 4 or more carbon atoms. For certain embodiments, $R_{15}$ and $R_{16}$ are alkyl groups having from 4 to 24 carbon atoms, and also may be dialkyl amine, again where at least one amine substituent typically has 4 or more carbon atoms.

Certain disclosed embodiments are directed to ester-type compounds. For example, certain disclosed embodiments have a formula where at least one of $R_1$-$R_5$ is an ester. Thus, a first general formula useful for describing such ester compounds is as provided below.

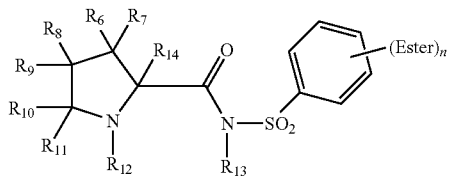

With reference to this general formula, n typically is from 1 to 5. Particular disclosed ester compounds have a structure

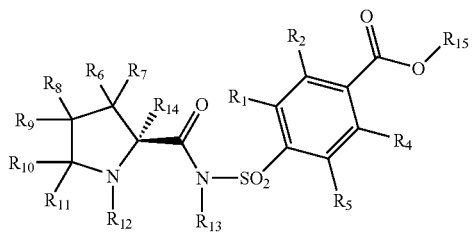

With reference to this formula, $R_{15}$ typically is an aliphatic group comprising 4 or more carbon atoms. Particular esters are alkyl esters having from 4 to 24 carbon atoms. A person of ordinary skill in the art will recognize that the ester moiety can be linked to the aryl ring via a bond formed between the ring and the carbonyl-containing carbon as well as a bond formed between the ring and the oxygen atom of the ester moiety. The ester moiety can be directly attached to the aryl ring, or it may be attached via an aliphatic chain having the formula $(CH_{2n})$ where n can be from 0 to at least 24.

Still other disclosed compounds are aryl compounds. Such compounds may have a formula

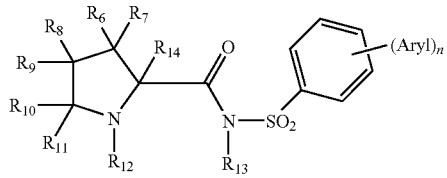

With reference to this general formula, n is from 1 to 5. Particular aryl compounds are based on general biaryl structures, as provided below.

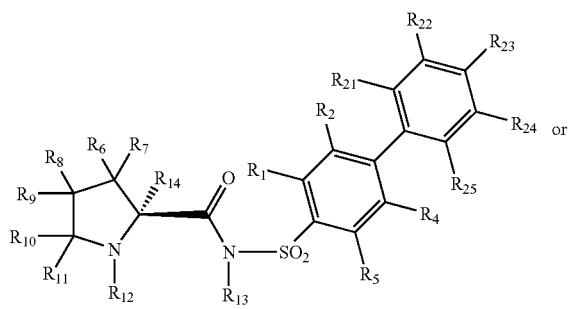

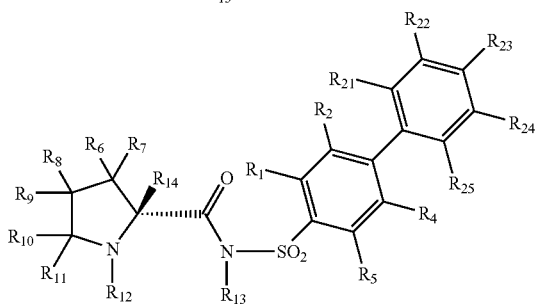

With reference to these general biaryl compounds, $R_{21}$-$R_{25}$ typically are independently selected from aliphatic, substituted aliphatic, alkoxy, substituted alkoxy, amine, substituted amine, amide, substituted amide, aryl, substituted aryl, aryl alkyl, substituted aryl alkyl, cyclic, substituted cyclic, ester, ether, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, or are bonded together to form a ring. More typically, $R_{21}$-$R_{25}$ are independently selected from aliphatic, substituted aliphatic, halogen, or hydrogen.

Aryl compounds may be fused ring systems, such as the naphthalene and anthracene-type compounds. For example, certain aryl compounds have a structure

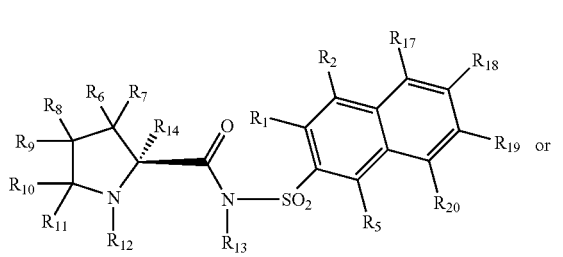

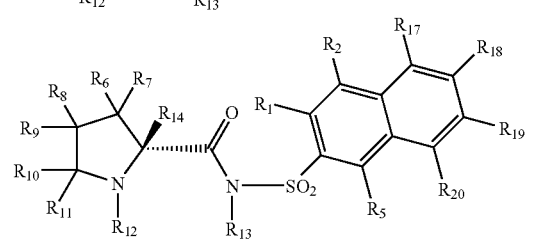

With reference to these formulas, $R_{17}$-$R_{20}$ typically are independently selected from aliphatic, substituted aliphatic, alkoxy, amine, substituted amine, amide, substituted amide, aryl, substituted aryl, aryl alkyl, cyclic, substituted cyclic, ester, halogen, heterocyclic, substituted heterocyclic, heteroaryl, substituted heteroaryl, hydrogen, hydroxyl, ketone, nitro, nitroso, or are bonded together to form a ring, and where at least one of $R_1$-$R_{20}$ is other than hydrogen.

Still other disclosed compounds are ether compounds. For example, a first general formula useful for describing such ether compounds is as follows.

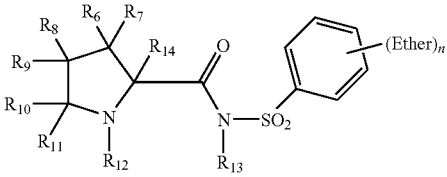

With reference to this general formula, n is from 1 to 5. Moreover, and at least one of the ether functional groups typically comprises 4 or more carbon atoms. Particular disclosed ether compounds have a formula

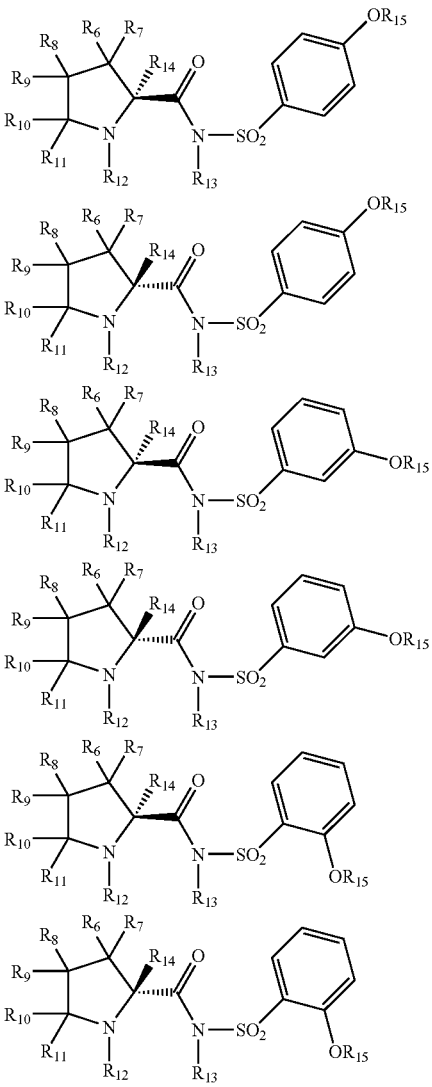

With reference to these formulas, $R_{15}$ typically comprises 4 or more carbon atoms and is aliphatic, substituted aliphatic, aryl, substituted aryl, aryl alkyl, substituted aryl alkyl, cyclic, substituted cyclic, heterocyclic and substituted hetereocyclic. A person of ordinary skill in the art will recognize that the ether moiety can include heteroatoms other than oxygen, such as sulfur.

Still other disclosed compounds are amide-type compounds. A first general formula useful for describing such amide-type compounds is provided below.

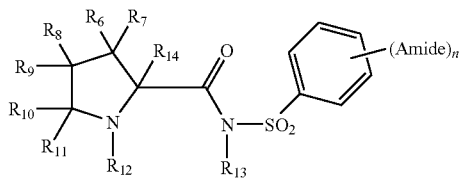

With reference to this formula, n is from 1 to 5. Moreover, the amide typically includes a substituent having 4 or more carbon atoms, most typically from 4 to about 24 carbon atoms. Particular embodiments of amide-type compounds have the following formulas.

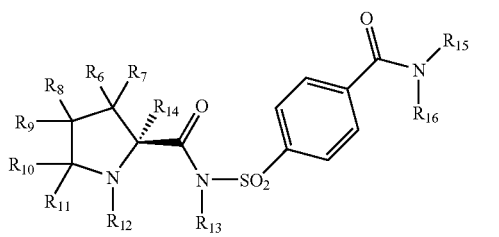

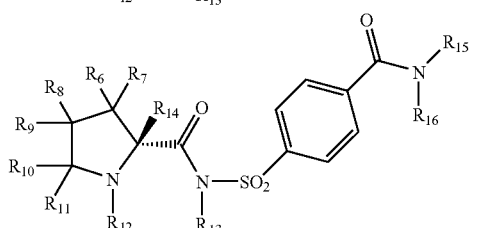

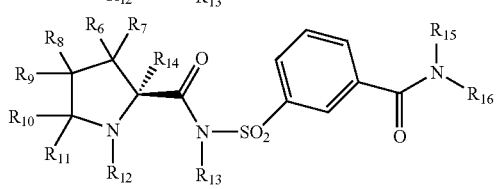

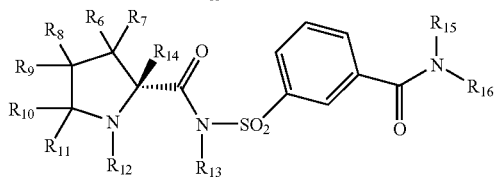

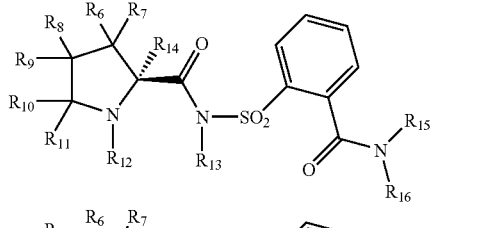

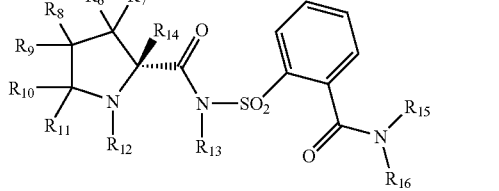

With reference to these formulas, $R_{15}$ typically comprises 4 or more carbon atoms and is aliphatic, substituted aliphatic, aryl, substituted aryl, aryl alkyl, substituted aryl alkyl, cyclic, substituted cyclic, heterocyclic and substituted hetereocyclic. $R_{16}$ most typically is hydrogen or lower alkyl. These first amide compounds have the phenyl ring directed bonded to a carbonyl functional group. A person of ordinary skill in the art will recognize that other amide compounds are possible where the nitrogen atom is directly bonded to the phenyl ring. Such compounds typically have formulas as follows.

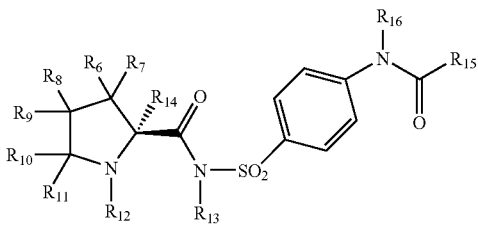

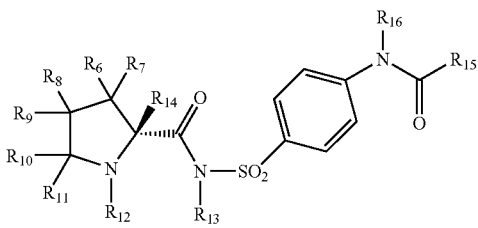

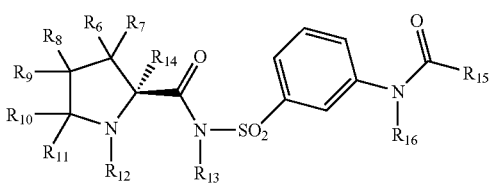

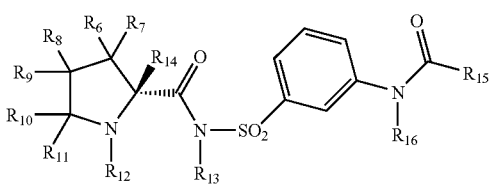

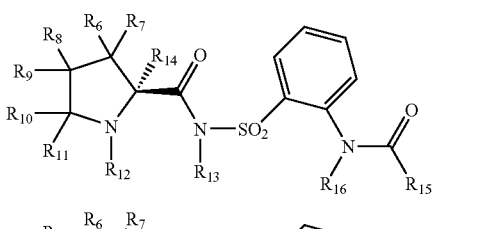

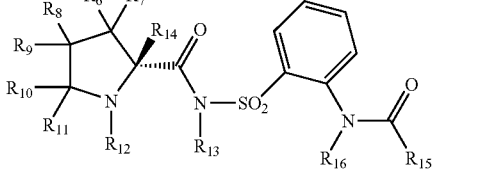

With reference to these formulas, $R_{15}$ typically comprises 4 or more carbon atoms and is aliphatic, substituted aliphatic, aryl, substituted aryl, aryl alkyl, substituted aryl alkyl, cyclic, substituted cyclic, heterocyclic and substituted hetereocyclic. And, again, $R_{16}$ typically is hydrogen or lower alkyl.

Halogenated aryl compounds also are disclosed. For example, a first general formula useful for describing such compounds has the following formulas.

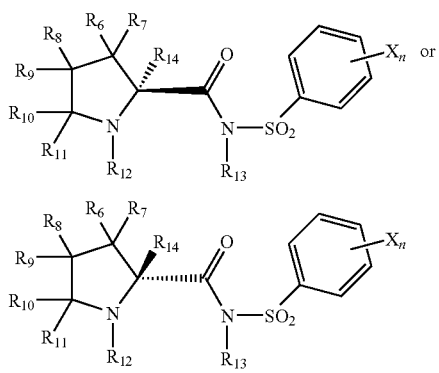

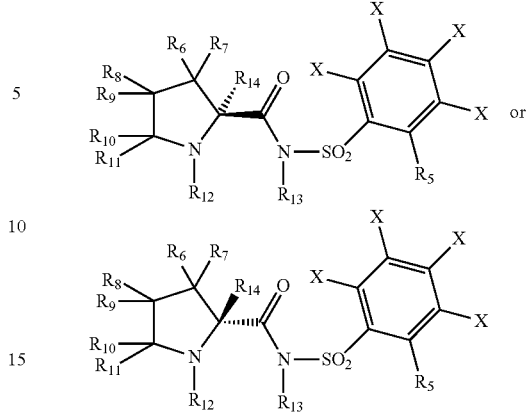

With reference to these general formulas, X is a halogen, and n is from 1 to 5. If n is less than 5, any remaining groups are independently selected from aliphatic, substituted aliphatic, alkoxy, substituted alkoxy, amine, substituted amine, amide, substituted amide, aryl, substituted aryl, aryl alkyl, substituted aryl alkyl, cyclic, substituted cyclic, ester, ether, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, or are bonded together to form a ring. Each of such substituents comprises 4 or more carbon atoms, typically carbon atoms in an aliphatic chain. Particular halogenated compounds have the following general formulas.

With reference to these formulas, X is a halogen, typically fluorine. n is from 1 to 5. $R_3$, $R_4$ and $R_5$ are independently selected from aliphatic, substituted aliphatic, alkoxy, substituted alkoxy, amine, substituted amine, amide, substituted amide, aryl, substituted aryl, aryl alkyl, substituted aryl alkyl, cyclic, substituted cyclic, ester, ether, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, or are bonded together to form a ring. Each of such substituents comprises 4 or more carbon atoms, typically carbon atoms in an aliphatic chain.

In addition to halogenated aromatic rings, substituents also may be halogenated. For example, such compounds may have the following first general formulas.

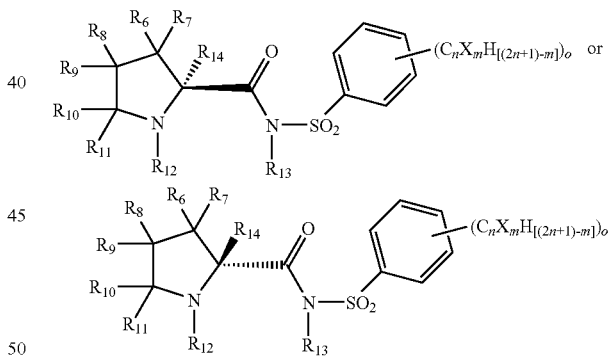

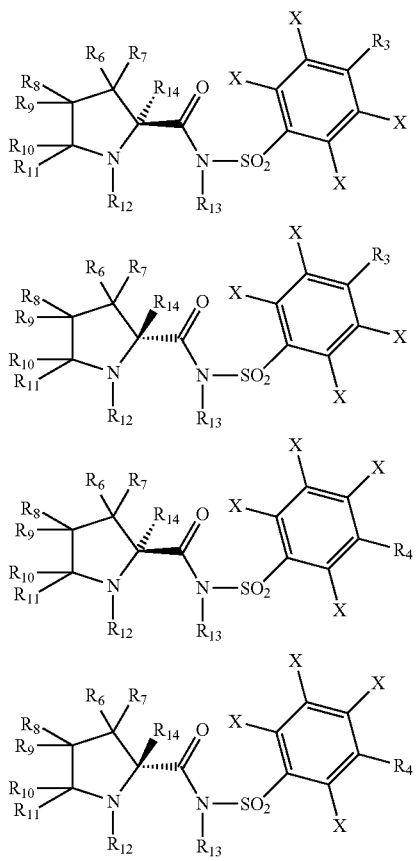

With reference to these formulas, n is 4 or greater; m is the number of halogen atoms and is from 1 to 2n+1; and o is from 1 to 5. If o is less than 5, any remaining group(s) is/are selected from aliphatic, substituted aliphatic, alkoxy, substituted alkoxy, amine, substituted amine, amide, substituted amide, aryl, substituted aryl, aryl alkyl, substituted aryl alkyl, cyclic, substituted cyclic, ester, ether, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, or are bonded together to form a ring. Each of such substituents comprises 4 or more carbon atoms, typically carbon atoms in an aliphatic chain. Particular embodiments of such halogenated compounds have the following formulas.

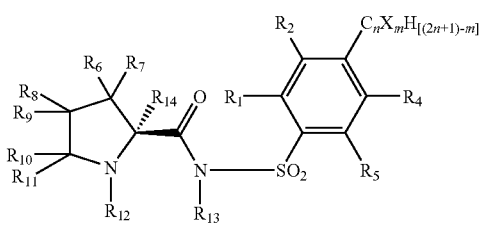

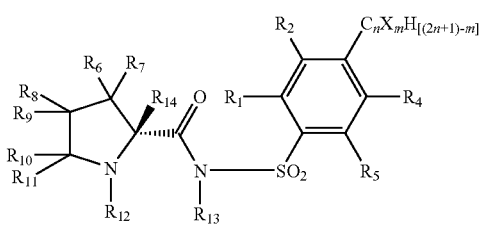

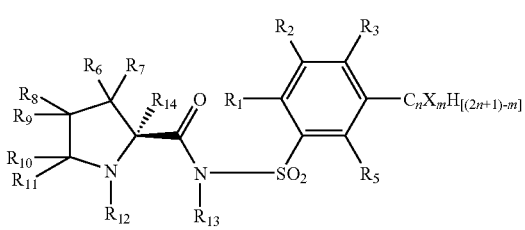

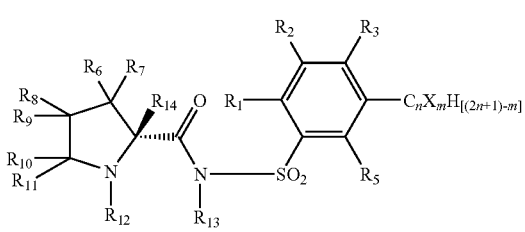

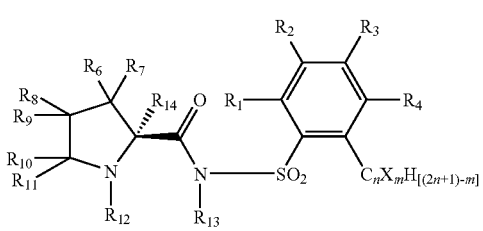

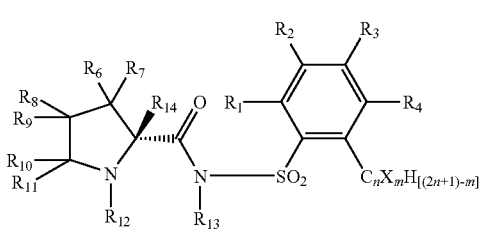

With reference to these formulas, n is 4 or greater, m is the number of halogen atoms and is from 1 to 2n+1. $R_1$-$R_5$ are independently selected from aliphatic, substituted aliphatic, alkoxy, substituted alkoxy, amine, substituted amine, amide, substituted amide, aryl, substituted aryl, aryl alkyl, substituted aryl alkyl, cyclic, substituted cyclic, ester, ether, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, polymer-bound support, such as a polymer-bound ester, or are bonded together to form a ring. Each of such substituents comprises 4 or more carbon atoms, typically carbon atoms in an aliphatic chain.

Still additional embodiments of the presently disclosed organocatalysts are ketone-based catalysts. Such compounds typically have a formula

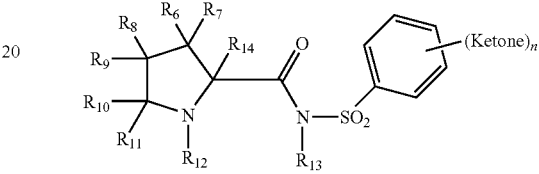

With reference to this formula, n is from 1 to 5. The ketone typically includes a substituent, often an aliphatic substituent, having 4 or more carbon atoms, and most typically from 4 to about 24 carbon atoms. The ketone moiety can be directly attached to the aryl ring, or it may be attached via an aliphatic chain having the formula $(C_nH_{2n})$ where n can be from 0 to at least 24.

A person of ordinary skill in the art will appreciate that the proline ring also can be substituted with various substituents. For example, certain such compounds can be described using the following general formulas

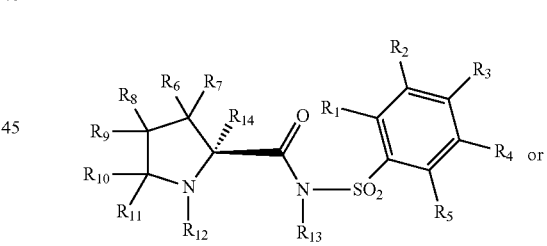

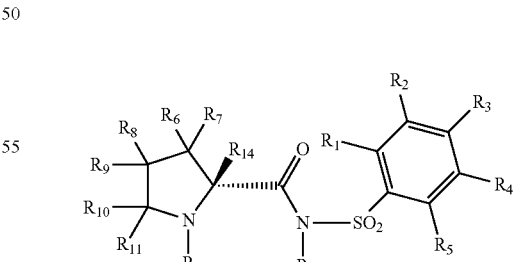

With reference to these formulas $R_{15}$ is hydrogen, aliphatic, aryl, substituted aryl, aryl alkyl, substituted aryl alkyl, heteroaryl, substituted heteroaryl, cyclic, substituted cyclic, heterocyclic, substituted heterocyclic, or silyl. Particular embodiments include

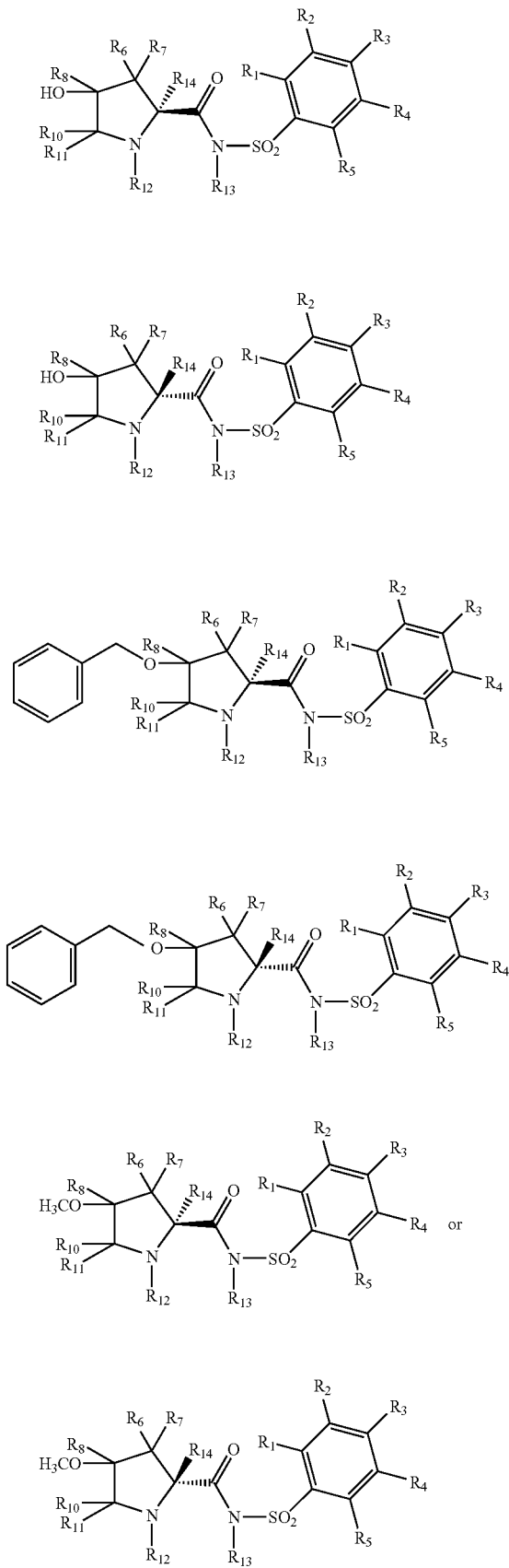

Additional particular examples of organocatalysts also are disclosed. For these compounds, any R groups present are as disclosed for the first general formula provided above. These particular compounds include:

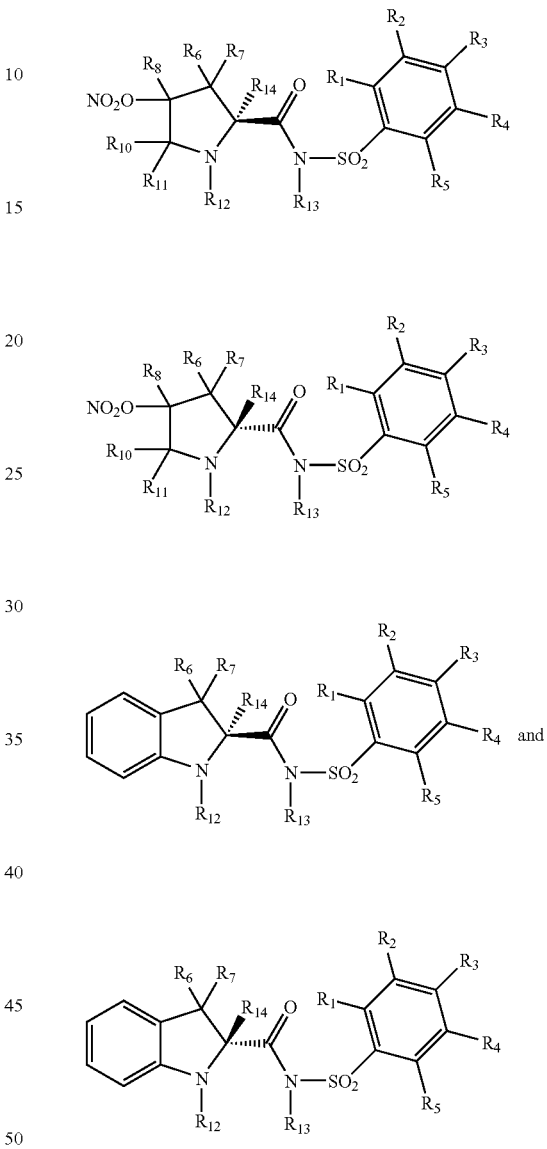

One issue associated with the present compounds is their solubility in organic solvents, such as chlorinated solvents. Proline mimetic organocatalysts have been developed that exhibit improved solubility in less polar organic solvents compared to known catalysts. This solubility profile has added industrial advantages by utilizing solvents that provide good phase splits with water and are more easily recycled on increased commercial scales.

Disclosed proline mimetic organocatalysts can be utilized for unprecedented enantioselective, intramolecular Michael addition of keto sulfones to enones with high enantioselectivity and diastereoselectivity. Furthermore, the flexibility of disclosed proline mimetic organocatalysts to facilitate enantioselective aldol reactions in more non-polar solvents has been accomplished—including highly enantioselective anti aldol reactions between cyclohexanones and aldehydes, including the unexpected syn aldol adduct with cyclopentanones. Finally, the enantioselective keto sulfone Michael addition has been applied to a second generation strategy toward lycopodine.

In order to explore the effects of solvent polarity, the solubility of certain catalysts in methylene chloride was screened. Disclosed catalysts typically have a solubility of at least 10 milligrams/milliliter in dichloromethane, and typically at least 50 milligrams/milliliter in dichloromethane. In comparison, the solubility properties for each of the known compounds listed below were quite poor (<5 mg/mL).

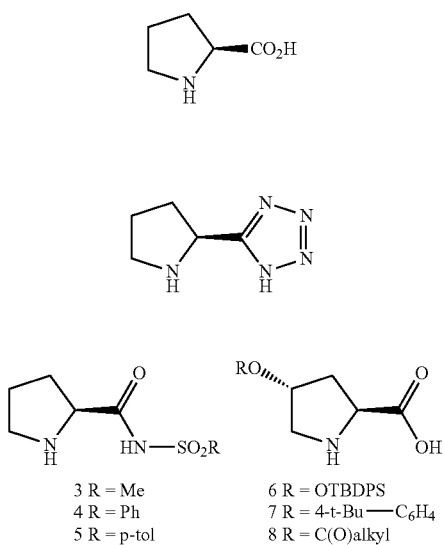

Proline And Select Proline Mimetics

The absence of a significant non-polar region to the molecule may be the origin of this poor solubility. Consequently, certain disclosed sulfonamide catalysts possess a group, such as a sizable hydrocarbon chain connected to the aromatic ring, which enhances solubility in organic catalysts. Sulfonamides are ideal choices for proline mimetics as their pKa has been documented to nicely match that of proline. In contrast to catalysts 1-5, the exemplary sulfonamide below displays impressive solubility in methylene chloride (300 mg/mL dichloromethane).

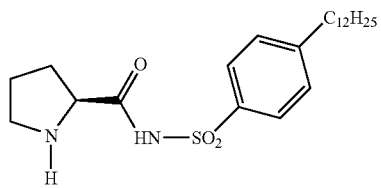

Ester-based catalysts according to the present disclosure also have markedly better solubilities than previously known compounds. For example, the compound below had a solubility of 60 mg/mL in dichloromethane.

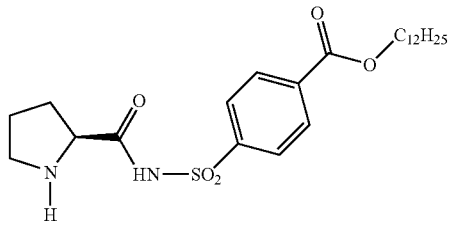

Another important aspect of the ester-containing sulfonamide catalyst is that it has proven to be more effective that the hydrogen- or dodecyl-substituted phenyl sulfonamide catalysts in certain chemical transformations. Without being limited to a particular theory of operation, it currently is believed that the increased reactivity of this catalyst is attributed to the pKa of the catalyst (i.e. the pKa of the sulfonamide N—H, which is more acidic than the pyrrolidine N—H) and the influence that electron-withdrawing substituents on the aryl ring of the catalyst have on this pKa. Electron-withdrawing groups include, but are not limited to: carbonyl bearing functional groups, such as esters, amides, ketones; nitro groups, such as nitro and nitroso; haloalkyl, such as trifluoromethyl; heteroaryl; nitrile groups, such as cyanate, isocyanate; halogens; and combinations thereof. The presence of electron-withdrawing groups on the moiety attached to the sulfonamide, such as the phenyl ring, assists in lowering the pKa value of the catalyst, which may increase reactivity. The present invention has the ability to influence reactivity and performance by changing substituents on the phenyl-sulfonamide moiety, which in turn can alter the pKa value of the catalyst. This is an aspect of sulfonamide catalysts that has not been explored in the art.

A person of ordinary skill in the art will recognize that the present invention can also be immobilized with solid support or polymer support. As illustrated below, certain disclosed embodiments of the present invention can be modified to be bound to a polymer or polymer support. For example, certain disclosed embodiments concern catalyst(s) bound to a polymer or polymer support through the aryl substituent of the sulfonamide. The polymer-containing sulfonamide moiety can be produced from a Merrefield Resin bound to a benzyl chloride or alcohol, which then undergoes esterification to produce an alkene capable of undergoing Grubbs metathesis with a sulfonamide, such as that detailed in *Journal of Photochemistry and Photobiology*, A: Chemistry (2005), 169(3), 253-260. This polymer-bound group can then be reacted with proline in order to produce a polymer-bound embodiment of the present invention.

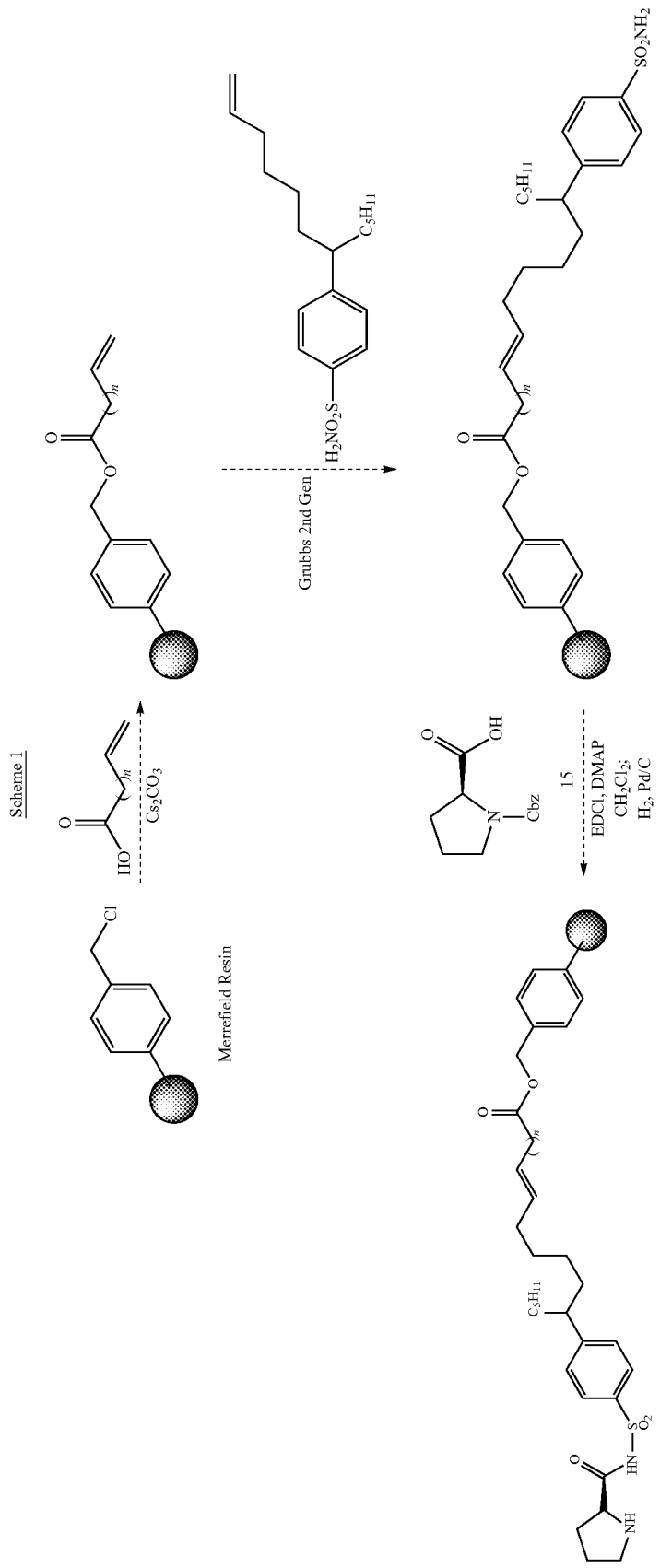

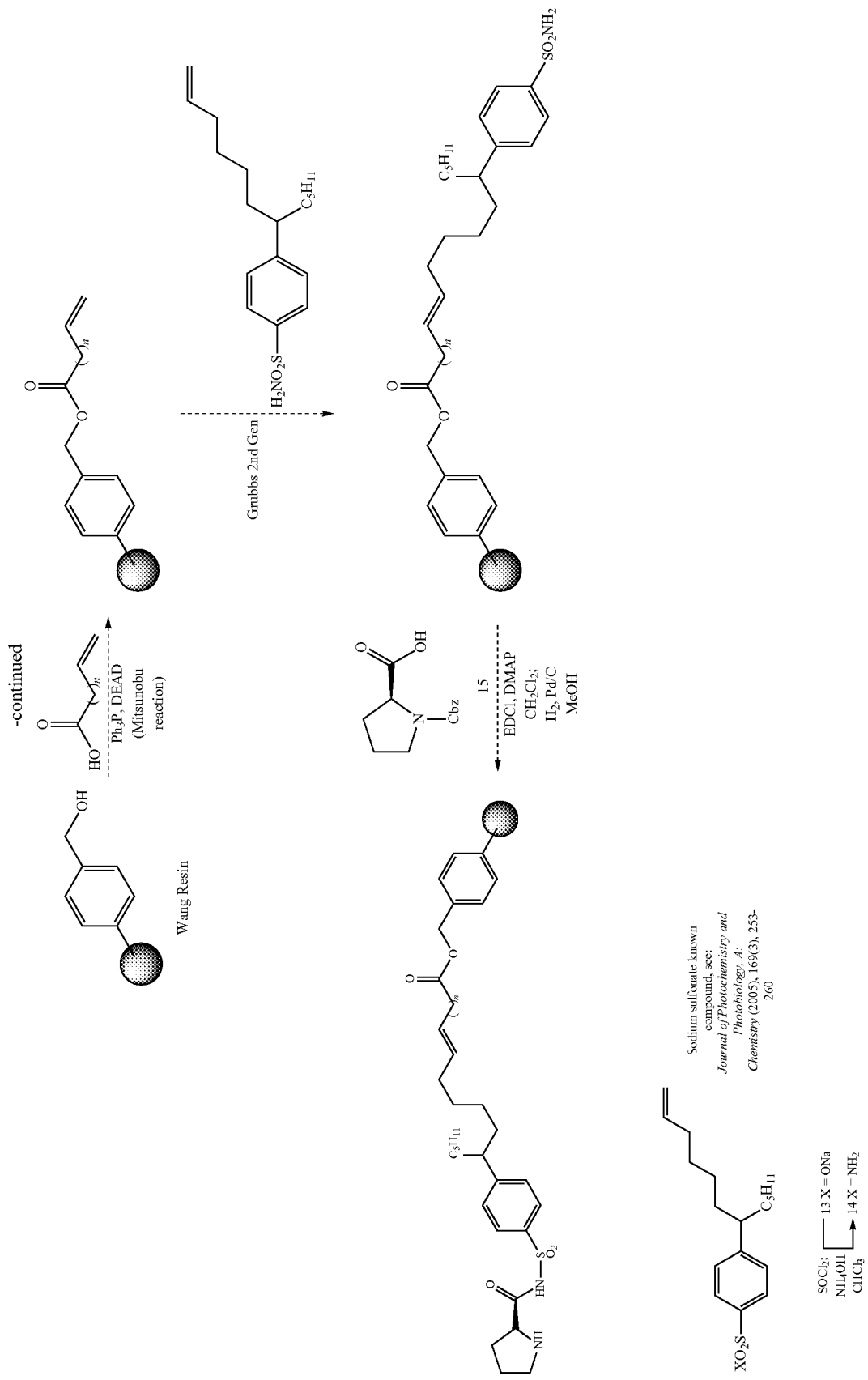

III. Method for Making Disclosed Catalyst Embodiments

Disclosed embodiments of the present catalyst can be made by any currently known or future developed methods. Solely to illustrate certain particular embodiments, the following schemes provide methodologies for making disclosed catalysts.

A first class of catalysts includes an aliphatic group, such as an alkyl group, on the phenyl ring. Although the alkyl group can be in various ring positions, Scheme 1 illustrates making para-substituted compounds. Certain para-substituted alkyl phenyl suolfonamides are known, and hence can be used to make the corresponding organocatalysts. Alternatively, the sulfonamide itself can be made, again as indicated generally in Scheme 2.

A. Synthesis of p-Alkyl Series

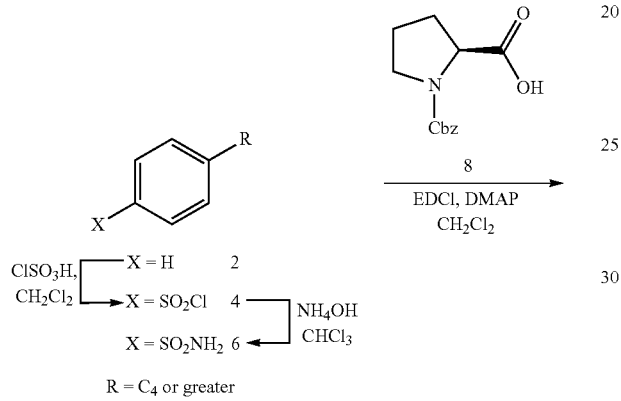

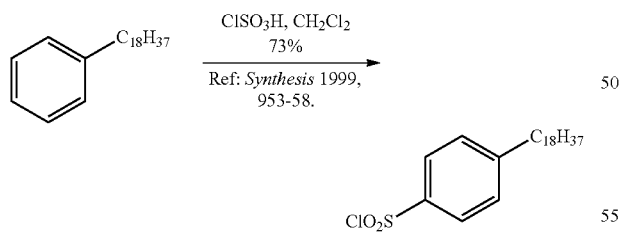

With reference to Scheme 2, a phenyl ring substituted with a desired aliphatic substituent, as exemplified by forming compounds substituted with alkyl groups at the para position, such as compound 2. Compound 2 is treated with sulfonyl chloride to form the para-substituted derivative 4. Amide 6 is then formed by treating 4 with ammonium hydroxide. Combining sulfonamide 6 with Cbz-protected proline compound 8 produces the Cbz-protected catalyst 10. The Cbz protecting group is then removed as desired, such as by the illustrated palladium-mediated hydrogenation. Scheme 3 illustrates synthesis of a particular working embodiment according to this general procedure. According to Scheme 3, a dodecyl-substituted sulfonate 13 is treated with ammonium hydroxide and then reacted with Cbz-protected proline 15. After deprotection of the Cbz group with a palladium-mediated hydrogenation, the desired catalyst 11 was produced.

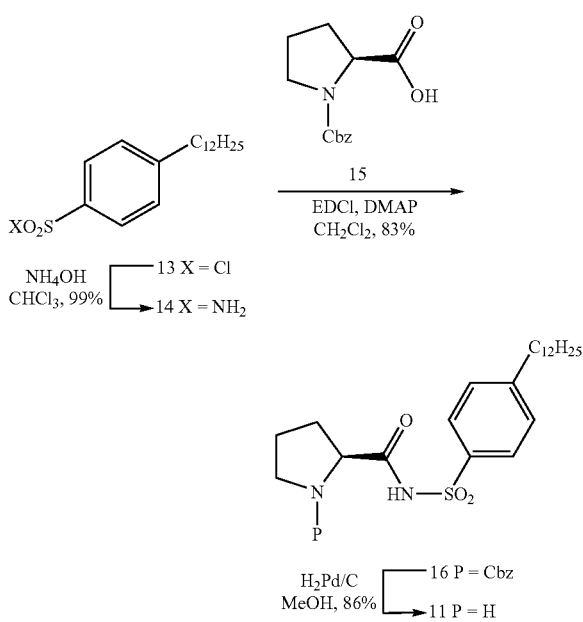

B. Synthesis of p-Ester Series

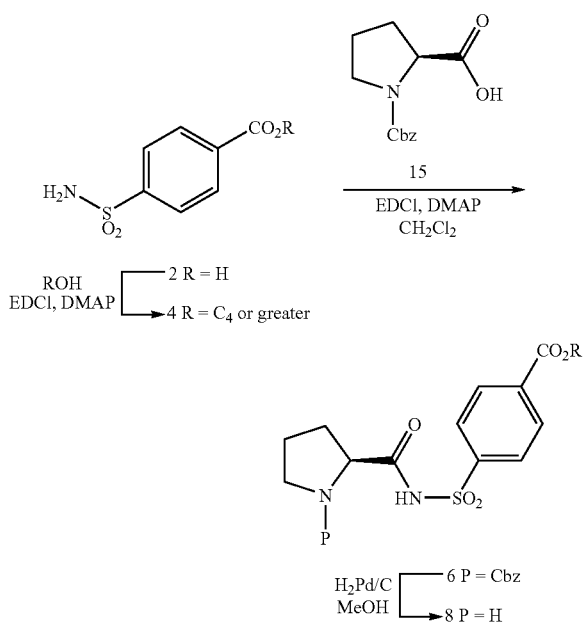

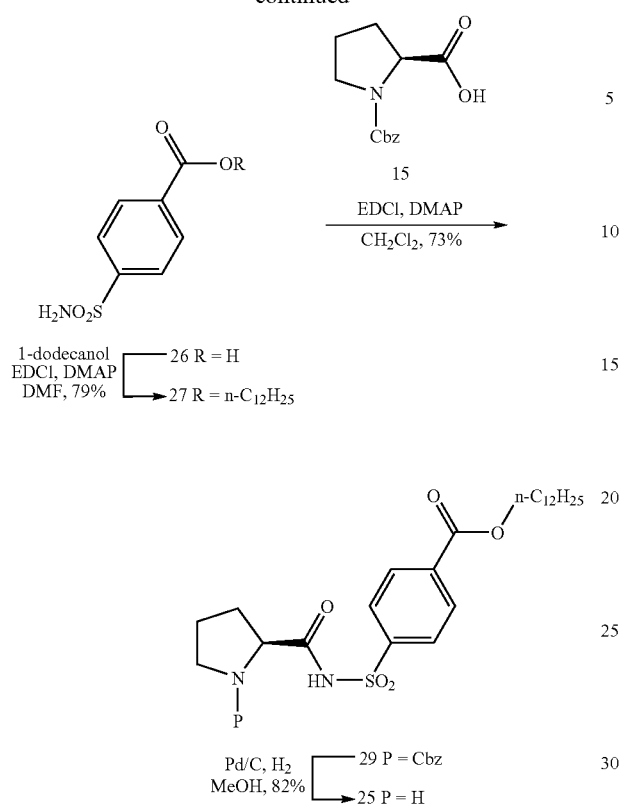

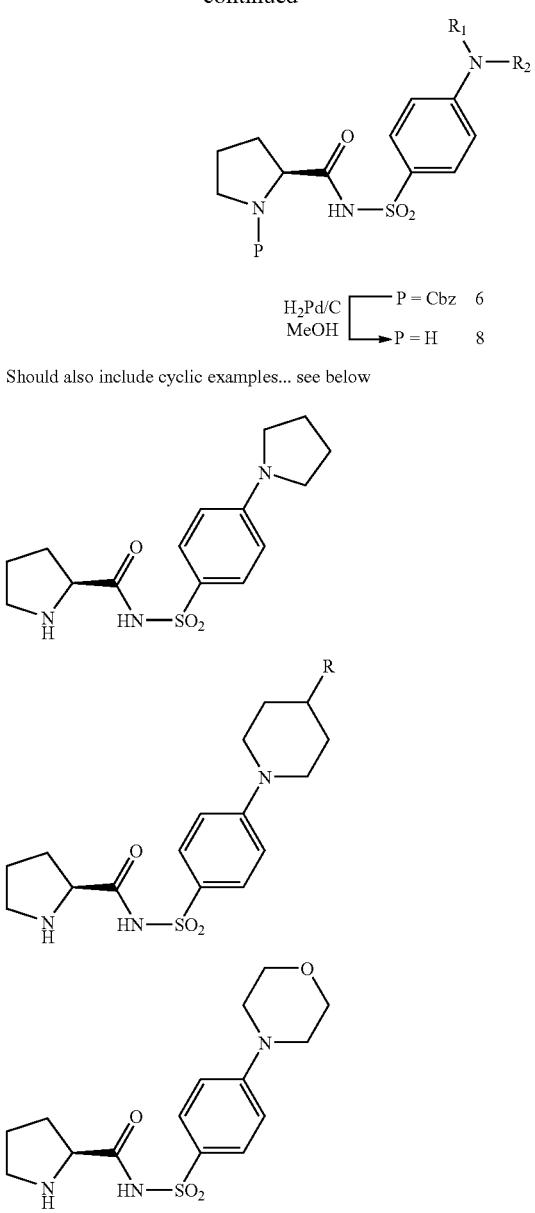

Should also include cyclic examples... see below

Dialkyl amine Precedent #1

R = H commercially available
CAS 138-41-0
Aldrich Cat # C11804

With reference to Scheme 4, a phenyl ring substituted with a desired ester, as exemplified by forming compounds substituted with ester groups at the para position. Sulfonamide carboxylic acid 2 may be converted to a desired ester by treating 2 with the appropriate alcohol. Thus, treating compound 2 with an alcohol in EDCl and DMAP produces corresponding ester 4. Combining ester 4 with Cbz-protected proline compound 15, again using EDCl and DMAP, produces protected catalyst 6. Removal of the protecting group, such as by palladium mediated hydrogenation to remove the Cbz protecting group, produces catalysts having esters in the position para to the sulfonamide.

C. Synthesis of Alkyl Amino Series

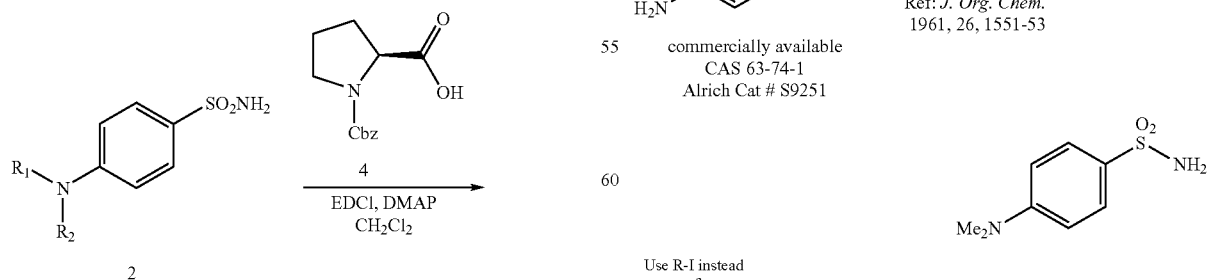

Use R-I instead of
MeI for alkylation

-continued

Dialkyl amine Precedent #2

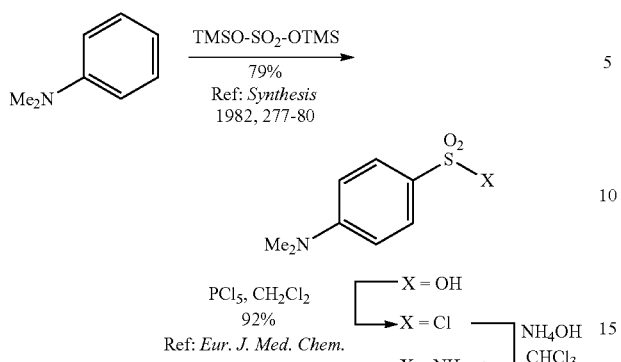

Use R instead of Me for transformation

Scheme 5 illustrates one method for making compounds substituted with an amino group, particularly mono-substituted amines, where one of $R_1$ and $R_2$ are other than hydrogen, or di-substituted amines, where both $R_1$ and $R_2$ are other than hydrogen, and typically are aliphatic or aryl groups having more than 4 total carbon atoms. For di-substituted compounds, $R_1$ and $R_2$ can be the same or different. While the amine may be in various positions on the phenyl ring, Scheme 5 illustrates making amines in the para position. According to Scheme 5, phenyl sulfonamide 2 is combined with nitrogen-protected proline compound 4. Combining 2 with 4 in the presence of EDCl and DMAP produces protected catalyst 6. Removal of the protecting group, such as by palladium-mediated hydrogenation to remove the Cbz protecting group, produces catalysts having esters in the position para to the sulfonamide.

D. Synthesis of Napthalene Derivative Series

Scheme 6

2-Naphthalene derivative

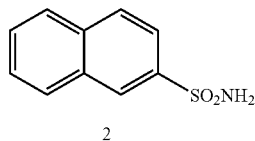

2

Commercially available
Aldrich Cat 634077
CAS 1576-47-2

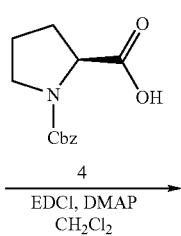

1-naphthalene derivative could be made using identical pathway as the 1-naphthalene sulfonamide is available.

The present invention also includes aryl compounds other than phenyl-based compounds. For example, Scheme 6 illustrates one method suitable for making both 1- and 2-substituted naphthalene derivatives. Commercially available naphthalene sulfonamide 2 is coupled with protected proline compound 4 in the presence of EDCl and DMAP to produce protected catalyst 6. Removal of the protecting group, such as by palladium-mediated hydrogenation to remove the Cbz protecting group, produces catalysts 8.

E. Synthesis of Biphenyl Derivative Series

Scheme 7

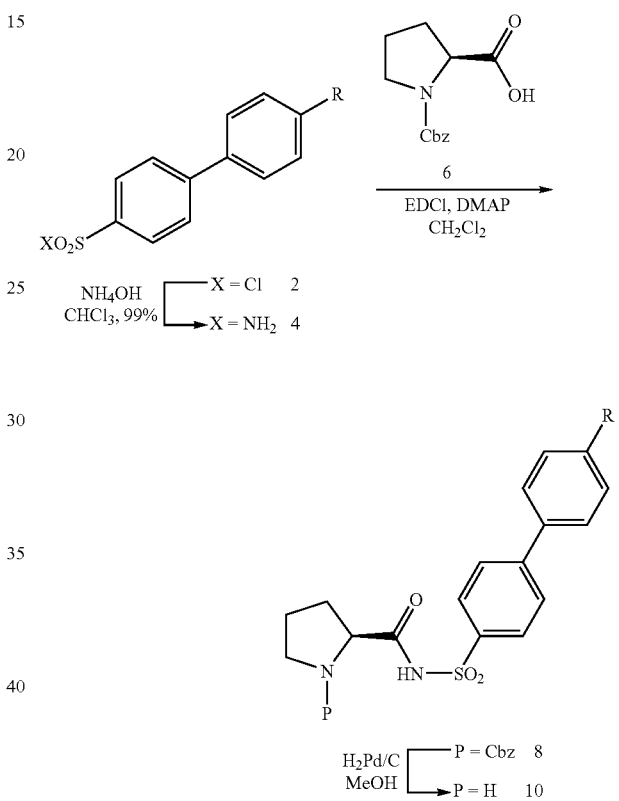

(R = H) sulfonyl chloride is commercially available
Aldrich Cat 536938
CAS 1623-93-4

Note: R = H, C, OR, $NR_2$ etc.

The present invention also includes bi-phenyl-based compounds. For example, Scheme 7 illustrates one method suitable for making substituted biphenyl derivatives. Compound 2, commercially available biphenyl sulfonyl chloride, is converted to the amide 4 using ammonium hydroxide. Amide 4 is coupled with protected proline compound 6 in the presence of EDCl and DMAP to produce protected catalysts 8. Removal of the protecting group, such as by palladium-mediated hydrogenation to remove the Cbz protecting group, produces catalysts 10.

F. Synthesis of Derivatives in the Ortho Position

Many of the representative catalysts disclosed herein have aryl substitutions in the para position relative to the sulfonamide functional group. Substitution patterns other than para also produce suitable catalysts. For example, Scheme 8 below illustrates one method for making ortho substituted catalysts.

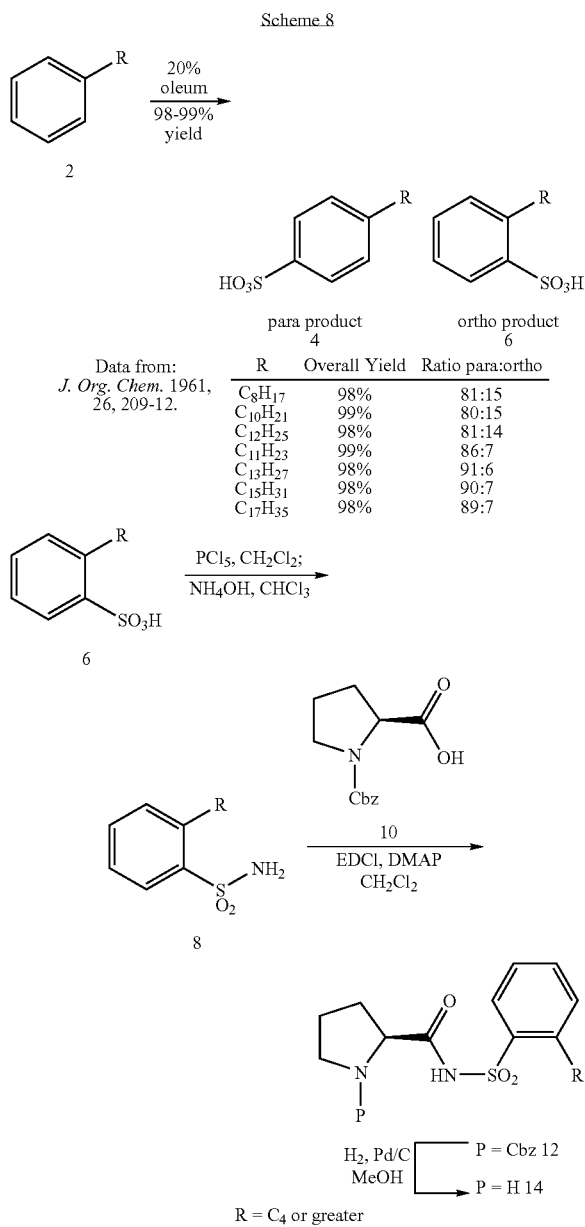

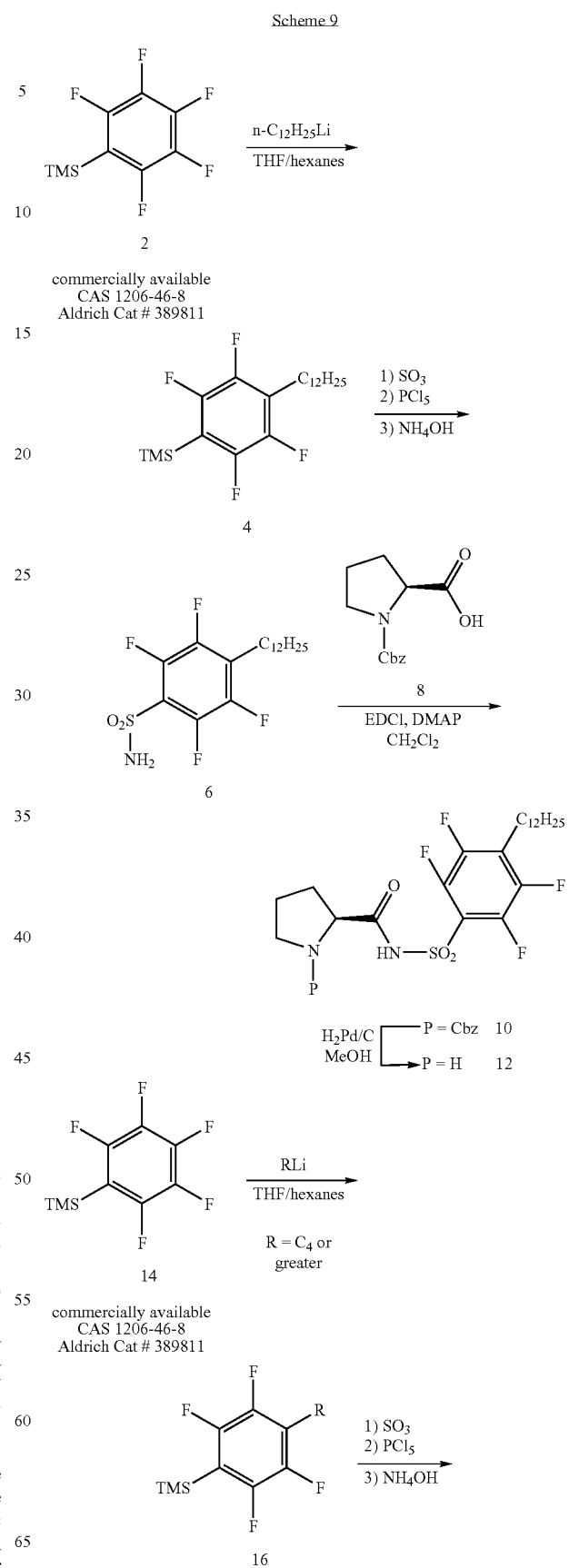

As indicated in Scheme 8, various substituted phenyl compounds can be obtained commercially, such as from Aldrich. Such aliphatic-substituted phenyl compounds 2 can be converted to the corresponding sulfonic acids 4 and 6 by treatment with fuming sulfuric acid (oleum). These compounds, including ortho substituted derivative 6, is then converted to the sulfonamide 8 by treatment with ammonium hydroxide. Sulfonamide 8 is coupled with protected proline compound 10 in the presence of EDCl and DMAP to produce protected catalyst 12. Removal of the protecting group, such as by palladium-mediated hydrogenation to remove the Cbz protecting group, produces catalysts 14.

G. Synthesis of Halogenated Derivatives

Catalysts according to the present disclosure can include additional substitutions, such as substituting one or more hydrogen atoms on either the aryl ring, or rings, the aliphatic substituents, or both. For example, as indicated below in Scheme 9, an aryl ring, or rings, can be substituted with one or more halogen atoms, such as one or more fluorine atoms.

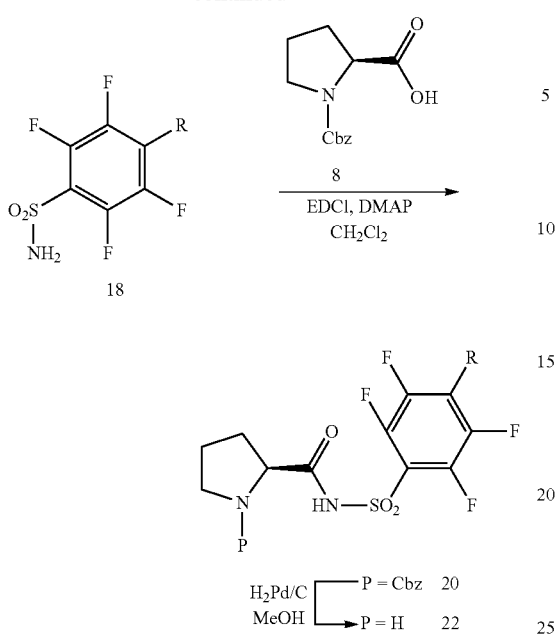

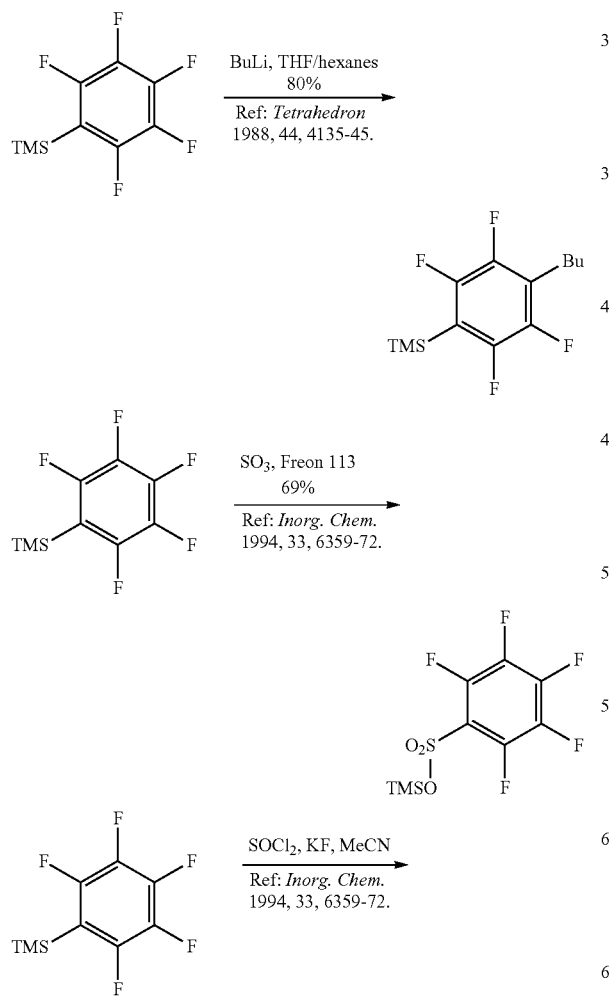

Precedent for synthesis of Sulfonic acid/flouride derivatives

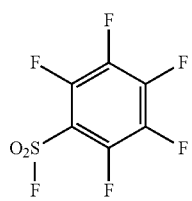

With reference to Scheme 9, starting fluorinated phenyl compound 2 is treated with a desired lithiated aliphatic compound, such as an alkyl lithium reagent, to form the corresponding substituted phenyl compound 4. Silylated compound 4 is then converted to the corresponding sulfonyl chloride by treatment with $SO_3$ and $PCl_5$. The resulting sulfonyl chloride is then converted to the sulfonamide 6 using ammonium hydroxide. Sulfonamide 6 is coupled with protected proline compound 8 in the presence of EDCl and DMAP to produce protected catalysts 12. Removal of the protecting group, such as by palladium-mediated hydrogenation to remove the Cbz protecting group, produces catalysts 12. This reaction sequence is indicated generally in Scheme 9 too, with the production of compound 22.

H. Synthesis of Halogenated Aliphatic Derivatives

Substituents other than the aryl substituent also can be halogenated. For example, aliphatic substituents, such as alkyl substituents, also can be halogenated. Embodiments of a method for making such compounds are illustrated below in Scheme 10.

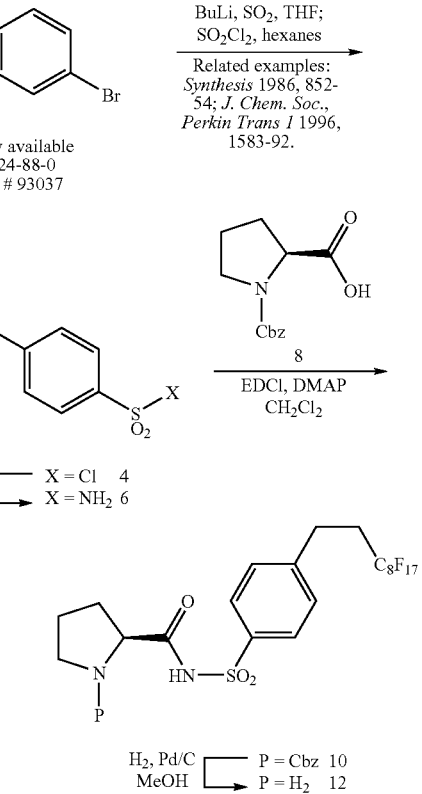

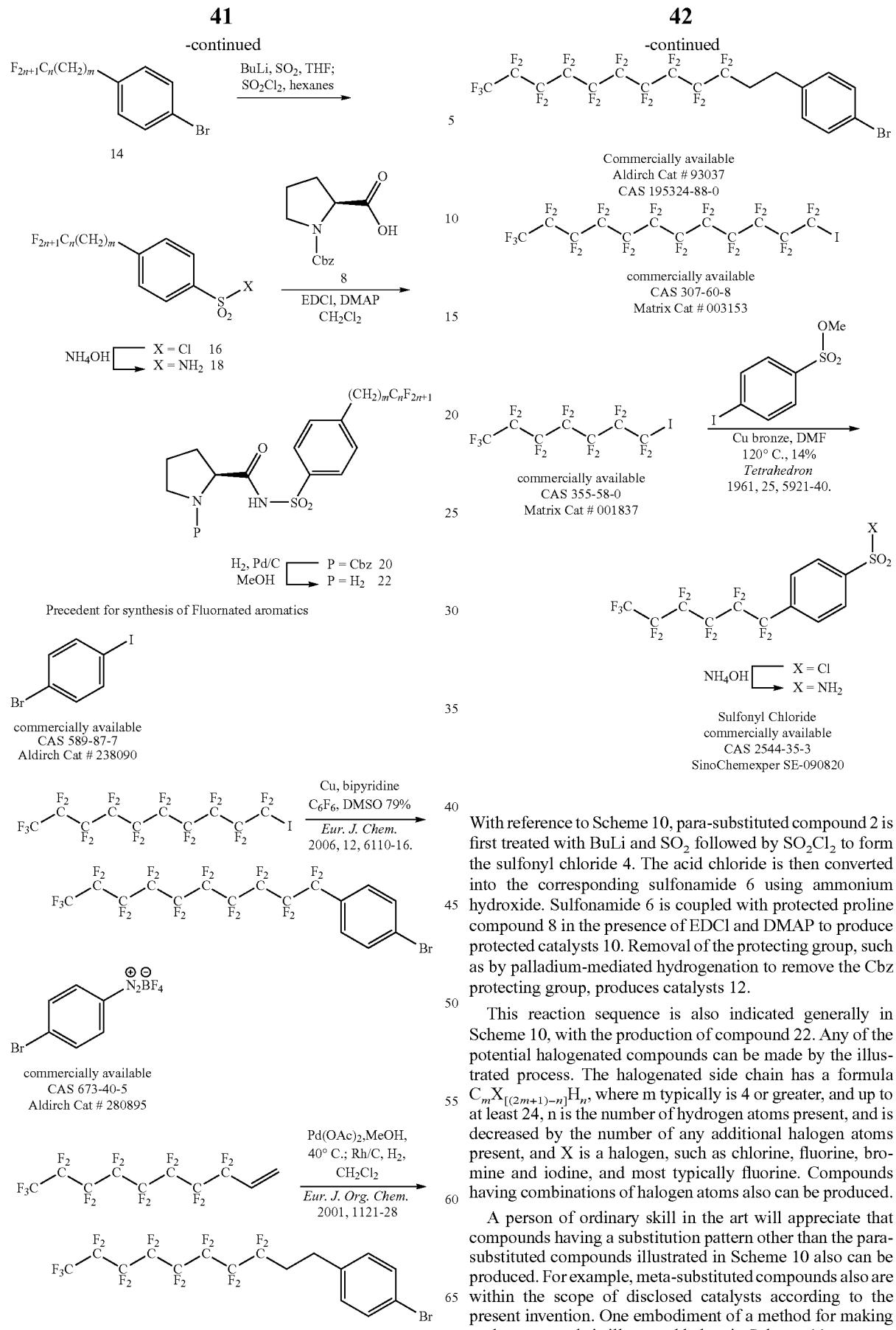

With reference to Scheme 10, para-substituted compound 2 is first treated with BuLi and $SO_2$ followed by $SO_2Cl_2$ to form the sulfonyl chloride 4. The acid chloride is then converted into the corresponding sulfonamide 6 using ammonium hydroxide. Sulfonamide 6 is coupled with protected proline compound 8 in the presence of EDCl and DMAP to produce protected catalysts 10. Removal of the protecting group, such as by palladium-mediated hydrogenation to remove the Cbz protecting group, produces catalysts 12.

This reaction sequence is also indicated generally in Scheme 10, with the production of compound 22. Any of the potential halogenated compounds can be made by the illustrated process. The halogenated side chain has a formula $C_mX_{[(2m+1)-n]}H_n$, where m typically is 4 or greater, and up to at least 24, n is the number of hydrogen atoms present, and is decreased by the number of any additional halogen atoms present, and X is a halogen, such as chlorine, fluorine, bromine and iodine, and most typically fluorine. Compounds having combinations of halogen atoms also can be produced.

A person of ordinary skill in the art will appreciate that compounds having a substitution pattern other than the para-substituted compounds illustrated in Scheme 10 also can be produced. For example, meta-substituted compounds also are within the scope of disclosed catalysts according to the present invention. One embodiment of a method for making such compounds is illustrated below in Scheme 11.

Scheme 11

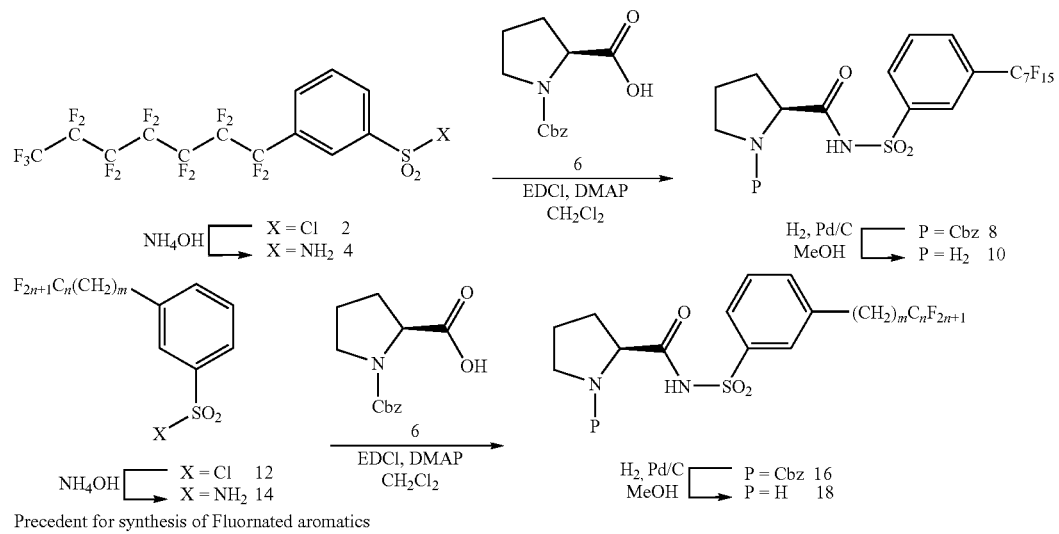

Precedent for synthesis of Fluornated aromatics

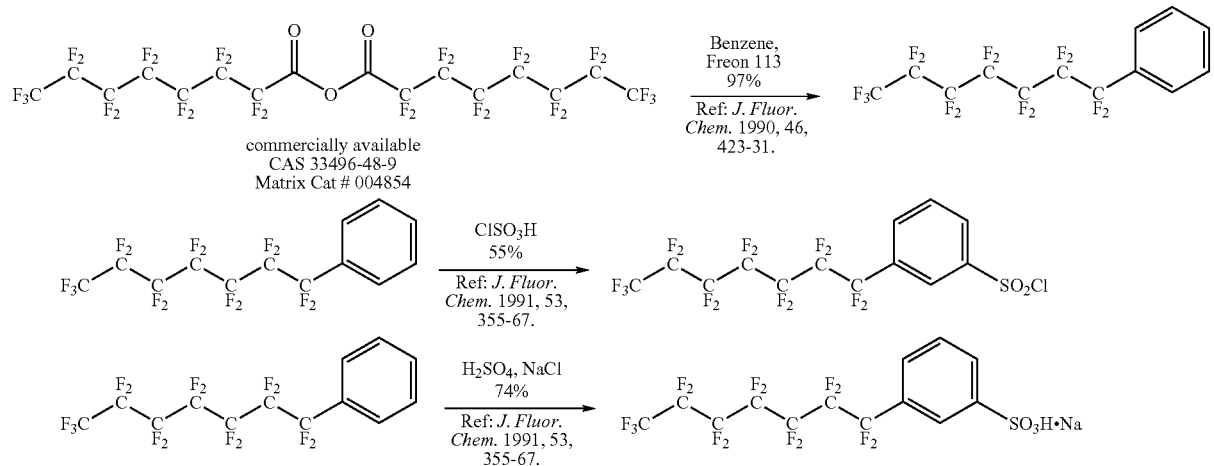

With reference to Scheme 11, meta-substituted sulfonyl chloride compound 2 is converted into the corresponding sulfonamide 4 using ammonium hydroxide. Sulfonamide 4 is coupled with protected proline compound 6 in the presence of EDCl and DMAP to produce protected catalysts 8. Removal of the protecting group, such as by palladium-mediated hydrogenation to remove the Cbz protecting group, produces catalysts 10. This reaction sequence is also indicated generally in Scheme 11, with the production of compound 18. Any of the potential halogenated compounds can be made by the illustrated process. The halogenated side chain has a formula $C_mX_{[(2m+1)n]}H_n$, where m typically is 4 or greater, and up to at least 24, n is the number of hydrogen atoms present, and is decreased by the number of any additional halogen atoms present, and X is a halogen, such as chlorine, fluorine, bromine and iodine, and most typically fluorine. Compounds also can be produced having combinations of halogen atoms.

I. Synthesis of para-Acylated Anilino Derivatives

Presently disclosed catalysts also can be amide-substituted catalysts. Such compounds can be made as generally illustrated below in Scheme 12.

Scheme 12

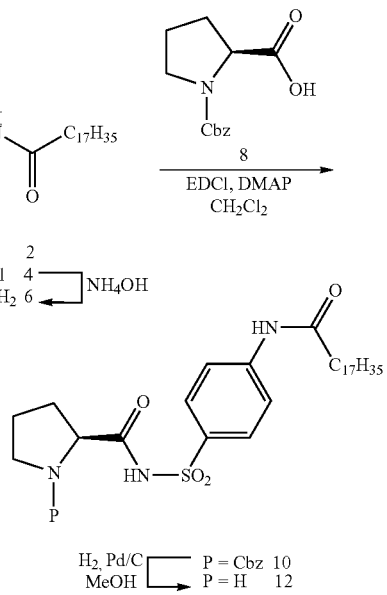

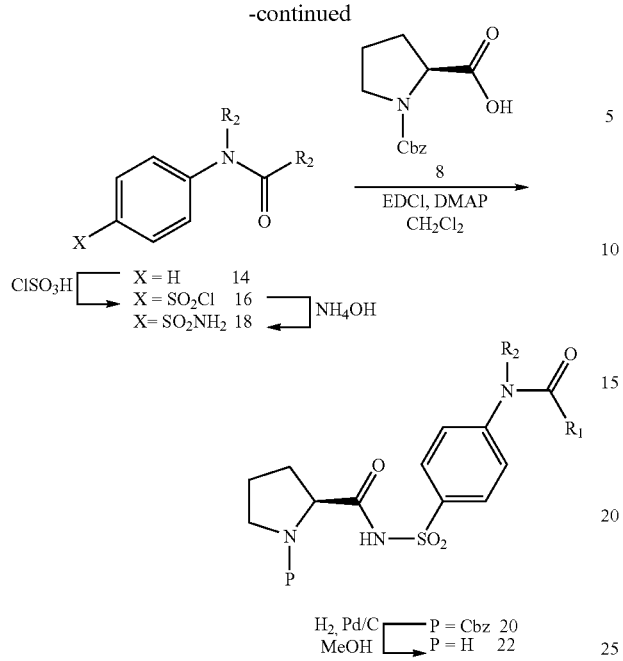

X = H commercially available
CAS 637-54-7
TCI Cat# S0314

R₁ and/or R₂ = C₄ or greater
R₁ or R₂ can equal H or C

With reference to Scheme 12, para-substituted compound amide 2 is first treated with chlorosulfonic acid to form the sulfonyl chloride 4, which is converted to sulfonamide 6 using ammonium hydroxide. Sulfonamide 6 is coupled with protected proline compound 8 in the presence of EDCl and DMAP to produce protected catalysts 10. Removal of the protecting group, such as by palladium-mediated hydrogenation to remove the Cbz protecting group, produces catalysts 12. This reaction sequence is indicated generally in Scheme 12 too, with the production of catalysts 22.

J. Synthesis of ortho-Alkyl Phenolic Anilino Derivatives

Presently disclosed catalysts also can be ether-substituted catalysts too. Such compounds can be made as generally illustrated below in Scheme 13.

Scheme 13

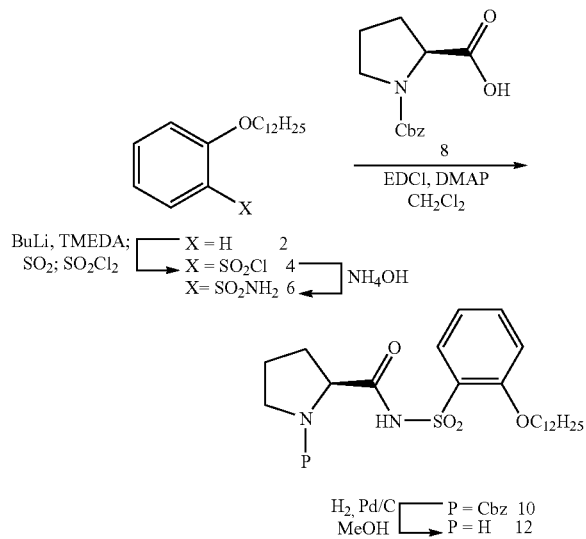

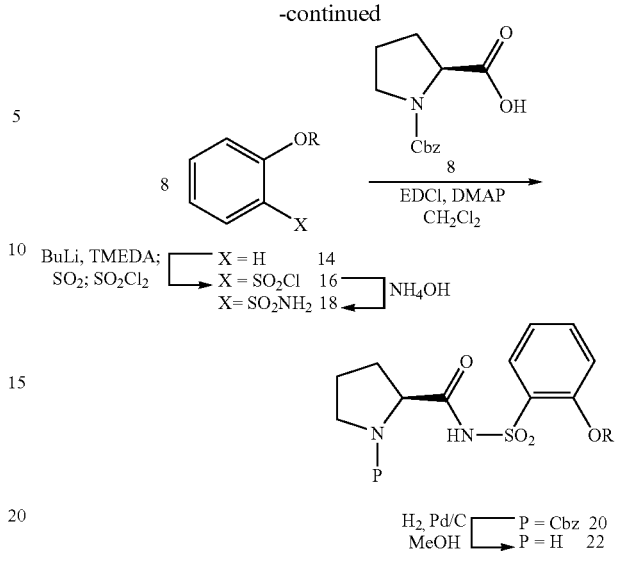

X = H commercially available
CAS 35021-68-2
SALOR Cat S347949
Prep: *Tetrahedron* 1988, 44, 6677-80

R = C₄ or greater

With reference to Scheme 13, ortho-substituted compound ether 2 is first treated with sulfuryl chloride to form the sulfonyl chloride 4, which is converted to sulfonamide 6 using ammonium hydroxide. Sulfonamide 6 is coupled with protected proline compound 8 in the presence of EDCl and DMAP to produce protected catalysts 10. Removal of the protecting group, such as by palladium-mediated hydrogenation to remove the Cbz protecting group, produces catalysts 12. This reaction sequence is indicated generally in Scheme 13 too, with the production of catalysts 22.

IV. Reactions Catalyzed by Disclosed Catalysts

Disclosed embodiments of the present catalyst can be used to catalyze a variety of different types of reactions. Other catalysts are known, and have been reviewed in the technical literature. For example, (S)- and (R)-5-pyrrolidin-2-yl-1H-tetrazole catalysts, formulas provided below, have been reviewed for their catalytic behavior in "Practical Organocatalysis with (S)- and (R)-5-pyrrolidin-2-yl-1H-tetrazoles," *J. Aldrichchimica ACTA*, 41, 3-11 (2008), which is incorporated herein by reference.

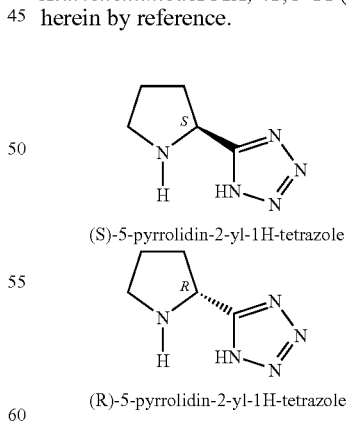

Each of the reactions reviewed in this article also can be conducted using the catalysts disclosed herein. Particular reactions are discussed in more detail below. However, solely by way of example, disclosed catalysts can be used to perform aldol reactions, conjugate additions, such as Michael additions, Robinson annulations, Mannich reactions, α-aminooxylations, α-hydroxyaminations, α-aminations and alkylation reactions. The aldol reaction usually involves the nucleophilic addition of a ketone enolate to an aldehyde to form a β-hydroxy ketone, or "aldol" (aldehyde+alcohol). The aldol addition product may loses a molecule of water during the reaction to form an α,β-unsaturated ketone. This is called an aldol condensation. A Michael addition reaction is a nucleophilic addition of a carbanion to an alpha, beta unsaturated carbonyl compound. It belongs to the larger class of conjugate additions. This is one of the most useful methods for the mild formation of C—C bonds. The Mannich reaction is an organic reaction that involves amino alkylation of an acidic proton placed next to a carbonyl functional group with formaldehyde, ammonia or any primary or secondary amine. The final product is a β-amino-carbonyl compound.

A. Enantioselective Michael Addition for Lycopodine Synthesis

One proposed synthesis of the alkaloid lycopodine (1), involved using an enantioselective, intramolecular cyclization of a $C_8$ keto sulfone 5 onto the internal $C_7$ Michael acceptor (Scheme 14).

Scheme 14

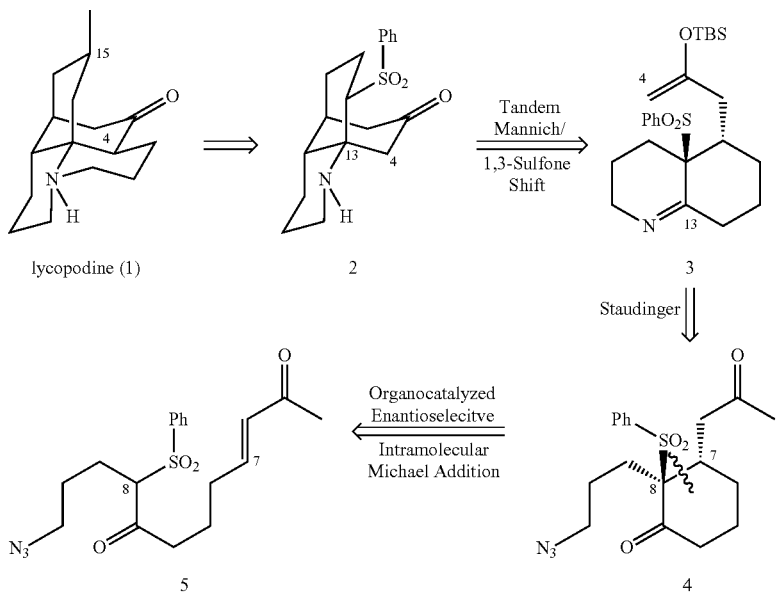

No organocatalyzed protocols were known for accomplishing this reaction. Consequently, a viable enantioselective, intramolecular Michael addition of keto sulfones was developed using organocatalysis.

B. Racemic Intramolecular Keto Sulfone Michael Addition

Prior to investigating the enantioselective Michael cyclization, a racemic protocol was developed, as indicated below in Scheme 15.

Scheme 15

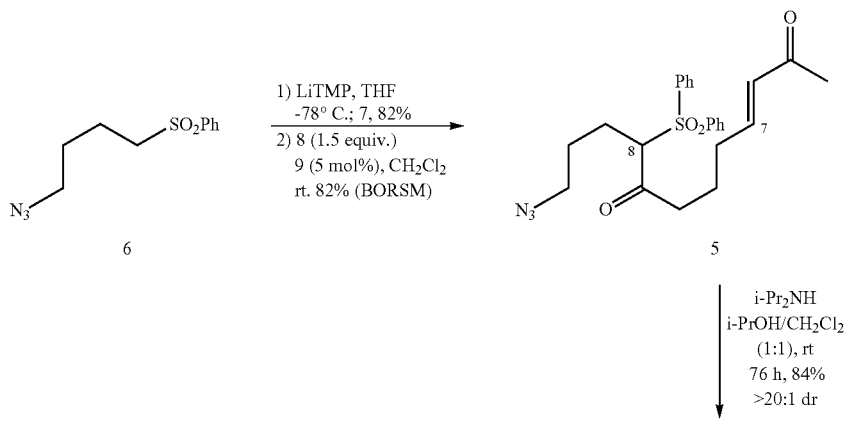

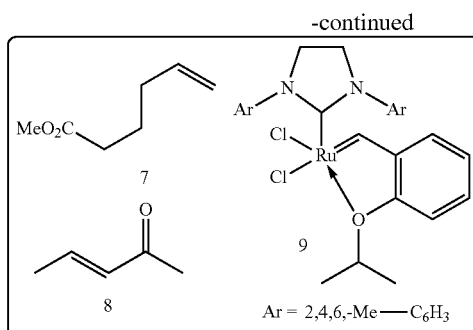

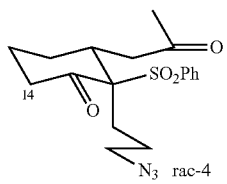

With reference to Scheme 15, enone 5 was prepared in two steps from the known sulfone 6. Hydride (e.g. NaH, PhH) and alkoxide (e.g. $Cs_2CO_3$, EtOH) conditions were first tested for the conjugate addition of 5. These conditions had proven effective in prior intramolecular Michael additions with the desired relative configuration by Stork and Evans. In both cases, overreaction appeared to occur to provide a product derived from attack of the resultant methyl ketone (after conjugate addition) by an enolate at $C_{14}$. Furthermore, cyclization occurred with the undesired $C_{7-8}$ cis relationship in the initial Michael addition. Fortunately, treatment of the keto sulfone 5 with diisopropylamine [IPA/$CH_2Cl_2$ (1:1), rt, 76 h, 84%] cleanly induced Michael addition to generate the desired $C_{7,8}$ trans diastereomer 4 (Table 1, Entry 1). The stereochemical outcome of this transformation was confirmed by X-ray crystallographic analysis. The nature of the enolate geometry is likely the culprit in controlling the stereochemical outcome of the Michael addition.

C. Enantioselective Intramolecular Keto Sulfone Michael Addition

With a working route to a diastereoselective, intramolecular Michael addition, an enantioselective variant was developed (Table 1). Optimum levels of enantioselectivity would be best obtained in non-polar, chlorinated solvents. Proline was initially screened (10) but no reaction in $CHCl_3$ (Entry 1) was observed. Tetrazole catalyst 11, which has also shown enhanced activity compared to proline (10)—particularly in $CHCl_3$, was screened next. Interestingly, no reaction was observed after 3 days at room temperature (Entry 2). Ley and co-workers have recently shown that the addition of a stoichiometric secondary amine base can impact the rate and enantioselectivity. Addition of piperidine (Entry 3) facilitated the desired transformation with a reasonable rate (16 hours)—albeit with a modest enantioselectivity (33% ee). The background reaction (piperidine, $CHCl_3$, rt) gave no product formation—even after prolonged exposure to the reaction conditions. Using $ClCH_2CH_2Cl$ as a solvent led decreased the reaction rate but afforded an increase in enantiomeric excess (Entry 4). Using $CHCl_3$ was quite fortuitous as 1% EtOH is typically added commercially as a stabilizing agent for this solvent. This additive turned out to useful, as using 1% EtOH in $ClCH_2CH_2Cl$ gave a dramatic increase in rate and enantioselectivity (Entry 5).

Proline sulfonamides were tried next as potential organocatalysts. While these ligands have shown promise in certain organocatalyzed reactions, they previously have proven problematic in facilitating Michael addition processes. Proline sulfonamides performed well, providing improved enantiomeric excess (e.e.) at room temperature (Entries 6-8). While the sulfonamide tested, 12-14, proved more soluble than the analogous tetrazole 11, solubility at lower temperatures continued to be problematic. Ultimately, the previously unknown sulfonamide derivative 15 gave greatly improved solubility properties and continued high levels of enantiomeric excess. This sulfonamide 15 is readily accessible from the commercially available para-dodecylsulfonylchloride (16) and Cbz-protected proline 18 in 3 steps (Scheme 16).

Scheme 16

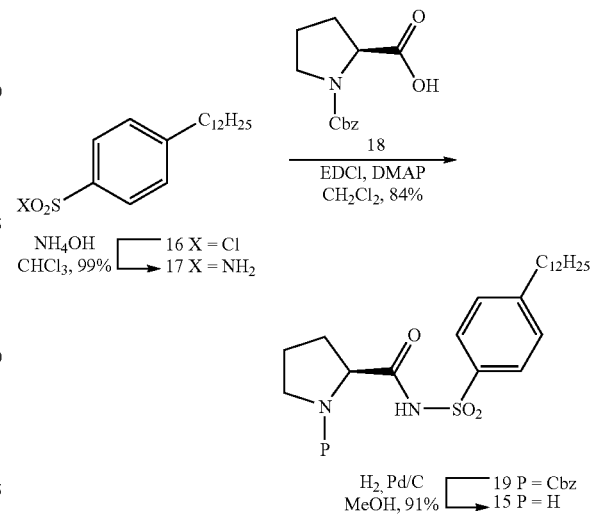

Cooling the reaction to −20° C. with 10 mol % catalyst loading gave the optimum results (Table 1, Entry 10). The absolute configuration of keto sulfone 4 was conclusively established via X-ray crystallographic analysis.

TABLE 1

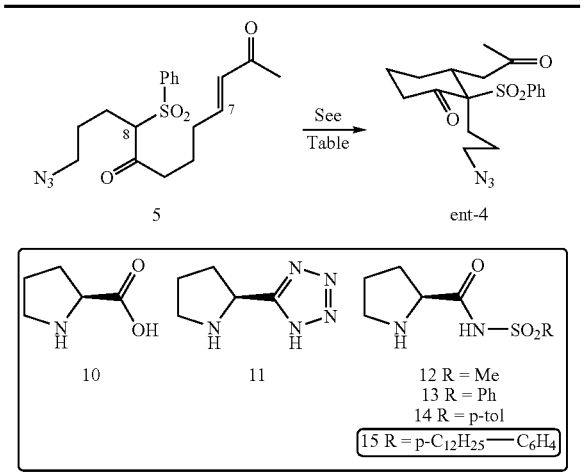

| Entry | Catalyst | Additive | Conditions[a] | % ee[b] (% yield) |
|---|---|---|---|---|
| 1 | 10 (20 mol %) | — | $CHCl_3$[c], rt, 3 d | No reaction |
| 2 | 11 (20 mol %) | — | $CHCl_3$[c], rt 3 d | No reaction |

TABLE 1-continued

| | | | | |
|---|---|---|---|---|
| 3 | 11 (20 mol %) | Piperidine (1 equiv.) | CHCl₃[c], rt 16 h | 33% ee (82%) |
| 4 | 11 (20 mol %) | Piperidine (1 equiv.) | ClCH₂CH₂Cl rt, 3 d | 42% ee (60%) |
| 5 | 11 (20 mol %) | Piperidine (1 equiv.), 1% EtOH | ClCH₂CH₂Cl rt, 16 h | 57% ee (72%) |
| 6 | 12 (20 mol %) | Piperidine (1 equiv.), 1% EtOH | ClCH₂CH₂Cl rt, 16 h | 64% ee (63%) |
| 7 | 13 (20 mol %) | Piperidine (1 equiv.), 1% EtOH | ClCH₂CH₂Cl rt, 16 h | 64% ee (73%) |
| 8 | 14 (20 mol %) | Piperidine (1 equiv.), 1% EtOH | ClCH₂CH₂Cl rt, 16 h | 53% ee (75%) |
| 9 | 15 (20 mol %) | Piperidine (1 equiv.), 1% EtOH | ClCH₂CH₂Cl rt, 16 h | 59% ee (71%) |
| 10 | 15 (10 mol %) | Piperidine (1 equiv.), 1% EtOH | ClCH₂CH₂Cl 0.20 M −20° C., 72 h | 88% ee (75%) |

[a]The reaction was performed at 0.1 M concentration of substrate unless otherwise noted.
[b]The enantiomeric excess was determined by chiral shift NMR [50% Eu(hfc)₃, C₆D₆].
[c]Commercial CHCl₃ stabilized with 1% EtOH was used without further purification.

The scope of the novel organocatalyzed, intramolecular Michael reaction (Table 2) was then explored. This intramolecular, keto sulfone Michael addition has not been reported previously reported using organocatalysis (Entry 1). A great number of different moieties are tolerated on the keto sulfone side arm. The level of diastereoselectivity in each case was excellent (20:1 dr). Additionally, reasonable enantioselectivities were observed (81-88% ee). Finally, the cyclization could be extended to the analogous 5-membered series (Entry 5) with good success (58% yield, 84% ee).

TABLE 2

| Entry | n | R (reaction time) | % ee[a] (% yield, dr) |
|---|---|---|---|
| 1 | 2 | CH₂CH₂CH₂N₃ (72 h) | 88% ee (75%, 20:1 dr) |
| 2 | 2 | Me (5 d) | 83% ee (80%, 20:1 dr) |
| 3 | 2 | CH₂CH₂OTBS (72 h) | 83% ee (76%, 20:1 dr) |
| 4 | 2 | CH₂Ph (72 h) | 81% ee (89%, 20:1 dr) |
| 5 | 1 | Me (6 d) | 84% ee (58%, 20:1 dr) |

[a]The enantiomeric excess was determined by chiral shift NMR [50% Eu(hfc)₃, C₆D₆].

D. Enantioselective Synthesis of Lycopodine Tricyclic Core

Application of this technology to a second generation approach toward lycopodine is shown in Scheme 17.

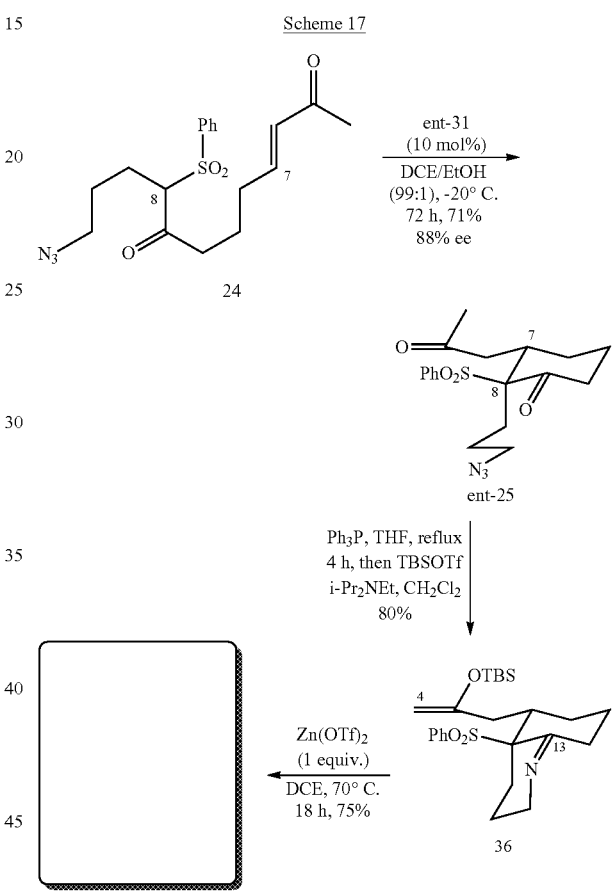

Scheme 17

Using the enantiomeric catalyst ent-15 gave comparable results (71% yield, 88% ee). A single recrystallization provided material that was enantiomerically pure (>95% ee, 60-65% yield). This series was required for the synthesis of the correct enantiomer of lycopodine. Subsequent Staudinger reduction with in situ imine generation followed by silyl enol ether formation provided the cyclization precursor 3. The key tandem 1,3-sulfone shift/Mannich cyclization proceeded in accord with our prior work in the area to yield the tricycle 2. This compound is ideally suited for subsequent functionalization to incorporate the $C_{15}$ methyl moiety and complete a second generation synthesis of lycopodine.

E. Sulfonamide Catalyst for Additional Organocatalyzed Processes

Sulfonamide catalyst 15 can be used for additional organocatalyzed processes. Certain exemplary such processes are illustrated below in Scheme 18.

Scheme 18

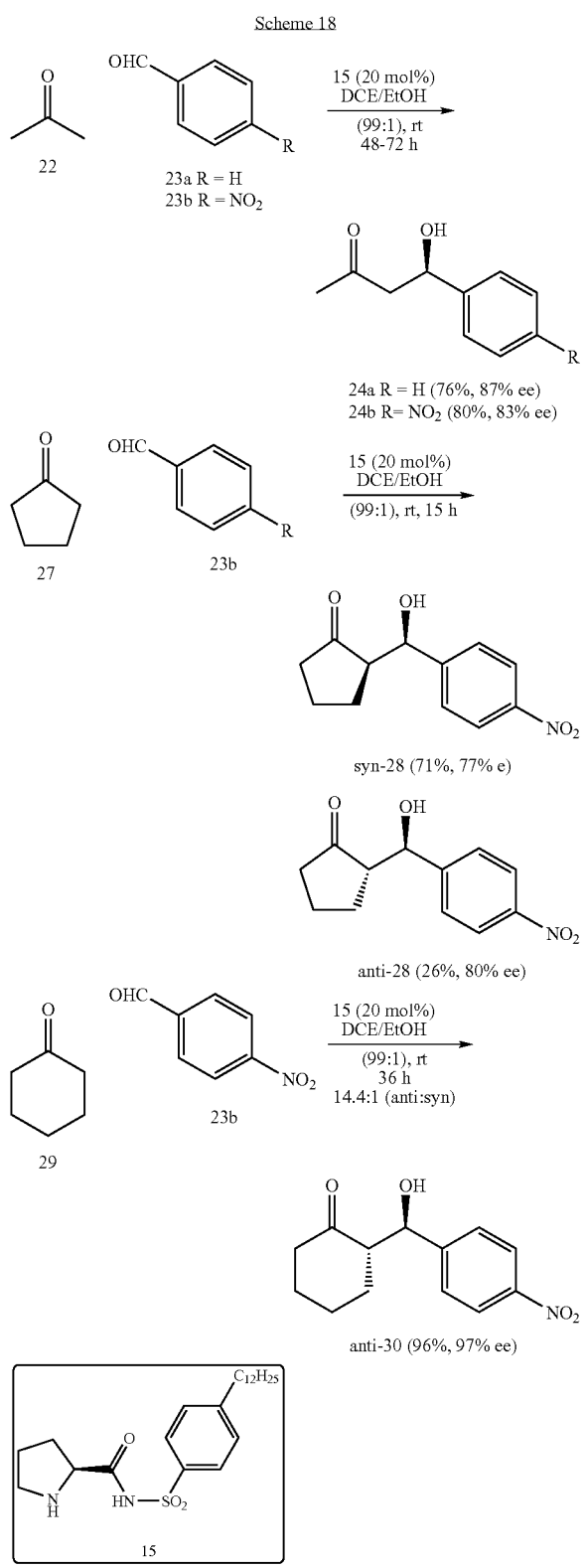

days. Barbas and Arvidsson have shown that proline (10) and the tetrazole 11 can affect this transformation in a more polar solvent (DMSO); however, the levels of enantioselectivity and yields using the sulfonamide catalyst compare favorably with their results.

The reactivity of cyclopentanone (27) and cyclohexanone (29) with aldehyde 23b also was explored. Cyclopentanone (27) nicely provided the aldol adducts syn-28 and anti-28 (2.7:1 syn:anti) in good enantioselectivity (77-80% ee). Once again, this result compared favorably with other catalyst systems including Ley's elegant work with sulfonamides 12 and 13. This reaction showed an unusual preference for the syn-aldol adduct, notably syn-28 in this transformation. Typically, the adduct anti-28 is the predominant product. Finally, cyclohexanone (29) yielded the anti aldol adduct 30 in excellent diastereoselectivity and enantioselectivity (14.4:1 anti:syn, 97% ee, 96% yield).

With reference to Table 3, below, aldol reaction between cyclohexanone (9) and p-nitrobenzaldehyde (10) in methylene chloride using sulfonamide 11 provided the desired product 12 in reasonable ee and dr (Entry 1); however, the yield of this transformation was somewhat disappointing (51%). Use of dichloroethylene (DCE) led to an appreciable rate increase (Entry 2). Further improvement was found using a DCE/EtOH mixed solvent system (99:1) (Entry 3). Alternatively, a single equivalent of water had a similar rate accelerating effect, and with the added benefit of increased diastereoselectivity (Entry 4). The optimum reaction conditions included cooling of the reaction to 4° C. with a 30 h reaction time (Entry 5).

TABLE 3

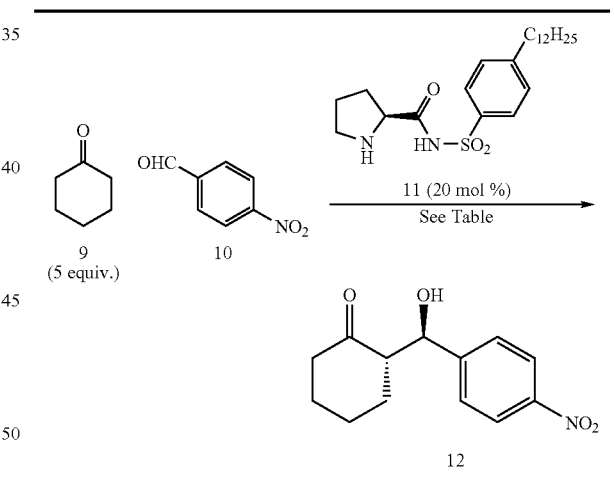

| Entry | Conditions[a] | Additive | % Yield (dr[b]) | % ee[c] |
|---|---|---|---|---|
| 1 | $CH_2Cl_2$, rt, 36 h | — | 51% (15:1) | 97% |
| 2 | $ClCH_2CH_2Cl$, rt, 46 h | — | 92% (12:1) | 95% |
| 3 | $ClCH_2CH_2Cl$, rt, 36 h | EtOH (1%) | 96% (14:1) | 97% |
| 4 | $ClCH_2CH_2Cl$, rt, 36 h | $H_2O$ (1 equiv.) | 96% (36:1) | 97% |
| 5 | $ClCH_2CH_2Cl$, 4° C., 30 h | $H_2O$ (1 equiv.) | 95% (>99:1) | 99% |

[a] All reactions were performed at 1 M.
[b] dr was determined by 1H NMR.
[c] ee was determined by chiral HPLC using Daicel AD column.

Aldol reaction of acetone (22) with benzaldehyde (23a) and p-nitro-benzaldehyde (23b) proceeded in good yields (76-80%) and enantioselectivities (83-87% ee). The analogous transformation in $ClCH_2CH_2Cl/EtOH$ (99:1) with L-proline (10) gave essentially no reaction (<5%) after 3

A direct comparison between sulfonamide 11 and a series of commonly used organocatalysts is provided in Table 4 below. Each of the known catalysts 1-5 facilitated the transformation with good enantioselectivity (98-99% ee); however, only the tetrazole 2 is able to provide a reasonable yield (91%) for this transformation (Entry 2). Unfortunately, the diastereoselectivity with the tetrazole catalyst 2 (7.2:1 dr) is significantly below the sulfonamides (Entries 3-6). In contrast, p-dodecylphenylsulfonamide catalyst 11 provided excellent diastereoselectivity, enantioselectivity and chemical yield for this transformation (Entry 6). It is important to note that the standard proline-based conditions for this transformation (DMSO, rt) have been shown to perform less effectively [65%, 1.7:1 dr, 67% ee (syn), 89% ee (anti)].

TABLE 5

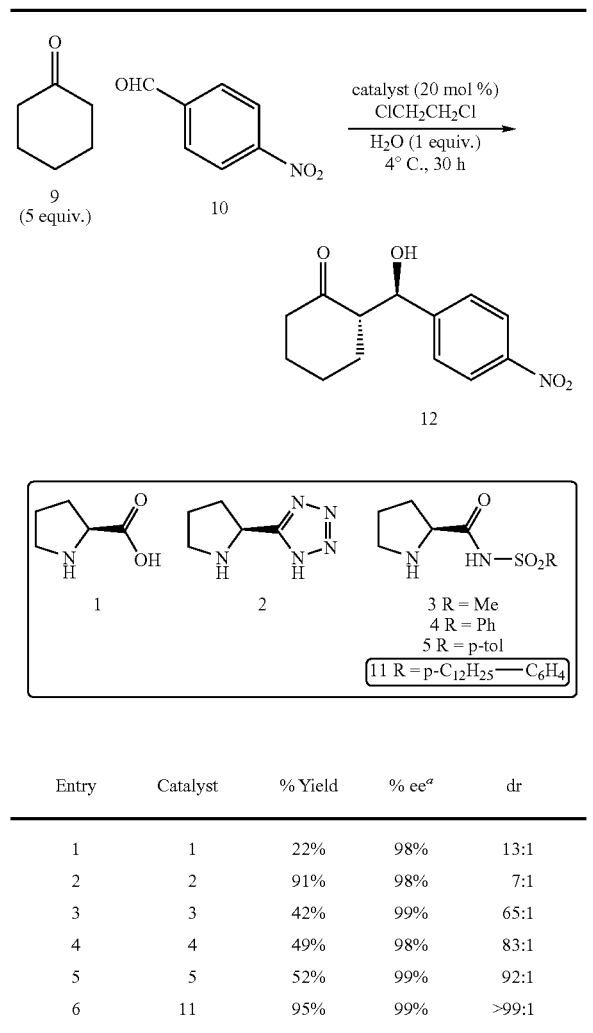

| Entry | Catalyst | % Yield | % ee[a] | dr |
|---|---|---|---|---|
| 1 | 1 | 22% | 98% | 13:1 |
| 2 | 2 | 91% | 98% | 7:1 |
| 3 | 3 | 42% | 99% | 65:1 |
| 4 | 4 | 49% | 98% | 83:1 |
| 5 | 5 | 52% | 99% | 92:1 |
| 6 | 11 | 95% | 99% | >99:1 |

[a]dr was determined by $^1$H NMR.
[b]ee was determined by chiral HPLC using Daicel AD column.

Sulfonamide catalyst 11 was screened for facilitating aldol reactions across a range of substrates (Scheme 19).

Scheme 19

Exploration of Substrate Scope with Sulfonamide Catalyst 11[a]

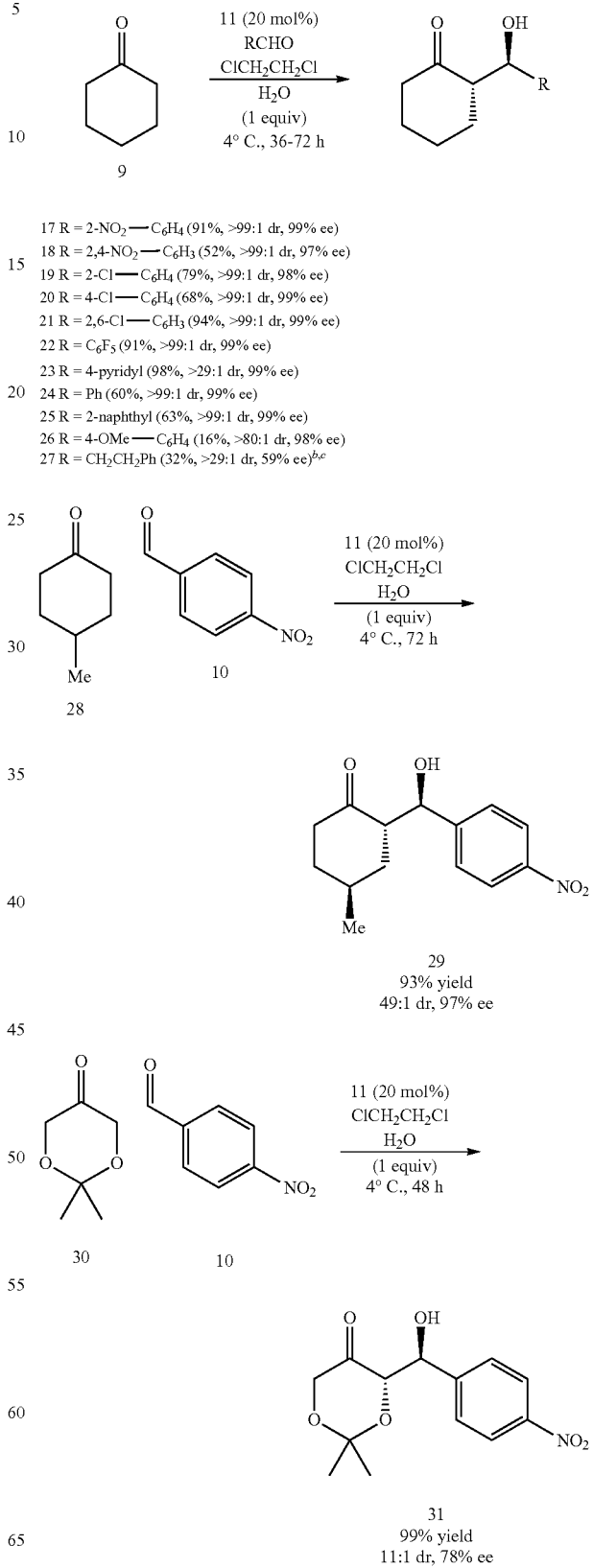

17 R = 2-NO$_2$—C$_6$H$_4$ (91%, >99:1 dr, 99% ee)
18 R = 2,4-NO$_2$—C$_6$H$_3$ (52%, >99:1 dr, 97% ee)
19 R = 2-Cl—C$_6$H$_4$ (79%, >99:1 dr, 98% ee)
20 R = 4-Cl—C$_6$H$_4$ (68%, >99:1 dr, 99% ee)
21 R = 2,6-Cl—C$_6$H$_3$ (94%, >99:1 dr, 99% ee)
22 R = C$_6$F$_5$ (91%, >99:1 dr, 99% ee)
23 R = 4-pyridyl (98%, >29:1 dr, 99% ee)
24 R = Ph (60%, >99:1 dr, 99% ee)
25 R = 2-naphthyl (63%, >99:1 dr, 99% ee)
26 R = 4-OMe—C$_6$H$_4$ (16%, >80:1 dr, 98% ee)
27 R = CH$_2$CH$_2$Ph (32%, >29:1 dr, 59% ee)[b,c]

29
93% yield
49:1 dr, 97% ee 31
99% yield
11:1 dr, 78% ee

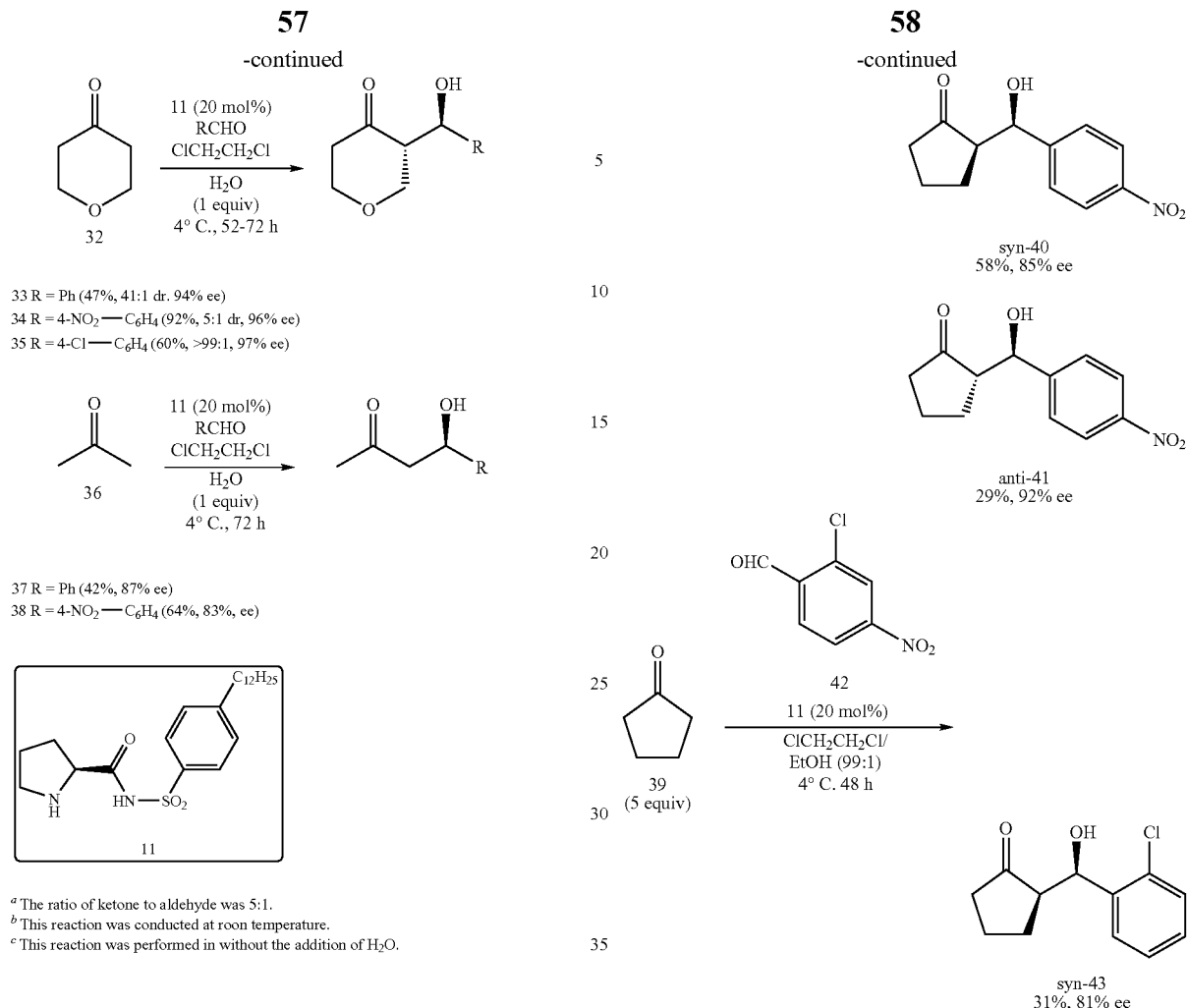

33 R = Ph (47%, 41:1 dr. 94% ee)
34 R = 4-NO₂—C₆H₄ (92%, 5:1 dr, 96% ee)
35 R = 4-Cl—C₆H₄ (60%, >99:1, 97% ee)

37 R = Ph (42%, 87% ee)
38 R = 4-NO₂—C₆H₄ (64%, 83%, ee)

*a* The ratio of ketone to aldehyde was 5:1.
*b* This reaction was conducted at roon temperature.
*c* This reaction was performed in without the addition of H₂O.

Both aromatic and aliphatic aldol adducts 17-27 derived from their corresponding aldehydes were made. Additionally, 4-methylcyclohexanone (28) proved to be a competent substrate for these conditions. Ketones containing a-heteroatoms [the dihydroxyacetone equivalent 30 and pyran-4-one (32)] also were effective in this transformation to provide aldol adducts 33 and 33-35. This transformation is effective with acetone (36) to provide adducts 37-38 in reasonable enantioselectivities.

Extension to cyclopentanone (39) revealed some interesting results (Scheme 20).

Select Examples with Cyclopentanone

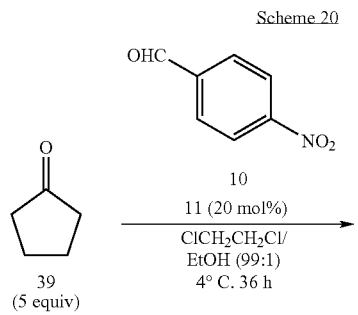

Scheme 20

Optimized one equivalent of water conditions gave poor diasteroselectivity in the transformation [94%, 1.35:1 (40:41), 87-95% ee]. In contrast, the DCE/EtOH (99:1) solvent system gave improved levels of diastereoselectivity favoring the syn product 40. Limited prior examples of syn selective aldol reactions with cyclopentanone have been reported. Interestingly, slightly improved levels of syn selectivity are observed at room temperature (syn-40: 71%, 77% ee; anti-41: 26%, 80% ee), but with reduced enantioselectivity.

Aldol reactions with catalyst loading as low as 2 mol % have been performed if the reaction is performed neat (Scheme 21).

Scheme 21

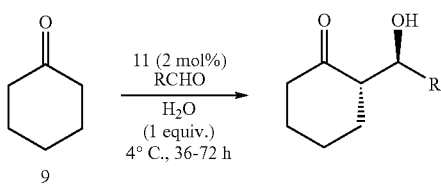

12 R = 4-NO$_2$—C$_6$H$_4$ (96%, >99:1. 96% ee)
18 R = 2-Cl—C$_6$H$_4$ (67%, >99:1. 96% ee)
19 R = 4-Cl—C$_6$H$_4$ (49%, >99:1 dr, 92% ee)
22 R = 4-pyridyl (91%, 7:1 dr, 91% ee)
23 R = Ph (75%, 55:1 dr, 99% ee)

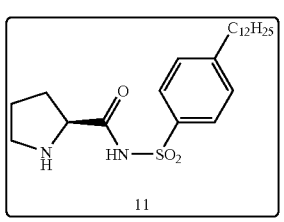

[a]The ratio of ketone to aldehyde was 2:1.

Under these conditions, a single equivalent of water is added for improved reaction rate and selectivity. As seen in the previous examples, these transformations generally proceeded in good to excellent diastereoselectivity and enantioselectivity.

The practicality of this process has been demonstrated by preparing one mole of the aldol adduct 12 (Scheme 22) using a 500 mL round bottom flask in excellent diastereoselectivity and enantioselectivity (88% yield, 97% ee, 98:1 dr). Over 50% of the catalyst 11 was also recovered via a single crystallization.

Scheme 22

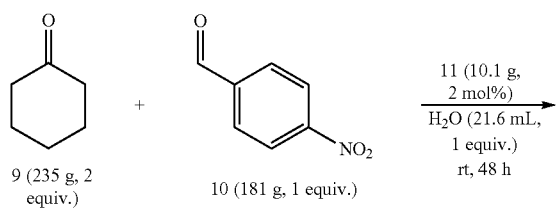

Based on this disclosure, highly practical and readily available proline mimetic catalysts have been developed. The sulfonamides can be prepared from commercially available and inexpensive D- or L-proline. This important attribute is not shared by 4-trans-hydroxyproline derivatives where only one of the two enantiomers is commercially available at a reasonable price. Disclosed catalysts have been shown to be effective at facilitating a range of aldol reactions with some of the highest levels diastereoselectivity and enantioselectivity reported for many of these transformations.

Mannich reactions also can be accomplished using disclosed embodiments of the present invention. In general, a Mannich reaction is a reaction between a carbonyl-bearing compound and a nitrogen bearing compound, particularly imines. The final product is a β-amino-carbonyl compound. Reactions between aldimines and α-methylene carbonyls also are considered Mannich reactions because amines and aldehydes form imines. Various exemplary Mannich reactions that can be catalyzed using disclosed embodiments of the present catalyst are provided below in Scheme 23.

Scheme 23

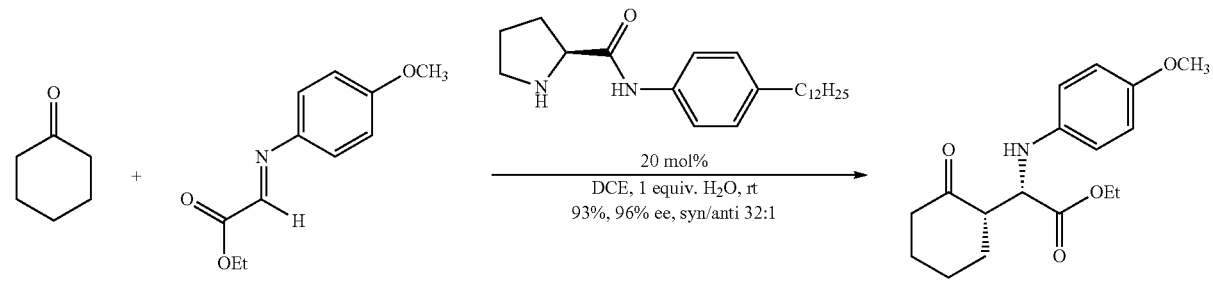

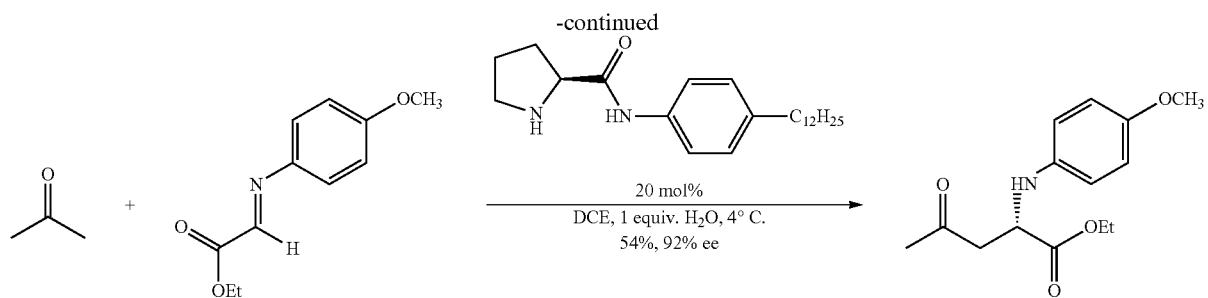
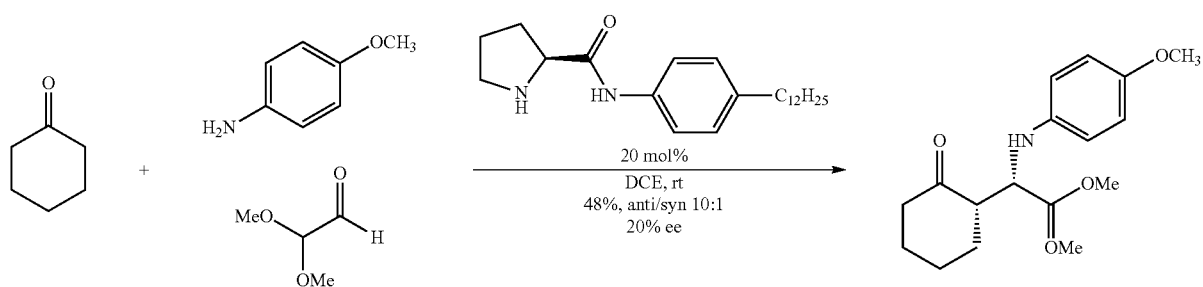
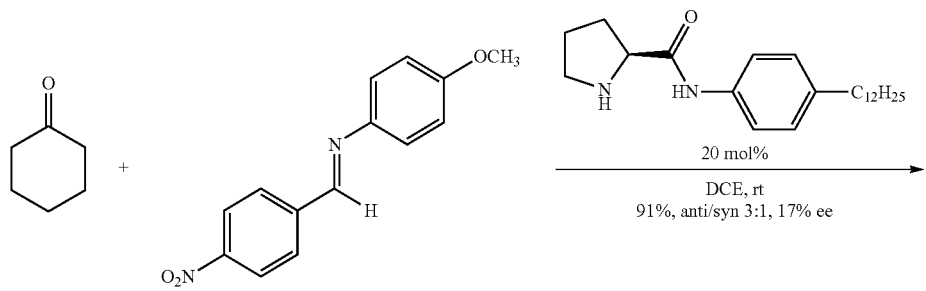
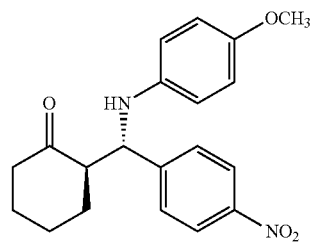
F. Formation of Nitrogen-Containing [2.2.2]-Bicyclic Scaffolds
Sulfonamide catalyst 15 can be used to make nitrogen-containing bicycles, particularly [2.2.2]-bicycles. Certain exemplary such processes are illustrated below in Scheme 24.
Scheme 24

-continued

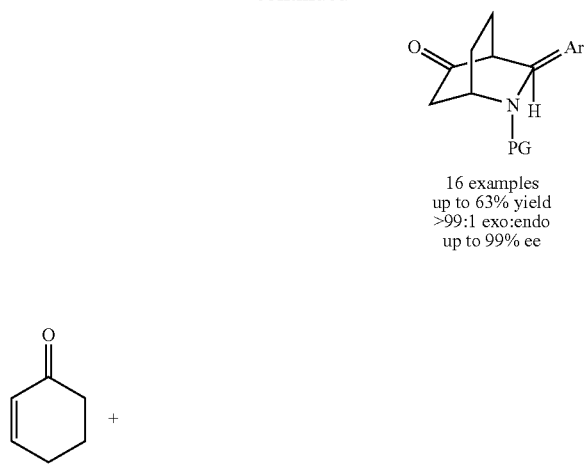

16 examples
up to 63% yield
>99:1 exo:endo
up to 99% ee

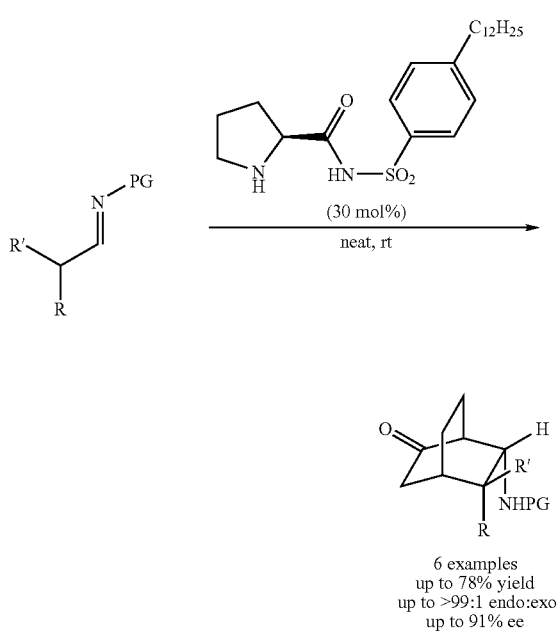

6 examples
up to 78% yield
up to >99:1 endo:exo
up to 91% ee

The scope of this reaction on a series of aromatic imines was explored, as illustrated in Table 5, below. In general, electron-withdrawing groups on the aromatic imine were well-tolerated; however, ortho-substitution did appear to dramatically reduce the reaction rate (Entry b). Resonance electron donating groups also have a negative impact on the reaction yield and enantioselectivity (Entry 0 presumably due to the reduced electrophilicity of the imine. More electron neutral examples (Entries e and i-k) performed well. The absolute configuration of 6a was established through X-ray crystallographic analysis. While the yields for many of these transformations are modest in initial attempts, the inexpensive starting materials and the highly functionalized products demonstrate the value of this protocol. Furthermore, all of these reactions are performed in the absence of solvent because of the favorable solubility profile of 15—further adding to the scalability and practicality of this chemistry.

TABLE 5

| Entry | Ar | PG | Yield | ee[a] | exo:endo[b] |
|---|---|---|---|---|---|
| a | 3-Cl—$C_6H_4$— | PMP | 54% | 99 | >99:1 |
| b | 2-Cl—$C_6H_4$— | PMP | 19% | 96 | >99:1 |
| c | 4-pyridyl- | PMP | 52% | 99 | >99:1 |
| d | 4-$CF_3$—$C_6H_4$— | PMP | 54% | 99 | >99:1 |
| e | $C_6H_5$— | PMP | 51% | 91 | >99:1 |
| f | 4-MeO—$C_6H_4$— | PMP | 25% | 80 | >99:1 |
| g | 3-Cl—$C_6H_4$— | DMP[d] | 58% | 98 | >99:1 |
| h | 4-$CF_3$—$C_6H_4$— | DMP | 49% | 99 | >99:1 |
| i | 4-Br—$C_6H_4$— | DMP | 53% | 99 | >99:1 |
| j | $C_6H_5$— | DMP | 61% | 94 | >99:1 |
| k | 4-Me—$C_6H_4$— | DMP | 53% | 92 | >99:1 |

[a]Ee was determined by chiral HPLC analysis.
[b]Exo:endo ratios were determined by $^1$H NMR analysis.
[c]PMP is defined as 4-MeO—$C_6H_4$.
[d]DMP is defined as 3,4-$(MeO)_2$—$C_6H_3$.

G. Formation of All-Carbon-Bicycles

Sulfonamide catalyst 15 can be used for the construction of all-carbon bicycles, such as [2.2.2]-bicycles. Certain exemplary such processes are illustrated below in Scheme 25. For example, treatment of imine 12a under the standard conditions did not result in the formation of the corresponding azabicyclo-[2.2.2]-octane product. Instead, the all-carbon bicyclo-[2.2.2]-octane variant 13a was produced. The use of benzyl-protected imine 12 dramatically improved the rate and overall yield of the process; however, reduced levels of diastereoselectivity and enantioselectivity were observed. The 4-chloro product 13c allowed for the determination of the absolute configuration in this transformation via X-ray crystallographic analysis. Use of the isopropyl imine 14 cleanly provided the gem-dimethyl product 15. The analogous diethyl product 17 could also be prepared. Reaction of imine 18 generated bicycle 19, which contains four contiguous stereogenic centers—including an all-carbon quaternary center. The relative stereochemistry in compound 20 was assigned via a nOe between the quaternary center methyl group and the endo a-keto hydrogen.

Scheme 25

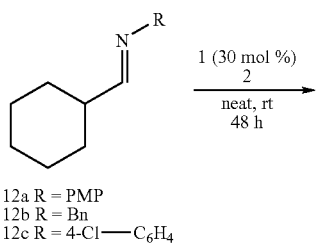

12a R = PMP
12b R = Bn
12c R = 4-Cl—C₆H₄

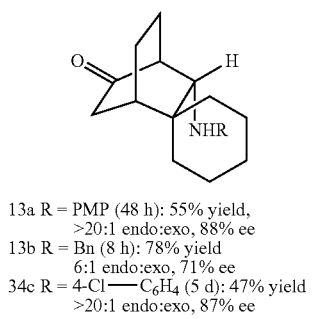

13a R = PMP (48 h): 55% yield,
  >20:1 endo:exo, 88% ee
13b R = Bn (8 h): 78% yield
  6:1 endo:exo, 71% ee
34c R = 4-Cl—C₆H₄ (5 d): 47% yield
  >20:1 endo:exo, 87% ee

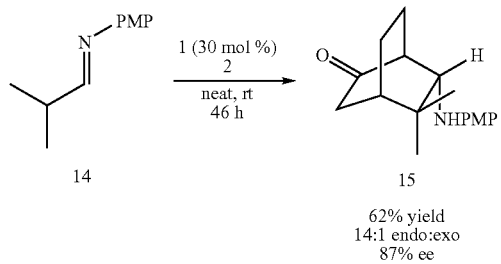

14 → 15
62% yield
14:1 endo:exo
87% ee

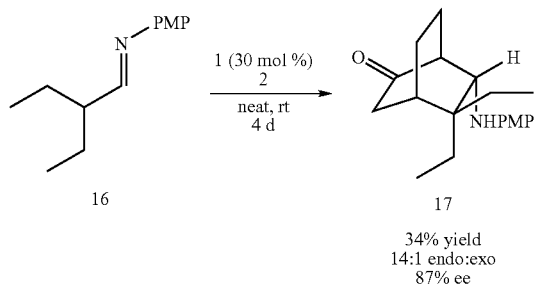

16 → 17
34% yield
14:1 endo:exo
87% ee

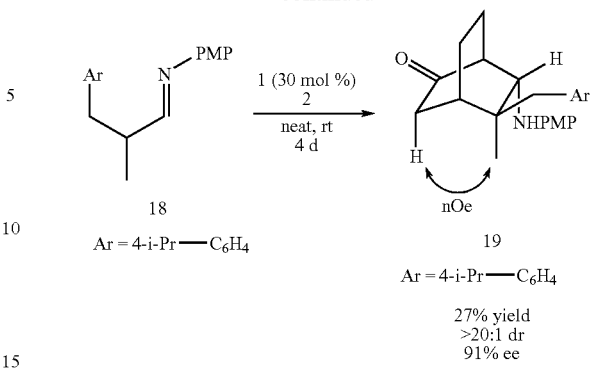

18 → 19
Ar = 4-i-Pr—C₆H₄

27% yield
>20:1 dr
91% ee

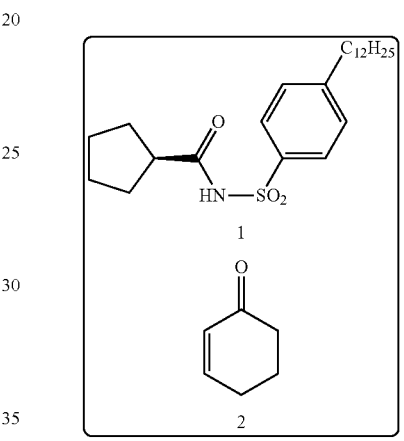

[a]Ee was determined by chiral HPLC analysis. Exo:endo ratios were determined by ¹H NMR analysis Proline sulfonamide catalyst 15 can also facilitate multi-component couplings. Certain embodiments of this reaction are illustrated in Table 6. The present invention can facilitate the reaction between aldehyde 13, 2-cyclohexenone (3) and an amine. The use of DCE as the solvent (Entry a) proved to generate the desired [2.2.2]bicycle 14a in good levels of enantioselectivity and diastereoselectivity. In contrast, use of p-methoxyaniline yielded a noticeable drop in chemical yield of 14b and rate of reaction (Entry b). Substitution of DCE for toluene led to comparable levels of stereoselectivity with slightly improved chemical yield. Interestingly, addition of molecular sieves had a substantial impact on the reaction performance. This transformation generates an equivalent of water during initial enamine formation. In the case of DCE (Entry d), reduced chemical yield (31%) and enantioselectivity were observed. Using molecular sieves with toluene as the solvent (Entry e) also caused a significant reduction in the chemical efficiency of the reaction (48%). Ultimately, the use of toluene without molecular sieves with a reaction temperature of 4° C. proved to be the optimum conditions (Entry 0 for those conditions tried to date. This transformation generates four contiguous stereogenic centers including an all-carbon quaternary center. Compound 14 contains the central bicyclic core and benzylic quaternary center of kopsonoline (2).

TABLE 6

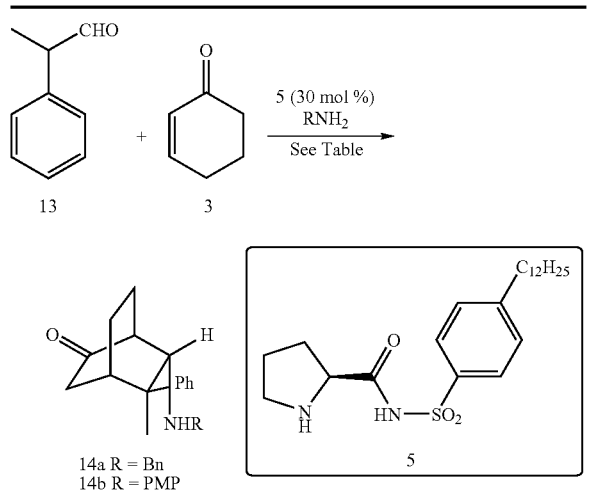

| Entry | R | Conditions | Yield | er$^a$ (dr)$^b$ |
|---|---|---|---|---|
| a | Bn | DCE, 1 d, rt | 71% | 92.2:7.8 (>20:1) |
| b | PMP | DCE, 3 d, rt | 53% | 98.3:1.7 (>20:1) |

TABLE 6-continued

| Entry | R | Conditions | Yield | er$^a$ (dr)$^b$ |
|---|---|---|---|---|
| c | Bn | PhMe, 1 d, rt | 76% | 90.4:9.6 (>20:1) |
| d | Bn | DCE, 2 d, rt, mol. sieves | 31% | 79.9:20.1 (>20:1) |
| e | Bn | PhMe, 3 d, rt, mol. sieves | 48% | 96.0:4.0 (>20:1) |
| f | Bn | PhMe, 3 d, 4° C. | 72% | 93.3:6.7 (>20:1) |

$^a$Determined by chiral HPLC analysis.
$^b$Determined by $^1$H NMR analysis.

The scope of the aldehyde component 15 with the optimized conditions is illustrated in Table 7. A range of electron-donating and electron-withdrawing groups was tolerated on the aromatic ring (Entries a-e). Increasing the electron-withdrawing nature of the arene appeared to lead to a modest increase in enantioselectivity. Using alternate groups at R$_1$ was also feasible albeit with slightly reduced enantioselectivity (Entries f-g). More sterically congested aldehydes [e.g. 2-(o,o-dichlorophenyl)-propanal] were unreactive, at least under the reaction conditions tested to date. Alternate amines could also be used in this transformation—with propargyl amine giving particularly useful levels of stereoselectivity and chemical yield (Entry i).

TABLE 7

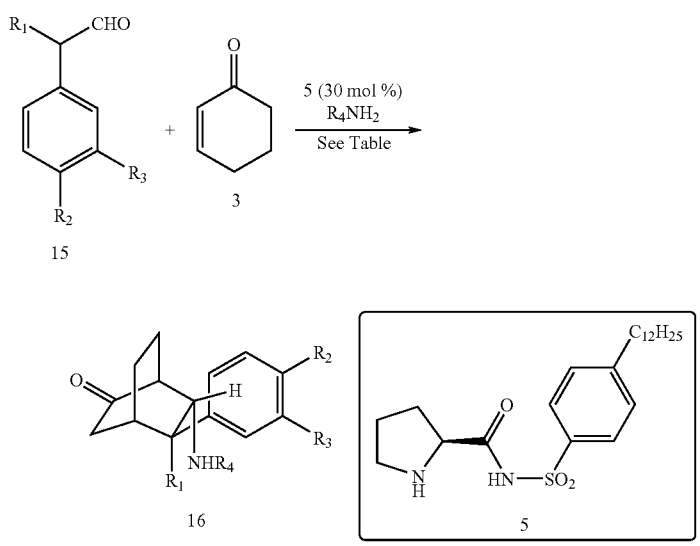

| Entry | R$_1$ | R$_2$ | R$_3$ | R$_4$ | Conditions | Yield | er$^a$ (dr)$^b$ |
|---|---|---|---|---|---|---|---|
| a | Me | Me | H | Bn | PhMe, 4° C., 3 d | 65% | 92.2:7.8 (>20:1) |
| b | Me | Br | H | Bn | PhMe, 4° C., 5 d | 52% | 94.6:5.4 (>20:1) |
| c | Me | Br | H | PMP | DCE, rt, 3 d | 53% | 95.4:4.6 (>20:1) |
| d | Me | Cl | H | Bn | PhMe, 4° C., 3 d | 69% | 94.3:5.7 (>20:1) |
| e | Me | Cl | Cl | Bn | PhMe, 4° C., 5 d | 53% | 95.8:4.2 (>20:1) |
| f | allyl | Br | H | PMP | DCE, rt, 3 d | 31% | 90.6:9.4 (>20:1) |
| g$^c$ | allyl | Br | H | Bn | PhMe, 4° C., 6 d | 46% | 88.0:12.0 (>20:1) |
| h$^c$ | Me | H | H | allyl | PhMe, 4° C., 3 d | 66% | 88.8:11.2 (>20:1) |
| i$^c$ | Me | H | H | propargyl | PhMe, 4° C., 3 d | 63% | 92.8:7.2 (>20:1) |

$^a$Determined by chiral HPLC analysis.
$^b$Determined by $^1$H NMR analysis.
$^c$Reaction was performed at room temperature.

A person of ordinary skill in the art will recognize that the sulfonamide catalyst 15 can also be used to produce all-carbon bicyclic scaffolds, particularly [2.2.2]-bicyclic scaffolds, using α,α-dialkylsubstituted aldehydes. One embodiment of this approach is illustrated in Scheme 26.

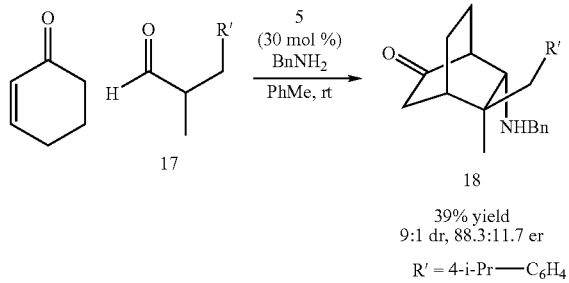

Scheme 26

39% yield
9:1 dr, 88.3:11.7 er
R' = 4-i-Pr—C₆H₄

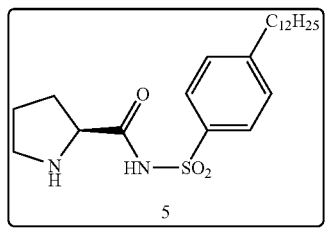

5

H. Formation of All-Carbon, Quaternary-Center-Containing Cyclohexenones

Disclosed embodiments of the present invention can also be used to form all-carbon, quaternary-center-containing cyclohexenones. Sulfonamide catalyst 15 was tested in this reaction, as well as other known catalysts, such as proline, prolinol and its silyl derivative, and tetrazole. Using the p-dodecylester modified sulfonamide catalyst 25 provided optimum results, compared to all other catalysts previously described. This catalyst can be readily prepared from inexpensive starting materials, illustrated in Scheme 27.

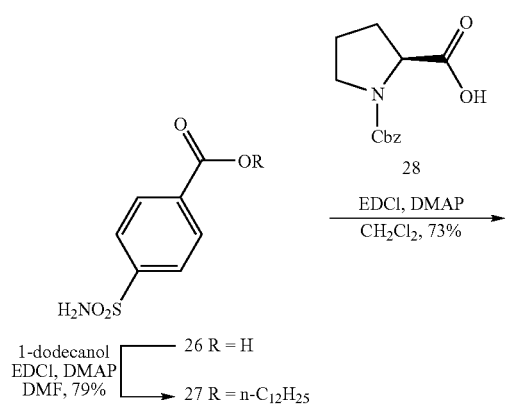

Scheme 27

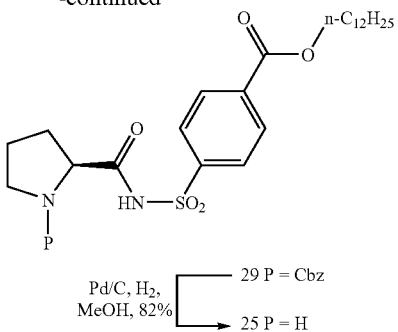

Pd/C, H₂, MeOH, 82%
29 P = Cbz
25 P = H

The formation of all-carbon, quaternary cyclohexenones is shown in Table 8. 3-penten-2-one (18) was selected as the initial Michael acceptor for the transformation. Using benzyl amine as an additive in the presence of catalyst 17 in toluene provided reasonable reactivity (Entry a). Under these conditions, it appears the initial Mannich addition product (e.g. 19) undergoes rapid elimination to generate the corresponding enone 20. For the reaction conditions tested, no product was observed in the absence of benzyl amine. The presence of molecular sieves in the reaction mixture had a beneficial effect on the reaction profile—leading to increased chemical yield and enantioselectivity (Entry b). This result is counter to what is often observed in organocatalyzed processes where water can have a beneficial impact on the reaction. Without being limited to a particular theory of operation, one possible explanation for this difference may be that water disrupts a presumed hydrogen bonding interaction between the catalyst and enamine nucleophile as shown in tentative transition state model 21. In addition, the sequestering of water by molecular sieves complicates any mechanism for catalyst turnover. Melchiorre and co-workers have successfully utilized fluorobenzoic acid additives with organocatalysts in a range of chemical transformations. Unfortunately, addition of 4-fluorobenzoic acid (20 mol %) led to a significant decrease in enantioselectivity (Entry c). Using several other standard orgnaocatalysts also proved ineffective for transformation (Entries d-g). Both proline (3) and tetrazole 22 gave reduced chemical yields and lower enantioselectivities (Entries d and e). The prolinol catalyst 23 and its silyl derivative 24 were ineffective at generating the desired product (Entries f and g). Chlorinated solvents can prove advantageous to reaction selectivity (Entry h). Using the p-dodecylester sulfonamide catalyst 25 proved more effective at accomplishing this transformation (Entry i). The presence of molecular sieves continued to enhance the enantioselectivity of this transformation (Entry j). This one-step protocol (Entry i) constitutes the first enantioselective synthesis of compound 20 a natural product that has been isolated from nine needles by Weichun and co-workers.

TABLE 8

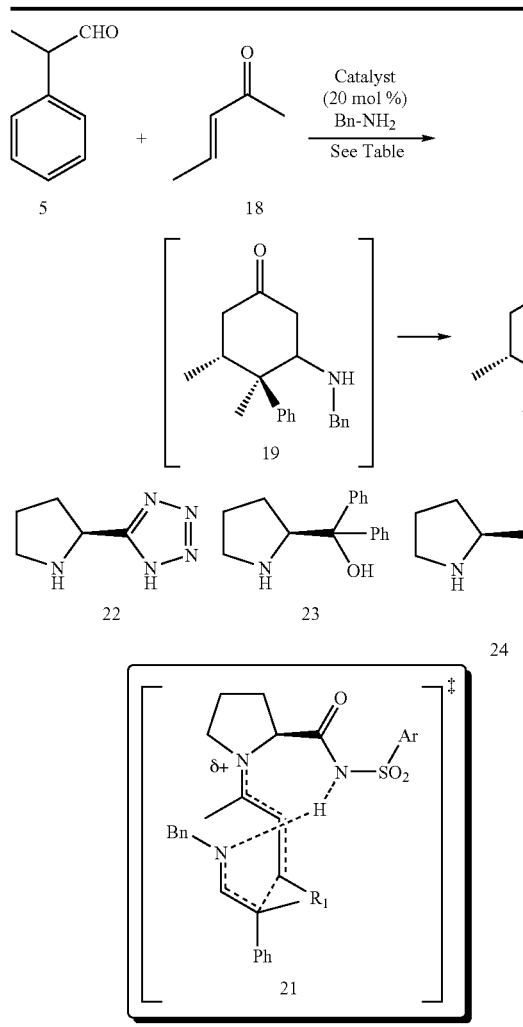

| Entry | Conditions | Catalyst | Yield | er[a] (dr)[b] |
|---|---|---|---|---|
| a | PhMe, 24 h, rt | 17 | 30% | 77:23 (>20:1) |
| b | PhMe, 36 h, rt, mol. sieves C₆H₄CO₂H | 17 | 66% | 91:9 (>20:1) |

TABLE 8-continued

| Entry | Conditions | Catalyst | Yield | er[a] (dr)[b] |
|---|---|---|---|---|
| c | 4-F— (20 mol %), PhMe, 20 h, rt, mol. sieves | 17 | 60% | 76.5:23.5 (>20:1) |
| d | PhMe, 60 h, rt, mol. sieves | 3 | 32% | 84.5:15.5 (>20:1) |
| e | PhMe, 60 h, rt, mol. sieves | 22 | 11% | 62:38 (20:1) |
| f | PhMe, 60 h, rt, mol. sieves | 23 | Trace | — |
| g | PhMe, 60 h, rt, mol. sieves | 24 | Trace | — |
| h | PhMe, 60 h, rt, mol. sieves | 25 | 68% | 92.5:7.5 (18:1) |
| i | DCE, 60 h, rt, mol. sieves | 25 | 75% | 94.5:5.5 (>20:1) |
| j | DCE, 48 h, rt | 25 | 66% | 85.5:14.5 (>20:1) |
| k | CH₂Cl₂, 60 h, rt, mol. sieves | 25 | 77% | 93.5:6.5 (20:1) |

[a]Determined by chiral HPLC analysis.
[b]Ratios were determined by ¹H NMR analysis.

The p-dodecylester sulfonamide catalyst 25 can be used to construct all-carbon, quaternary-center-containing cyclohexenones. Certain exemplary such processes are illustrated below in Table 9. A variety of aldehyde components can be utilized in this transformation. X-ray crystallographic analysis of product 35b established absolute configuration. One limitation was i-propyl substituted enone 31 which was unreactive under the reaction conditions (Entry g).

TABLE 9

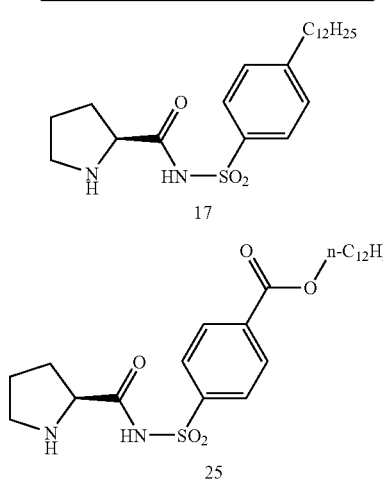

| Entry | Enone | Aldehyde | Time | Yield | er[a] (dr)[b] |
|---|---|---|---|---|---|
| a | 18 | 32 | 60 h | 56% | 94.5:5.5 (>20:1) |

TABLE 9-continued

| | | | | | |
|---|---|---|---|---|---|
| b | 18 | 33 | 60 h | 54% | 93.5:6.5 (>20:1) |
| c | 18 | 34 | 60 h | 52% | 95:5 (>20:1) |
| d | 24 | 5 | 72 h | 84% | 96:4 (>20:1) |
| e | 30 | 32 | 72 h | 76% | 91.5:8.5 (>20:1) |
| f | 30 | 33 | 72 h | 68% | 95:5 (>20:1) |
| g | 31 | 5 | 60 h | 0% | — |

[a]Determined by chiral HPLC analysis.
[b]Determined by $^1$H NMR analysis.
[c]N.D. = not determined.

Certain embodiments of the invention include using para substituted alkyl ester catalysts, such as p-dodecylester sulfonamide catalyst 25, for the construction of all-carbon quaternary centers utilizing a range of alternate substituents on the β-position of the enone starting material. Certain exemplary processes are illustrated below in Scheme 28. Aromatic moieties were tolerated—providing the desired products 38 and 39 in good to excellent enantioselectivity. A range of aliphatic substituents can be accommodated as shown with enones 40-43, 48-52 and 58-59. In the majority of cases, good chemical yield and excellent stereoseroselectivity were observed. Alkenes, tosylates, sulfones, silyl and benzyl ethers as well as phthalamide nitrogens, were all tolerated under the reaction conditions. Interestingly, the annulation reaction to form cyclohexenone 55 was performed in the dark to suppress an unwanted intramolecular [3+2] cycloaddition which consumed enone 50. These processes involve intermolecular formation of all-carbon quaternary centers; however, a person of ordinary skill in the art will appreciate that the present invention can be used for the intramolecular formation of all-carbon quaternary centers.

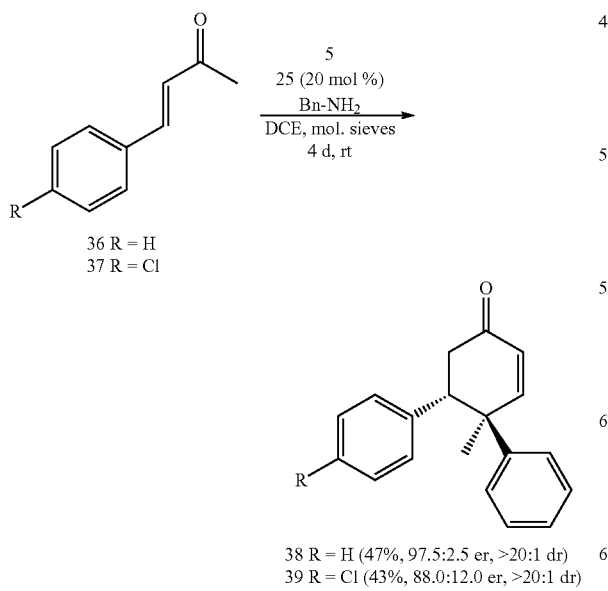

Scheme 28

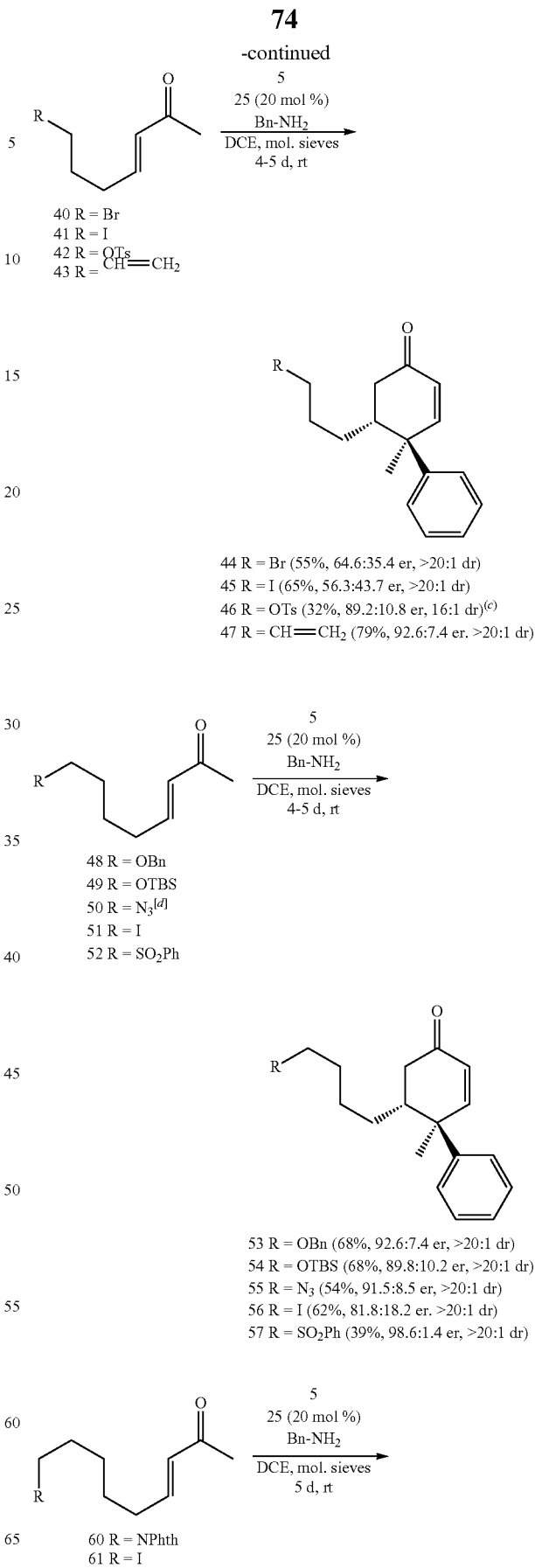

-continued

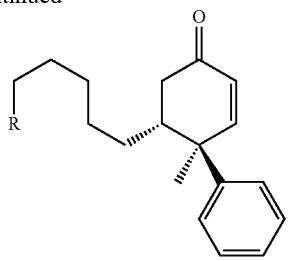

62 R = NPhth (61%, 96.4:3.6 er, 8:1 dr)
63 R = I (55%, 92.9:7.1 er, 15:1)

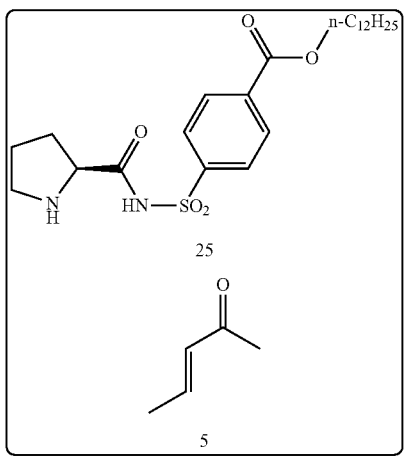

I. Enantioselective Synthesis of Quaternary-Center Containing Indolines

An additional embodiment of the present invention that uses alkyl ester catalysts, such as p-dodecylester sulfonamide catalyst 25, is the formation of enantiopure, quaternary-center containing indoline scaffolds, illustrated in Scheme 29. Current applications of the invention have demonstrated that the initial annulation with an ortho-chloride arene is possible in an unoptimized 32% yield (>20:1 dr). The enantioselectivity of this process has not yet been determined, but it is expected to be comparable to other examples of this transformation, illustrated in Table 9. Buchwald, Hartwig and others have nicely demonstrated the ability to couple aryl chlorides and bromides with amines under a range of conditions in "Evolution of a Fourth Generation Catalyst for the Amination and Thioetherification of Aryl Halides," *Acc. Chem. Res.* 2008, 41, 1534-1544 and "Biaryl Phosphane Ligans in Palladium-Catalyzed Amination" *Angew. Chem. Int. Ed* 2008, 47, 6338-6361, which are incorporated herein by reference. Additionally, Buchwald himself has demonstrated a tandem enolate γ-arylation of β,γ-unsaturated ketones Michael addition sequence to access indolines similar to 24.6, but lacking the $R_1$ substituent in "Palladium-Catalyzed γ-Arylation of β,γ-Unsaturated Ketones: Application to a One-Pot Synthesis of Tricyclic Indolines," *Angew. Chem. Int. Ed.* 2008, 47, 177-180, which is incorporated herein by reference. Certain disclosed embodiments of the present invention involve the synthesis of indolines that contain a $R_1$ substituent. The present invention will also addresses challenges associated with this transformation, such as the use of base with cyclohexenone substrates, enamine/imine formation, as well as intermolecular Michael addition by the amine.

Scheme 29

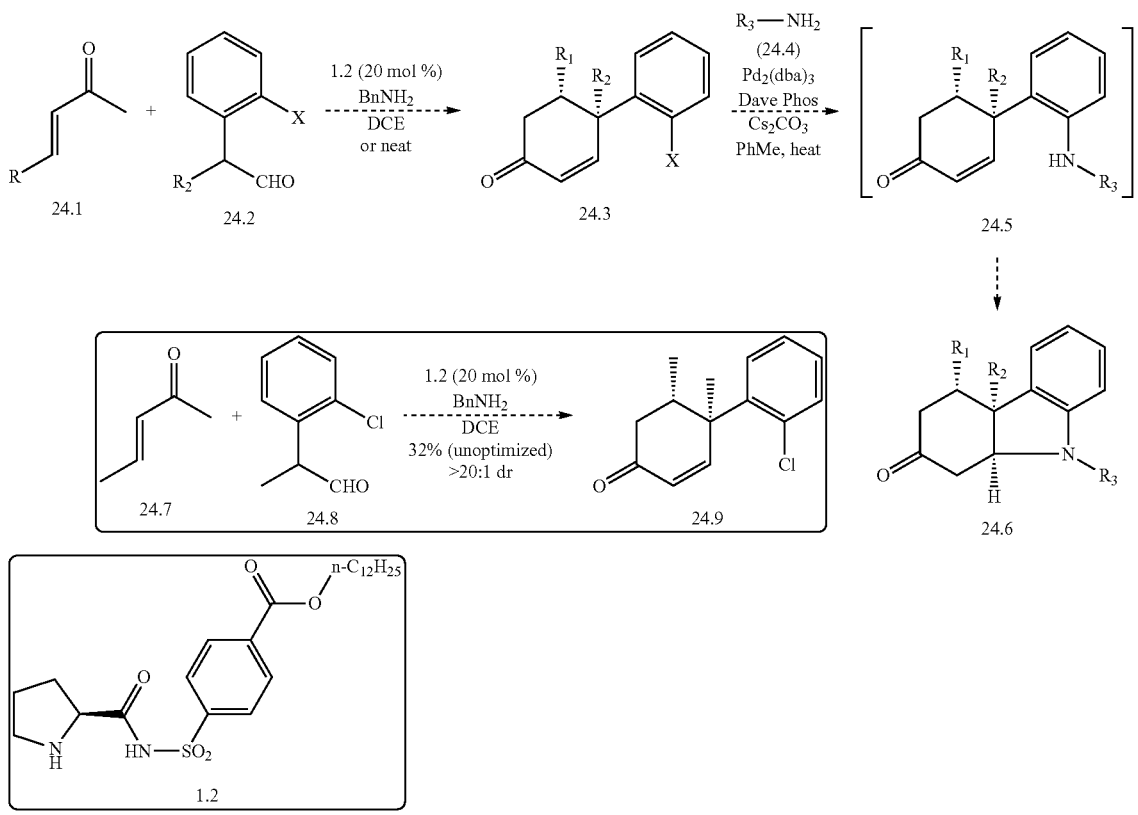

Heterocylic derivatives of disclosed catalysts are also possible. Scheme 30 illustrates the synthesis of a heteroatom-containing sulfonamide catalyst 27. This catalyst can be made by reacting a protected proline, such as a Cbz-protected proline 15, and a pyridine-containing sulfonamide moiety 2. Deprotection of the protected sulfonamide 4 provides the pyridine-containing sulfonamide catalyst 27

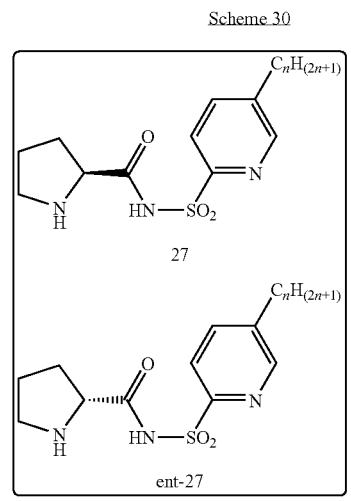

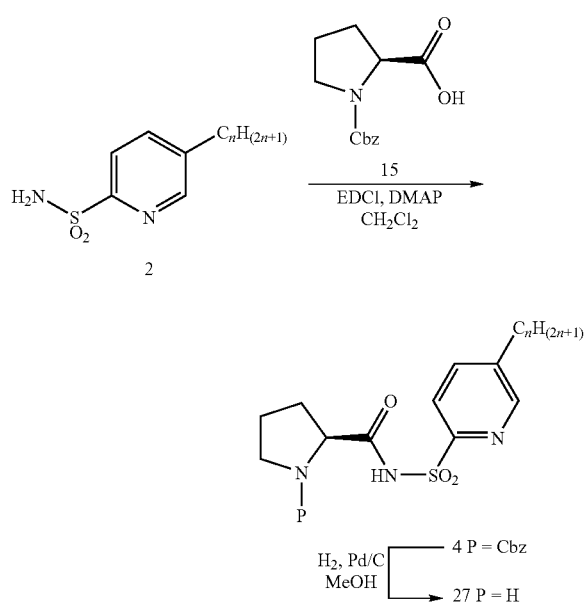

V. Amino Acid Derivatives

The preceding portions of this disclosure focused on sulfonamide catalysts based on the proline amino acid. However, a person of ordinary skill in the art will appreciate that amino acids other than proline also can be used to make sulfonamide-based catalysts within the scope of the present invention. All prior statements concerning the exemplary proline-based sulfonamide organocatalysts apply to other amino acid sulfonamides as well, to the extent such statements are not contradictory to express statements made in this section. Such amino acid organocatalysts typically have a formula

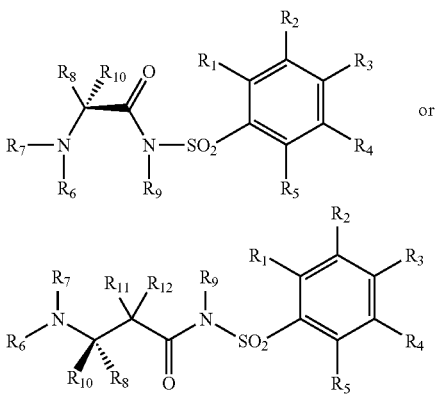

With reference to these general formulas, $R_1$-$R_5$ are independently selected from aliphatic, substituted aliphatic, alkoxy, substituted alkoxy, amine, substituted amine, amide, substituted amide, aryl, substituted aryl, aryl alkyl, substituted aryl alkyl, cyclic, substituted cyclic, ester, ether, formyl, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, polymer-bound support, such as a polymer-bound ester, or are bonded together to form a ring, at least one of such substituents comprises 4 or more carbon atoms, at least one of $R_1$ and $R_5$ is hydrogen or halogen, and if $R_1$-$R_5$ is aryl, the aryl group is directly bonded to one of $R_1$-$R_5$. $R_6$-$R_7$ independently are selected from aliphatic and hydrogen, and at least one of $R_6$-$R_7$ preferably is hydrogen. $R_8$ is selected from substituents defining naturally occurring amino acids or their derivatives. $R_9$-$R_{10}$ are independently aliphatic or hydrogen, and at least one of $R_9$-$R_{10}$ preferably is hydrogen. $R_{11}$ and $R_{12}$ are independently selected from aliphatic, substituted aliphatic, alkoxy, substituted alkoxy, amine, substituted amine, amide, substituted amide, aryl, substituted aryl, aryl alkyl, substituted aryl alkyl, cyclic, substituted cyclic, ester, ether, formyl, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, or are atoms in a ring.

The following Scheme 31 illustrates that alpha amino acids generally can be used to make sulfonamide-based catalysts according to the present invention.

Scheme 31

Generalized example for using alpha-amino acid derivatives:

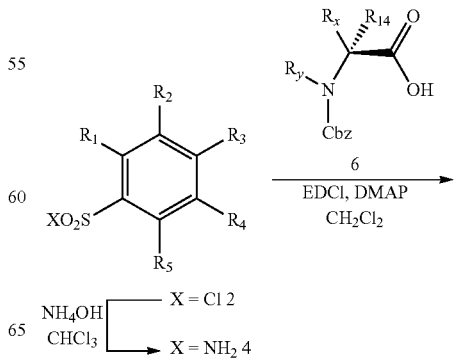

-continued

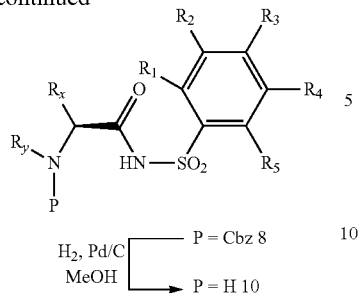

R<sub>y</sub> = H, lower alkyl

With reference to Scheme 31, compound 4 can be formed by treating compound 2 with ammonium hydroxide. A protected alpha-amino acid 6, generally commercially available, is then coupled to compound 4 to form protected sulfonamide 8. Deprotection of sulfonamide 8 produces catalysts 10. With reference to this Scheme 31, the R groups are as stated above for the general formulas.

Beta amino acids also can be used to form sulfonamide-based catalysts according to the present invention. This approach is illustrated in Scheme 32.

Scheme 32

Generalized example for using beta-amino acid derivatives:

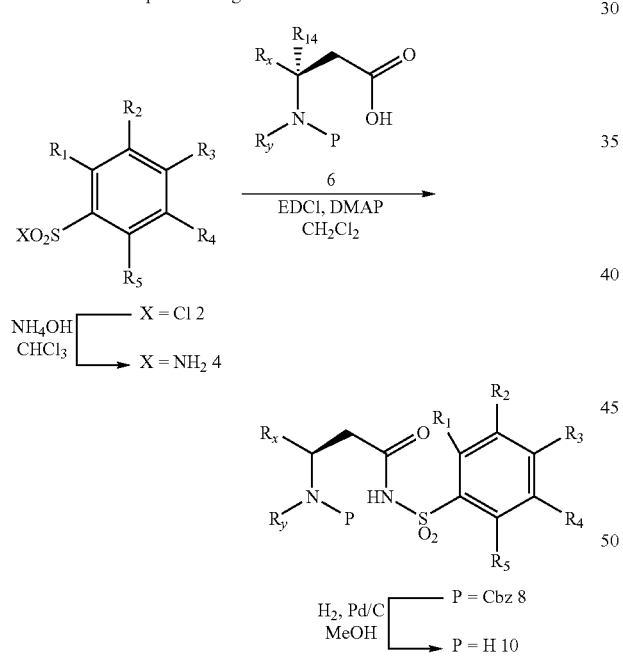

R<sub>y</sub> = H, lower alkyl

With reference to Scheme 32, compound 4 can be formed by treating compound 2 with ammonium hydroxide. A protected beta-amino acid 6, generally commercially available, is then coupled to compound 4 to form protected sulfonamide 8. Deprotection of sulfonamide 8 produces catalysts 10. Again, With reference to this Scheme 30, the R groups are as stated above for the general formulas.

Particular examples of amino-acid-based sulfonamide catalysts according to the present invention are provided below.

Selected sulfonamide examples include:

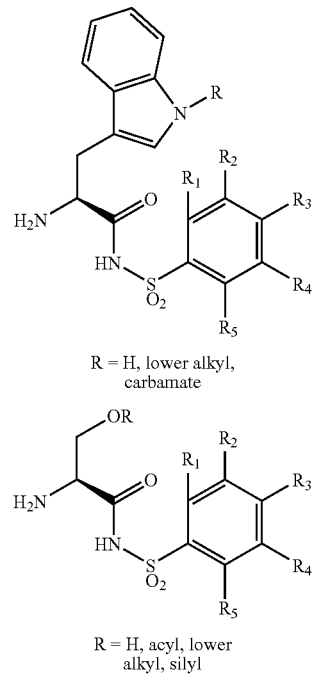

R = H, lower alkyl, carbamate

R = H, acyl, lower alkyl, silyl

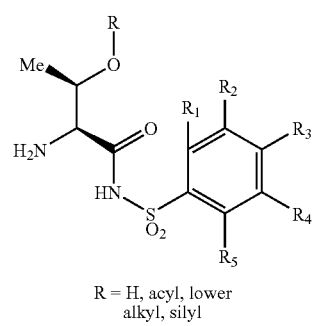

R = H, acyl, lower alkyl, silyl

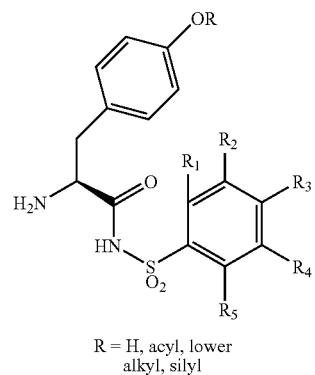

R = H, acyl, lower alkyl, silyl

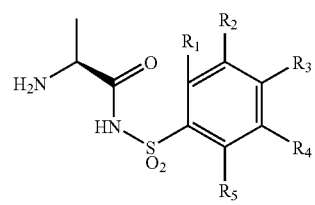

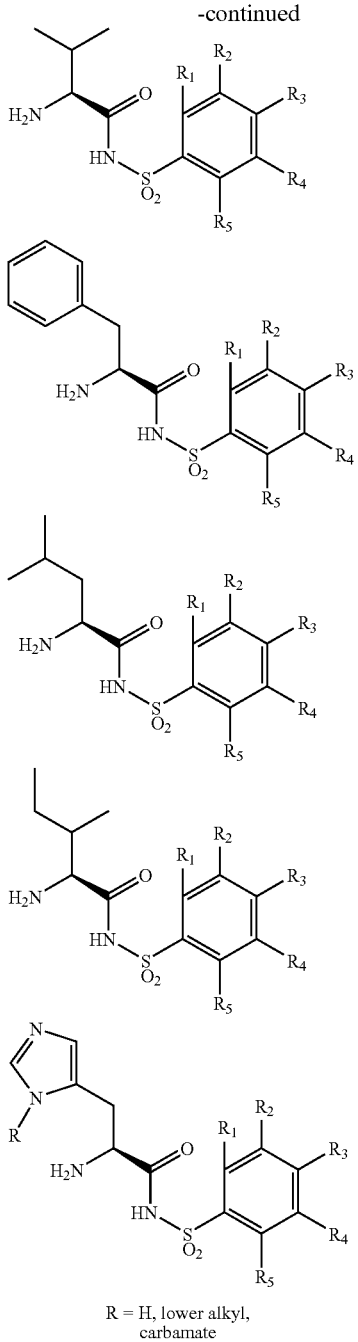

R = H, lower alkyl, carbamate

VI. Examples

The following examples are provided to illustrate certain features of working embodiments of the present invention. A person of ordinary skill in the art will appreciate that the scope of the invention is not limited to the particular feature exemplified by these examples.

General. Infrared spectra were recorded neat unless otherwise indicated and are reported in cm$^{-1}$. $^1$H NMR spectra were recorded in deuterated solvents and are reported in ppm relative to tetramethylsilane and referenced internally to the residually protonated solvent. $^{13}$C NMR spectra were recorded in deuterated solvents and are reported in ppm relative to tetramethylsilane and referenced internally to the residually protonated solvent.

Routine monitoring of reactions was performed using EM Science DC-Alufolien silica gel, aluminum-backed TLC plates. Flash chromatography was performed with the indicated eluents on EM Science Gedurian 230-400 mesh silica gel.

Air and/or moisture sensitive reactions were performed under usual inert atmosphere conditions. Reactions requiring anhydrous conditions were performed under a blanket of argon, in glassware dried in an oven at 120° C. or by flame, then cooled under argon. Dry THF and DCM were obtained via a solvent purification system. All other solvents and commercially available reagents were either purified via literature procedures or used without further purification.

Additional information concerning details provided in the following examples can be found in one or more of the following references, which are incorporated herein by reference: (1) Yang, H. Carter, R. G. "N-(p-dodecylphenylsulfonyl)-2-Pyrrolidinecarboxamide: A Practical Proline Mimetic for Facilitating Enantioselective Aldol Reactions." Org. Lett. 2008, 10, 4649-4652; (2) Yang, H. Carter, R. G. "Enantioselective Mannich Reactions using the Practical Proline Mimetic N-(p-dodecylphenylsulfonyl)-2-Pyrrolidinecarboxamide." J. Org. Chem. 2009, 74, 2246-2249; (3) Yang, H. Carter, R. G. "Asymmetric Construction of Nitrogen-Containing, [2.2.2] Bicyclic Scaffolds Using N-(p-Dodecylphenylsulfonyl)-2-Pyrrolidinecarboxamide." J. Org. Chem. 2009, 74, 5151-5156; and (4) Yang, H.; Carter, R. G. "Organocatalyzed, enantioselective synthesis of bicyclo-[2.2.2]-octanes containing benzylic, all-carbon, quaternary centers." Tetrahedron 2010, 61, in press. DOI: 10.1016/j.tet.2010.01.094

Example 1

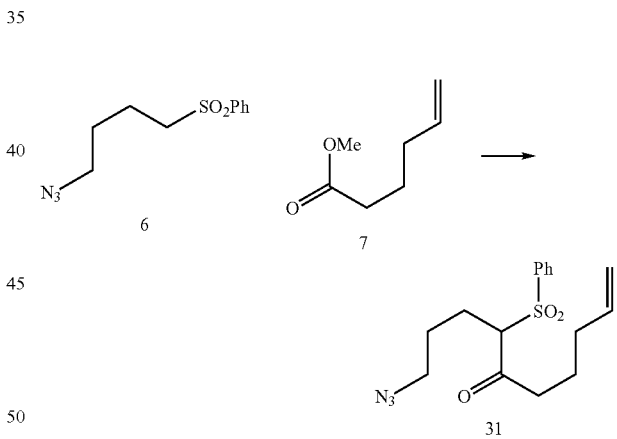

Keto sulfone 31: To a stirred solution of 6 (1.0 g, 4.18 mmol) in THF (40 mL) at −78° C. was added lithium 2,2,6,6-tetramethylpiperidine (8.36 mL, 8.36 mmol, 1.0 M in THF) dropwise. After 5 min, a solution of ester 7 (1.07 g, 8.36 mmol) in pre-cooled THF (5.0 mL) was added via cannula to the sulfone solution. After 30 min, the reaction was warmed up to −10° C. over 1 h and quenched with sat. aq. NH$_4$Cl (15 mL) and extracted with ether (3×20 mL). The dried (Na$_2$SO$_4$) extract was concentrated in vacuo and purified chromatography over silica gel, eluting with 5-20% EtOAc/hexanes, to give 31 (1.02 g, 3.04 mmol, 73%) as a colorless oil. IR: (neat) 2933, 2095, 1716, 1316, 1308, 1144, 1080, 684 cm$^{-1}$; $^1$H NMR (400 MHz, CDCl$_3$) δ 7.72-7.81 (m, 3H), 7.59-7.63 (m, 2H), 5.74-5.84 (m, 1H), 5.02-5.08 (m, 2H), 4.15-4.17 (m, 1H), 3.25-3.32 (m, 2H), 2.91-2.99 (m, 1H), 2.57-2.66 (m, 1H), 2.08-2.13 (m, 2H), 1.92-2.00 (m, 2H), 1.67-1.76 (m, 2H), 1.48-1.55 (m, 2H); $^{13}$C NMR (100 MHz, CDCl$_3$) δ 202.0, 137.6, 136.1, 134.5, 129.4, 129.2, 115.6, 74.5, 50.8, 44.4, 32.7, 26.3, 24.6, 22.3; HRMS (EI+) calcd. for C$_{16}$H$_{22}$N$_3$O$_3$S (M+H) 336.1382, found 336.1399.

Example 2

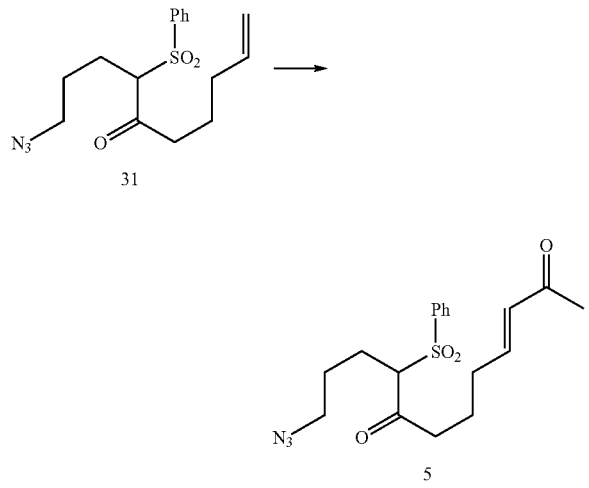

Enone 5: To a solution of 31 (252 mg, 0.752 mmol) and 2-pentenone (94 mg, 1.11 mmol) in CH$_2$Cl$_2$ (3.7 mL) was added 2$^{nd}$ Gen. Hoveyda-Grubbs catalyst (23.3 mg, 37.3 µmol) at room temperature. After 3.5 hours, the reaction was loaded directly onto silica gel and was purified by chromatography, eluting with 10-30% EtOAc/hexanes, to give 5 (178 mg, 0.472 mmol, 63%) as colorless oil as well as recovered 31 (75 mg, 0.224 mmol, 30%): IR (neat) 2929, 2095, 1712, 1665, 1449, 1308, 1252, 1144, 1075 cm$^{-1}$; $^1$H NMR (300 MHz, CDCl$_3$) δ 7.73-7.81 (m, 3H), 7.60-7.68 (m, 2H), 6.78 (dt, J=16.0, 6.8 Hz, 1H), 6.13 (d, J=16.0 Hz, 1H), 4.16 (t, J=7.6 Hz, 1H), 3.27 (t, J=6.3 Hz, 2H), 2.99-3.07 (m, 1H), 2.53-2.68 (m, 1H), 2.16-2.31 (m, 5H), 1.95 (q, J=7.6 Hz, 2H), 1.64-1.86 (m, 2H), 1.47-1.54 (m, 2H); $^{13}$C NMR (100 MHz, CDCl$_3$) δ 201.4, 198.5, 146.6, 136.1, 134.6, 131.9, 129.4, 129.3, 74.5, 50.8, 44.3, 31.3, 27.1, 26.3, 24.6, 21.6; HRMS (FAB+) calcd. for C$_{18}$H$_{24}$N$_3$O$_4$S (M+H) 378.1488, found 378.1489.

Example 3

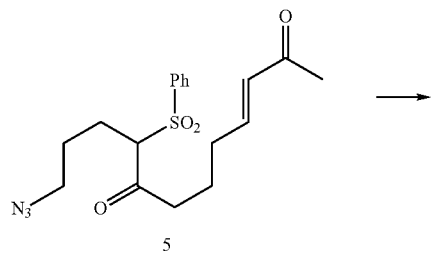

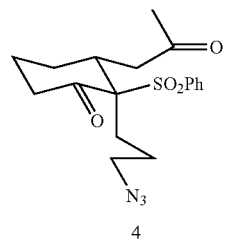

Cyclohexanone 4: Racemic Protocol—To a solution of 5 (8.0 mg, 0.0212 mmol) in CH$_2$Cl$_2$/Isopropanol (1:1, 0.2 mL) was added diisopropylamine (2.2 mg, 3.0 µL, 0.0212 mmol) at room temperature. After 76 hours, the reaction was loaded directly onto silica gel and was purified by chromatography, eluting with 10-30% EtOAc/hexanes, to give the product 4 (6.7 mg, 0.0178 mmol, 84%) as a white solid.

Enantioselective Protocol—To a solution of 5 (82.0 mg, 0.217 mmol) in EtOH/DCE (1:99, 1.1 mL) was added ent-sulfonamide 15 (9.2 mg, 0.0217 mmol) and piperidine (18.5 mg, 21 µL, 0.217 mmol) at −20° C. After stirring at same temperature for 72 hours, the reaction was loaded directly onto silica gel and was purified by chromatography, eluting with 10-30% EtOAc/hexanes, to give the product 4 (58 mg, 0.154 mmol, 71%, 88% ee) as a white solid. Mp 95-96° C.; [α]$_D^{23}$=+101° (c=0.78, CHCl$_3$); IR (neat) 2925, 2099, 1716, 1699, 1445, 1355, 1303, 1140, 1088, 723, 688 cm$^{-1}$; $^1$H NMR (300 MHz, CDCl$_3$) δ 7.82-7.84 (m, 2H), 7.69-7.72 (m, 1H), 7.56-7.60 (m, 2H), 3.48 (tq, J=10.8, 2.0 Hz, 1H), 3.20-3.40 (m, 3H), 2.89 (dt, J=15.2, 7.2 Hz, 1H), 2.53 (dd, J=17.6, 10.8 Hz, 1H), 2.41 (dt, J=15.2, 7.2 Hz, 1H), 2.26 (s, 3H), 1.85-2.18 (m, 5H), 1.57-1.69 (m, 2H), 1.38-1.47 (m, 1H); $^{13}$C NMR (100 MHz, CDCl$_3$) δ 206.0, 205.8, 135.9, 134.3, 130.6, 128.8, 78.9, 51.5, 44.6, 39.4, 35.0, 30.5, 27.6, 27.1, 24.5, 21.5; HRMS (FAB+) calcd. for C$_{18}$H$_{24}$N$_3$O$_4$S (M+H) 378.1488, found 378.1497.

Determination of the enantiomeric excess: Product 4 (3 mg) in C$_6$D$_6$ (0.55 ml) with 40 mol % (+) Eu(hfc)$_3$ (3.8 mg) at 400 MHz. $^1$H NMR difference of α-methylene protons (doublet at 3.31 ppm) on C$_6$ for two enantiomers is 18.8 Hz. The enantiomeric excess can be obtained based on the calculation of ratio for two sets of doublets.

Example 4

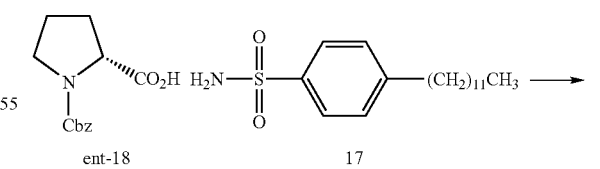

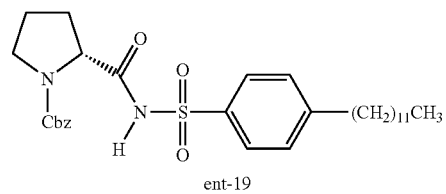

Cbz sulfonamide ent-19: To a solution of Z-D-proline ent-18 (3.16 g, 12.7 mmol) in CH$_2$Cl$_2$ (127 mL) was added sulfonamide 17 (4.13 g, 12.7 mmol), DMAP (0.248 g, 2.03 mmol) and EDCl (2.44 g, 12.7 mmol) respectively. The reaction mixture was stirred at room temperature for 72 hours before being partitioned between EtOAc (180 mL) and aq. HCl (120 mL, 1 N). The organic layer was washed with half-saturated brine. The dried (Na$_2$SO$_4$) extract was concentrated in vacuo and purified by chromatography over silica gel, eluting with 10% EtOAc/CH$_2$Cl$_2$, to give ent-19 (5.85 g, 10.5 mmol, 83%) as a colorless liquid. $[\alpha]_D^{23}$=+90° (c=2.2, CHCl$_3$). IR (neat) 3148, 2955, 2925, 2856, 1720, 1677, 1449, 1411, 1355, 1174, 1131, 1088, 826, 692 cm$^{-1}$; $^1$H NMR (300 MHz, CDCl$_3$) 10.4 (br s, 1H), 7.93-7.95 (m, 2H), 7.26-7.40 (m, 7H), 5.23 (s, 2H), 4.31 (br s, 1H), 3.42 (m, 2H), 2.45-2.57 (m, 1H), 0.85-1.87 (m, 28H); $^{13}$C NMR (75 MHz, CDCl$_3$) δ 169.0, 157.2, 135.9, 128.6, 128.4, 128.3, 128.1, 127.5, 68.1, 60.8, 47.2, 46.2, 38.8, 38.1, 36.6, 31.8, 29.6, 29.3, 27.5, 27.2, 26.7, 24.3, 22.7, 14.1; HRMS (EI+) calcd. for C$_{31}$H$_{45}$N$_2$O$_5$S (M+1), 557.3049 found 557.3067.

Example 5

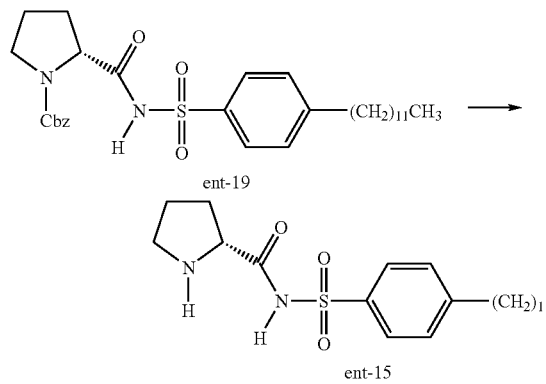

Sulfonamide ent-15: To a solution of Z-D-sulfamide (4.99 g, 8.97 mmol) in MeOH (178 mL) was added 10% Pd/C (536 mg). The mixture was stirred at rt for under an atmosphere of hydrogen. After 24 hours, the reaction was filtered through Celite and silica gel pad, and the filtrate was concentrated in vacuo to give white solid. The crude product was purified by chromatography over silica gel, eluting with 10% MeOH/CH$_2$Cl$_2$, to give the product ent-15 (3.26 g, 7.73 mmol, 86%) as a white solid. Mp: 184-186° C.; $[\alpha]_D^{23}$=+94° (c=0.95, CHCl$_3$). IR (neat) 3135, 2955, 2920, 2852, 1626, 1458, 1372, 1308, 1144, 1084, 843 cm$^{-1}$; $^1$H NMR (400 MHz, CDCl$_3$) 8.73 (br s, 1H), 8.06 (br s, 1H), 7.85 (d, J=8.0 Hz, 2H), 7.22-7.26 (m, 2H), 4.33 (t, J=8.0 Hz, 1H), 3.23-3.43 (m, 2H), 2.33-2.40 (m, 1H), 0.82-2.05 (m, 28H); $^{13}$C NMR (75 MHz, CDCl$_3$) δ 173.8, 140.4, 127.8, 127.2, 126.4, 62.8, 47.8, 39.9, 38.2, 36.8, 31.9, 31.8, 30.1, 29.7, 29.6, 29.3, 29.2, 27.6, 27.2, 24.5, 22.7, 14.1; HRMS (EI+) calcd. for C$_{22}$H$_{39}$N$_2$O$_3$S (M+1), 423.2681 found 423.2701.

Example 6

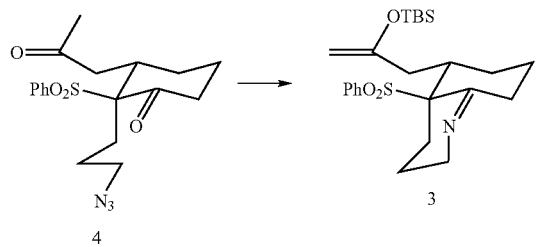

Imine 3: To a solution of 4 (0.132 g, 0.350 mmol) in THF (13 mL) was added PPh$_3$ (91.8 mg, 0.350 mmol). The reaction mixture was heated to reflux. After 5 hours, the reaction was cooled to rt and the solvent was removed in vacuo to give crude imine. The crude imine was used next step immediately. To a stirred solution of crude imine (0.35 mmol) in CH$_2$Cl$_2$ (3.5 mL) at 0° C. was added i-Pr$_2$NEt (0.203 g, 0.27 mL, 1.57 mmol). After 1 min, TBSOTf (0.166 g, 0.14 mL, 0.628 mmol) was added dropwise. After 5 hours, the reaction was removed from the cooling bath, quenched with sat. aq. NaHCO$_3$ (5 mL) and extracted with CH$_2$Cl$_2$ (3×10 mL). The dried (K$_2$CO$_3$) extract was concentrated in vacuo purified by chromatography over alumina, eluting with 2-10% EtOAc/hexanes, to give 3 (0.125 g, 0.279 mmol, 80%) as a colorless oil: $[\alpha]_D^{23}$=+48° (c=1.3, CHCl$_3$); IR (neat) 2951, 2933, 2852, 1652, 1630, 1445, 1299, 1256, 1140, 1024, 830, 692, 606 cm$^{-1}$; NMR (400 MHz, CDCl$_3$) δ 7.86-7.88 (m, 2H), 7.66-7.70 (m, 1H), 7.55-7.59 (m 2H), 4.13 (s, 1H), 4.07 (s, 1H), 3.65 (d, J=15.6 Hz, 1H), 3.36-3.43 (m, 1H), 2.88-2.92 (m, 1H), 2.67-2.73 (m, 1H), 2.46-2.53 (m, 2H), 2.15-2.27 (m, 2H), 2.02 (t, J=12.4 Hz, 2H), 1.59-1.90 (m, 3H), 1.27-1.32 (m, 2H), 0.94 (s, 9H), 0.21 (s, 3H), 0.19 (s, 3H); $^{13}$C NMR (100 MHz, CDCl$_3$) δ 165.4, 156.2, 137.1, 133.7, 130.0, 129.0, 91.9, 70.1, 48.2, 38.9, 37.2, 36.5, 28.5, 25.7, 23.2, 21.1, 20.7, 18.0, -4.7, -4.8; HRMS (CI+) calcd. for C$_{24}$H$_{38}$NO$_3$SSi (M+1) 448.2342, found 448.2339.

Example 7

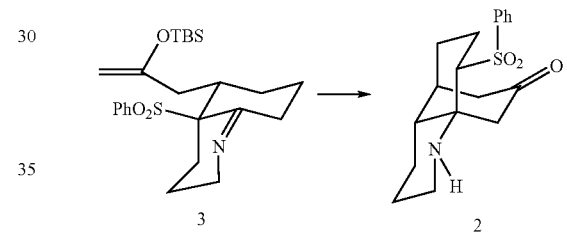

Tricyclic amine 2: To a solution of 3 (68 mg, 0.152 mmol) in dry DCE (3 mL) was added Zn(OTf)$_2$ (166 mg, 0.455 mmol). The reaction mixture was heated in sealed tube at 96° C. After 9 h, the solvent was then removed in vacuo. The residue was diluted with 1 N HCl (1 mL) and washed with Et$_2$O (2×5 mL). The aqueous phase was neutralized by solid K$_2$CO$_3$ and extracted with CH$_2$Cl$_2$ (3×5 mL). The dried (Na$_2$SO$_4$) extract was concentrated in vacuo purified by chromatography over alumina, eluting with 30-50% EtOAc/hexanes, to give 2 (38 mg, 0.114 mmol, 75%) as a white solid. $[\alpha]_D^{23}$=+6° (c=0.9, CHCl$_3$); Mp 134-136° C.; IR (neat) 3359, 2925, 1703, 1295, 1144, 1080, 714, 688 cm$^{-1}$; $^1$H NMR (300 MHz, CDCl$_3$) δ 7.91-7.93 (m, 2H), 7.64-7.69 (m, 1H), 7.54-7.59 (m, 2H), 3.65 (s br, 1H), 3.13-3.22 (m, 2H), 2.88-3.01 (m, 2H), 2.53 (dd, J=17.1, 6.6 Hz, 1H), 2.22 (d, J=17.1 Hz, 1H), 2.05-2.07 (m, 1H), 1.64-1.89 (m, 10H); $^{13}$C NMR (75 MHz, CDCl$_3$) δ 210.7, 139.4, 133.7, 129.1, 128.5, 72.9, 59.7, 44.4, 41.1, 40.9, 40.3, 34.4, 32.0, 25.6, 25.5, 21.6; FIRMS (EI+) calcd. for C$_{18}$H$_{23}$NO$_3$S (M+) 333.1399, found 333.1405.

Example 8

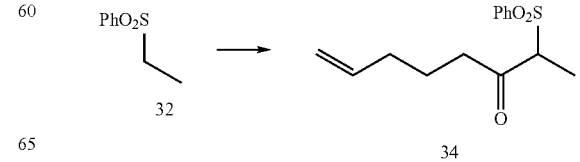

Keto sulfone 34: To a stirred solution of 32 (0.68 g, 4.0 mmol) in THF (40 mL) at −78° C. was added LDA (5.3 mL, 8.0 mmol, 1.5 M in THF) dropwise. After 20 minutes, a solution of ester 7 (1.025 g, 8.0 mmol) in pre-cooled THF (2 mL) was added via cannula to the sulfone solution. The reaction was stirred at −78° C. for 2 hours and quenched with sat. aq. NH$_4$Cl (15 mL) and extracted with ether (3×15 mL). The dried (Na$_2$SO$_4$) extract was concentrated in vacuo and purified chromatography over silica gel, eluting with 2-15% EtOAc/hexanes, to give 34 (1.013 g, 3.80 mmol, 95%) as a colorless oil: IR: (neat) 2976, 2938, 1713, 1582, 1369, 1152, 1081, 994, 912, 765, 732, 689 cm$^{-1}$; $^1$H NMR (300 MHz, CDCl$_3$) 7.82-7.67 (m, 3H), 7.57 (t, J=7.2 Hz, 2H), 5.70-5.83 (m, 1H), 4.97-5.06 (m, 2H), 4.18 (q, J=7.2 Hz, 1H), 2.91 (dt, J=18.3, 7.2 Hz, 1H), 2.65 (dt, J=18.6, 6.9 Hz, 1H), 2.03-2.10 (m, 2H), 1.69 (p, J=7.2 Hz, 2H), 1.40 (d, J=7.2 Hz, 3H); $^{13}$C NMR (100 MHz, CDCl$_3$) δ 202.2, 137.7, 136.3, 134.3, 129.4, 129.1, 115.5, 70.0, 43.1, 32.7, 22.3, 12.0; HRMS (EI+) calcd. for C$_{16}$H$_{19}$O$_3$S (M+H) 267.1055, found 267.1060.

Example 9

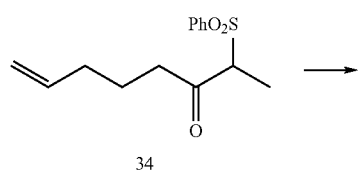

34

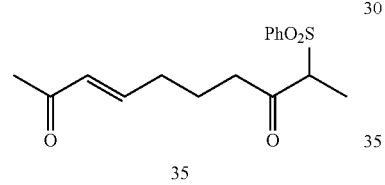

35

Enone 35: To 34 (110 mg, 0.414 mmol) was added 2$^{nd}$ Gen. Grubbs catalyst (17.5 mg, 37.3 µmol) in CH$_2$Cl$_2$ (4 mL) and methylvinylketone (87 mg, 0.102 mL, 1.242 mmol) at room temperature. After 24 hours, the reaction was loaded directly onto silica gel and was purified by chromatography, eluting with 10-30% EtOAc/hexanes, to give 35 (89 mg, 0.289 mmol, 70%) as colorless oil as well as recovered 34 (20 mg, 0.0752 mmol, 18%): IR (neat) 2943, 1718, 1664, 1631, 1582, 1315, 1250, 1108, 759, 738, 694, 585 cm$^{-1}$; $^1$H NMR (300 MHz, CDCl$_3$) δ 7.60-7.70 (m, 3H), 7.55-7.58 (m, 2H), 6.76 (dt, J=15.9, 6.9 Hz, 1H), 6.09 (dt, J=15.9, 1.5 Hz, 1H), 4.17 (q, J=7.2 Hz, 1H), 2.99 (dt, J=18.9, 7.2 Hz, 1H), 2.70 (dt, J=18.6, 6.9 Hz, 1H), 2.21-2.29 (m, 5H), 1.79 (p, J=7.2 Hz, 2H), 1.38 (t, J=7.2 Hz, 3H); $^{13}$C NMR (100 MHz, CDCl$_3$) δ 201.6, 198.5, 146.8, 136.2, 134.4, 131.8, 129.3, 129.2, 70.0, 43.0, 31.3, 27.0, 21.6, 12.0; HRMS (FAB+) calcd. for C$_{16}$H$_{21}$O$_4$S (M+H) 309.1161, found 309.1150.

Example 10

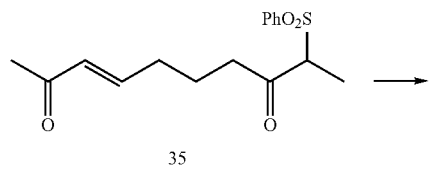

35

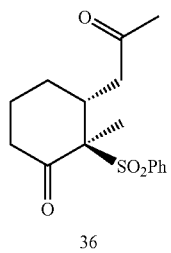

36

Cyclohexanone 36: To a solution of 35 (25 mg, 0.0812 mmol) in EtOH/DCE (1:99, 0.4 mL) was added sulfonamide 15 (3.4 mg, 0.00812 mmol) and piperidine (6.9 mg, 8 µL, 0.0812 mmol) at −20° C. After stirring at same temperature for 72 hours, the reaction was loaded directly onto silica gel and was purified by chromatography, eluting with 10-30% EtOAc/hexanes, to give the product 36 (20 mg, 0.0649 mmol, 80%, 82% ee) as colorless oil. [α]$_D^{23}$=+63.3° (c=1.3, CHCl$_3$); IR (neat) 2949, 2884, 1713, 1446, 1375, 1310, 1364, 1141, 1108, 1075, 972, 754, 721, 629 cm$^{-1}$; $^1$H NMR (400 MHz, C$_6$D$_6$) δ 7.84-7.86 (m, 2H), 7.00-7.09 (m, 3H), 3.84-3.90 (m, 1H), 3.15 (dt, J=14.4, 9.6 Hz, 1H), 2.87 (dd, J=17.2, 3.2 Hz, 1H), 2.18-2.32 (m, 2H), 1.34-1.87 (m, 6H), 2.15 (s, 3H), 0.94-1.02 (m, 1H); $^{13}$C NMR (100 MHz, C$_6$D$_6$) δ 205.1, 204.2, 136.4, 133.5, 130.4, 128.4, 75.9, 44.7, 38.2, 34.8, 29.4, 26.0, 20.9, 15.2; HRMS (EI+) calcd. for C$_{16}$H$_{20}$O$_4$S (M+) 308.1082, found 308.1078.

Example 11

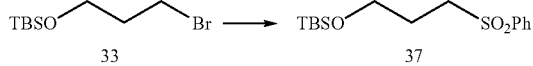

Sulfone 37: To a solution of 33 (2.306 g, 9.11 mmol) in DMF (36 mL) was added NaSO$_2$Ph (2.24 g, 13.67 mmol). After stirring for 5 hours, the reaction mixture was poured into ice water (20 mL). The resulting solution was extracted with diethyl ether (3×40 mL). The dried (Na$_2$SO$_4$) extract was concentrated in vacuo and purified by chromatography over silica gel, eluting with 2-20% EtOAc/hexanes, to give 37 (2.403 g, 7.65 mmol, 84%) as a colorless oil: $^1$H NMR (300 MHz, CDCl$_3$) δ 7.28-7.95 (m, 5H), 3.66 (t, J=5.7 Hz, 2H), 3.20-3.25 (m, 2H), 1.87-1.96 (m, 2H), 0.86 (s, 9H), 0.016 (s, 3H), 0.015 (s, 3H); $^{13}$C NMR (75 MHz, CDCl$_3$) δ 139.2, 133.6, 129.3, 128.0, 60.7, 53.3, 26.2, 25.8, 18.2, −5.46.

Example 12

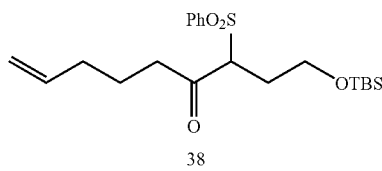

Keto sulfone 38: To a stirred solution of 37 (0.408 g, 1.30 mmol) in THF (13 mL) at −78° C. was added LDA (2.6 mL, 2.6 mmol, 1.0 M in THF) dropwise. After 20 minutes, a solution of ester 7 (0.333 g, 2.60 mmol) in pre-cooled THF (1.5 mL) was added via cannula to the sulfone solution. The reaction was stirred at −78° C. for 1.5 hours and quenched with sat. aq. NH$_4$Cl (15 mL) and extracted with ether (3×20 mL). The dried (Na$_2$SO$_4$) extract was concentrated in vacuo and purified chromatography over silica gel, eluting with 5-15% EtOAc/hexanes, to give 38 (0.469 g, 1.144 mmol, 88%) as a colorless oil. IR: (neat) 2927, 2862, 1718, 1467, 1315, 1369, 1146, 1092, 1005, 836, 776, 683, 591 cm$^{-1}$; $^1$H NMR (400 MHz, CDCl$_3$) δ 7.79 (d, J=7.2 Hz, 2H), 7.70 (t, J=7.2 Hz, 1H), 7.58 (t, J=7.6 Hz, 2H), 5.73-5.83 (m, 1H), 4.99-5.07 (m, 2H), 4.40 (dd, J=8.8, 4.8 Hz, 1H), 3.43-3.66 (m, 2H), 2.91 (dt, J=18.4, 7.6 Hz, 1H), 2.64 (dt, J=18.4, 7.2 Hz, 1H), 2.04-2.11 (m, 4H), 1.67 (p, J=7.6 Hz, 2H), 0.85 (s, 9H), −0.003 (s, 3H), −0.009 (s, 3H); $^{13}$C NMR (100 MHz, CDCl$_3$) δ 202.0, 137.7, 136.6, 134.2, 129.4, 129.0, 115.4, 72.1, 59.8, 44.5, 32.8, 30.4, 25.8, 22.2, 18.2, −5.56, −5.60; FIRMS (EI+) calcd. for C$_{21}$H$_{34}$O$_4$SSi (M+H) 411.2025, found 411.2035.

Example 13

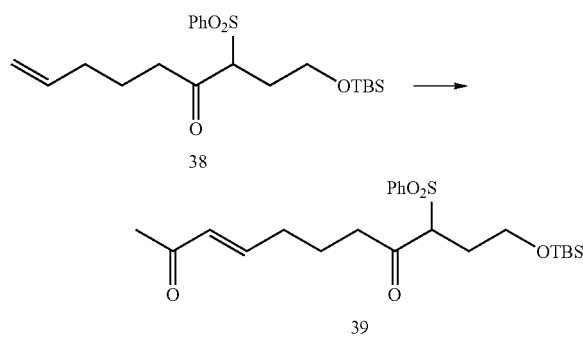

Enone 39: To 38 (133 mg, 0.324 mmol) was added 2$^{nd}$ Gen. Grubbs catalyst (14 mg, 16.2 µmol) in CH$_2$Cl$_2$ (3.3 mL) and methylvinylketone (114 mg, 0.133 mL, 1.62 mmol) at room temperature. After 24 hours, the reaction was loaded directly onto silica gel and was purified by chromatography, eluting with 10-15% EtOAc/hexanes, to give 39 (84 mg, 0.186 mmol, 57%) as light yellow oil as well as recovered (45 mg, 0.110 mmol, 34%): IR (neat) 2954, 2927, 2856, 1718, 1674, 1446, 1315, 1261, 1152, 1086, 972, 830, 781, 694, 585 cm$^{-1}$; $^1$H NMR (400 MHz, CDCl$_3$) δ 7.79 (d, J=7.2 Hz, 2H), 7.70 (t, J=7.6 Hz, 1H), 7.58 (t, J=7.6 Hz, 2H), 6.78 (dt, J=16, 6.8 Hz, 1H), 6.1 (d, J=16 Hz, 1H), 4.34-4.38 (m, 1H), 3.62 (p, J=5.2 Hz, 2H), 3.43-3.49 (m, 1H), 2.97 (dt, J=18.4, 8.0 Hz, 1H), 2.65 (dt, J=18.8, 7.6 Hz, 1H), 2.22-2.31 (m, 5H), 2.04-2.10 (m, 2H), 1.78-1.83 (m, 2H), 0.83 (s, 9H), −0.023 (s, 3H), −0.027 (s, 3H); $^{13}$C NMR (100 MHz, CDCl$_3$) δ 201.3, 198.5, 146.9, 136.5, 134.3, 131.8, 129.4, 129.1, 72.2, 59.9, 44.2, 31.4, 30.4, 27.0, 25.8, 21.5, 18.2, −5.57, −5.60; HRMS (EI+) calcd. for C$_{23}$H$_{36}$O$_5$SSi (M+) 452.2053, found 452.2066.

Example 14

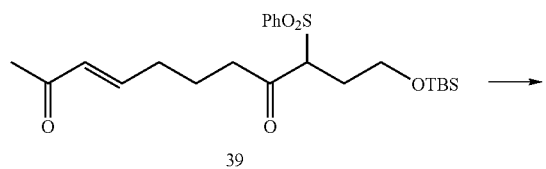

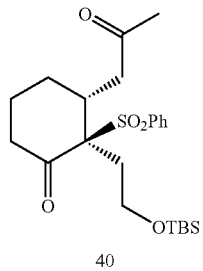

Cyclohexanone 40: To a solution of 39 (35 mg, 0.077 mmol) in EtOH/DCE (1:99, 0.39 mL) was added sulfonamide 15 (3.3 mg, 0.0077 mmol) and piperidine (6.6 mg, 7.7 µL, 0.077 mmol) at −20° C. After stirring at same temperature for 5 days, the reaction was loaded directly onto silica gel and was purified by chromatography, eluting with 10-20% EtOAc/hexanes, to give the product 40 (26.6 mg, 0.0588 mmol, 76%, 83% ee) as colorless oil. [α]$_D^{23}$=+35° (c=0.8, CHCl$_3$); IR (neat) 2922, 2851, 1718, 1364, 1299, 1255, 1075, 836, 716, 689 cm$^{-1}$; $^1$H NMR (400 MHz, CDCl$_3$) δ 7.86 (d, J=7.2 Hz, 2H), 7.67 (t, J=7.2 Hz, 1H), 7.55 (t, J=7.6 Hz, 2H), 3.74 (t, J=6.4 Hz, 1H), 3.46 (d, J=17.6 Hz, 1H), 3.37 (t, J=7.6 Hz, 1H), 2.45-2.72 (m, 4H), 2.18-2.32 (m, 5H), 1.74-1.96 (m, 3H), 1.40-1.50 (m, 1H), 0.87 (s, 9H), 0.03 (s, 3H), 0.02 (s, 3H); $^{13}$C NMR (100 MHz, CDCl$_3$) δ 206.3, 205.4, 136.3, 134.0, 131.0, 128.6, 78.5, 59.3, 45.3, 39.6, 35.3, 32.9, 30.5, 29.7, 27.7, 25.9, 21.9, 18.3, −5.51; HRMS (ES+) calcd. for C$_{23}$H$_{36}$O$_5$NaSSi (M+Na) 475.1950, found 475.1959.

Example 15

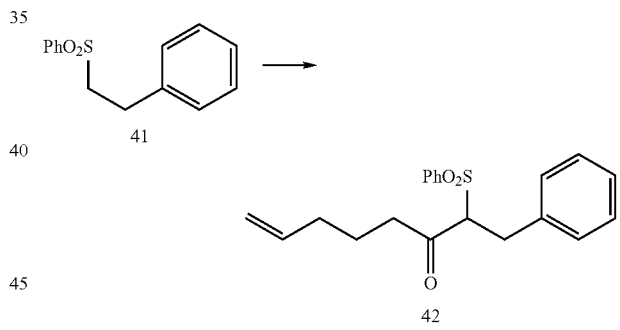

Keto sulfone 42: To a stirred solution of 41 (0.394 g, 1.602 mmol) in THF (16 mL) at −78° C. was added LDA (3.2 mL, 3.2 mmol, 1.0 M in THF) dropwise. After 5 minutes, a solution of ester 7 (0.411 g, 3.204 mmol) in pre-cooled THF (2.0 mL) was added via cannula to the sulfone solution. The reaction was stirred at −78° C. for 1.5 hours and quenched with sat. aq. NH$_4$Cl (15 mL) and extracted with ether (3×20 mL). The dried (Na$_2$SO$_4$) extract was concentrated in vacuo and purified chromatography over silica gel, eluting with 5-15% EtOAc/hexanes, to give 42 (0.499 g, 1.46 mmol, 91%) as a colorless oil: IR: (neat) 2922, 2851, 1723, 1636, 1457, 1320, 1152, 923, 754, 689 cm$^{-1}$; $^1$H NMR (400 MHz, CDCl$_3$) δ 7.85-7.88 (m, 2H), 7.61-7.77 (m, 3H), 7.04-7.29 (m, 5H), 5.58-5.63 (m, 1H), 4.85-4.93 (m, 2H), 4.41 (dd, J=12, 2.8 Hz, 1H), 3.27 (dd, J=13.2, 2.8 Hz, 1H), 3.10 (t, J=18 Hz, 1H), 2.68 (dt, J=18, 6.4 Hz, 1H), 2.15 (dt, J=18.4, 6.4 Hz, 1H), 1.82-1.89 (m, 2H), 1.43-1.50 (m, 2H); $^{13}$C NMR (100 MHz, CDCl$_3$) δ 201.8, 137.5, 136.4, 135.7, 134.5, 129.6, 129.2, 128.89, 128.86, 127.3, 115.3, 76.0, 45.2, 33.3, 32.4, 21.9; HRMS (EI+) calcd. for C$_{20}$H$_{22}$O$_3$S (M+) 342.1290, found 341.9227.

Example 16

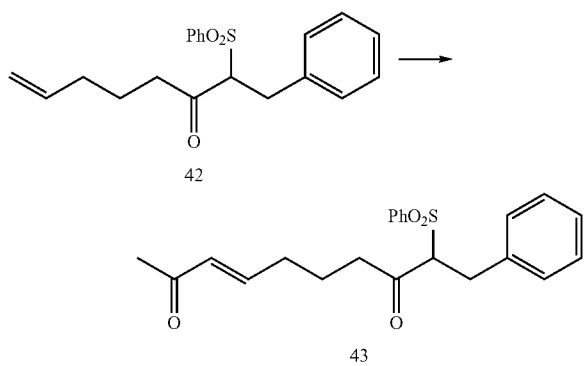

Enone 43: To 42 (0.121 g, 0.354 mmol) was added 2$^{nd}$ Gen. Grubbs catalyst (15 mg, 17.7 mop in CH$_2$Cl$_2$ (3.5 mL) and methylvinylketone (74 mg, 87 μL, 1.062 mmol) at room temperature. After 24 hours, the reaction was loaded directly onto silica gel and was purified by chromatography, eluting with 10-30% EtOAc/hexanes, to give 43 (88 mg, 0.229 mmol, 65%) as colorless oil as well as recovered 42 (35 mg, 0.102 mmol, 29%): IR (neat) 2927, 2851, 1718, 1669, 1451, 1359, 1310, 1255, 1146, 1075, 972, 743, 694, 596 cm$^{-1}$; $^1$H NMR (300 MHz, CDCl$_3$) δ 7.61-7.87 (m, 5H), 7.03-7.27 (m, 5H), 6.61 (dt, J=16.4, 6.8 Hz, 1H), 5.94 (d, J=15.6 Hz, 1H), 4.41 (dd, J=12, 3.2 Hz, 1H), 3.24 (dd, J=13.2, 3.2 Hz, 1H), 3.10 (t, J=12 Hz, 1H), 2.72 (dt, J=18.4, 6.8 Hz, 1H), 2.22 (s, 3H), 1.97-2.19 (m, 3H), 1.55-1.60 (m, 2H); $^{13}$C NMR (100 MHz, CDCl$_3$) δ 201.3, 198.4, 146.7, 136.3, 135.6, 134.6, 131.7, 129.6, 129.2, 128.9, 128.8, 127.3, 76.0, 45.0, 33.4, 31.0, 27.0, 21.2; HRMS (EI+) calcd. for C$_{22}$H$_{24}$O$_4$S (M+) 384.1395, found 384.1389.

Example 17

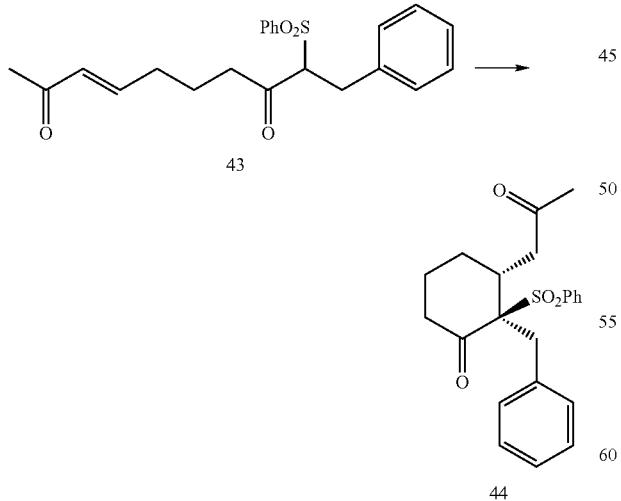

Cyclohexanone 44: To a solution of 43 (32 mg, 0.0833 mmol) in EtOH/DCE (1:99, 0.4 mL) was added sulfonamide 15 (3.5 mg, 8.33 mot) and piperidine (7.1 mg, 8.2 μL, 0.0833 mmol) at -20° C. After stirring at same temperature for 72 hours, the reaction was loaded directly onto silica gel and was purified by chromatography, eluting with 10-30% EtOAc/hexanes, to give the product 44 (28.6 mg, 0.0745 mmol, 89%, 81% ee) as colorless oil. [α]$_D^{23}$=+44.4° (c=1.1, CHCl$_3$); IR (neat) 2922, 1718, 1696, 1304, 1141, 689 cm$^{-1}$; $^1$H NMR (400 MHz, CDCl$_3$) δ 7.57-7.84 (m, 5H), 7.14-7.29 (m, 5H), 3.63-3.77 (m, 3H), 3.20 (d, J=13.6 Hz, 1H), 2.72 (dt, J=15.6, 8.8 Hz, 1H), 2.58-2.65 (m, 1H), 2.18-2.26 (m, 4H), 1.72-1.81 (m, 1H), 1.53-1.61 (m, 1H), 1.41-1.49 (m, 1H), 0.56-0.61 (m, 1H); $^{13}$C NMR (100 MHz, CDCl$_3$) δ 207.1, 206.2, 135.5, 135.2, 134.2, 131.2, 130.5, 128.68, 128.65, 127.5, 79.9, 45.6, 39.1, 35.7, 33.2, 30.3, 26.5, 19.3; HRMS (ES+) calcd. for C$_{22}$H$_{24}$O$_4$SNa (M+) 407.1293, found 407.1288.

Example 18

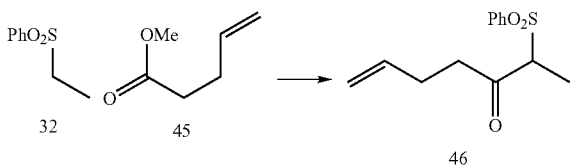

Keto sulfone 46: To a stirred solution of 32 (0.186 g, 1.10 mmol) in THF (11 mL) at -78° C. was added LDA (2.2 mL, 2.2 mmol, 1.0 M in THF) dropwise. After 20 minutes, a solution of ester 45 (0.25 g, 2.2 mmol) in pre-cooled THF (1.5 mL) was added via cannula to the sulfone solution. The reaction was stirred at -78° C. for 90 minutes and quenched with sat. aq. NH$_4$Cl (15 mL) and extracted with ether (3×15 mL). The dried (Na$_2$SO$_4$) extract was concentrated in vacuo and purified chromatography over silica gel, eluting with 2-15% EtOAc/hexanes, to give 46 (0.278 g, 1.10 mmol, 100%) as a colorless oil. IR: (neat) 2987, 2938, 1718, 1642, 1576, 1440, 1353, 1222, 1141, 1086, 999, 917, 787, 759, 689 cm$^{-1}$; $^1$H NMR (400 MHz, CDCl$_3$) δ 7.57-7.83 (m, 5H), 5.76-5.86 (m, 1H), 5.01-5.10 (m, 2H), 4.18 (q, J=7.2 Hz, 1H), 2.91 (dt, J=18.4, 7.6 Hz, 1H), 2.65 (dt, J=18.4, 6.8 Hz, 1H), 2.36 (q, J=6.8 Hz, 2H), 1.41 (d, J=7.2 Hz, 3H); $^{13}$C NMR (100 MHz, CDCl$_3$) δ 201.5, 136.4, 136.1, 134.3, 129.4, 129.1, 115.8, 70.0, 43.0, 27.3, 12.0; HRMS (EI+) calcd. for C$_{13}$H$_{16}$O$_3$S (M+) 252.0820, found 252.0815.

Example 19

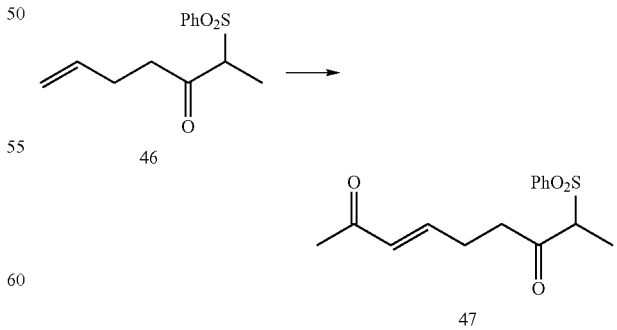

Enone 47: To 46 (0.123 g, 0.488 mmol) was added 2$^{nd}$ Gen. Grubbs catalyst (41.4 mg, 48.8 μmol) in CH$_2$Cl$_2$ (2.4 mL) and methylvinylketone (0.102 g, 0.12 mL, 1.464 mmol) at room temperature. After 24 hours, the reaction was loaded directly onto silica gel and was purified by chromatography, eluting with 10-30% EtOAc/hexanes, to give 47 (89 mg, 0.304 mmol, 62%) as colorless oil as well as recovered 46 (30 mg, 0.119 mmol, 24%): IR (neat) 2998, 2927, 1718, 1669, 1625, 1446, 1369, 1310, 1255, 1152, 1086, 983, 765, 732, 689 cm$^{-1}$; $^1$H NMR (300 MHz, CDCl$_3$) δ 7.57-7.80 (m, 5H), 6.78 (dt, J=16, 6.4 Hz, 1H), 6.12 (d, J=16 Hz, 1H), 4.20 (q, J=7.2 Hz, 1H), 3.19 (dt, J=18.8, 7.2 Hz, 1H), 2.83 (dt, J=19.2, 6.8 Hz, 1H), 2.53 (q, J=7.2 Hz, 2H), 2.25 (s, 3H), 1.41 (d, J=7.2 Hz, 3H); $^{13}$C NMR (100 MHz, CDCl$_3$) δ 200.6, 198.3, 145.4, 136.0, 134.5, 134.3, 132.0, 129.3, 129.2, 70.0, 41.9, 27.1, 25.9, 12.0; HRMS (FAB+) calcd. for C$_{15}$H$_{18}$O$_4$S (M+) 294.0926, found 294.0917.

Example 20

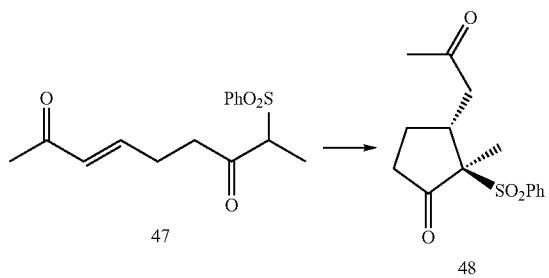

Cyclohexanone 48: To a solution of 47 (40 mg, 0.137 mmol) in EtOH/DCE (1:99, 0.68 mL) was added sulfonamide 15 (5.7 mg, 0.0137 mmol) and piperidine (11.6 mg, 13 µL, 0.137 mmol) at −20° C. After stirring at same temperature for 6 days, the reaction was loaded directly onto silica gel and was purified by chromatography, eluting with 10-30% EtOAc/hexanes, to give the product 48 (23.2 mg, 0.0792 mmol, 58%, 84% ee) as colorless oil. $[α]_D^{23}$=−22° (c=0.3, CHCl$_3$); IR (neat) 2960, 2916, 2845, 1745, 1713, 1446, 1299, 1146, 1130, 1086, 759, 721, 689 cm$^{-1}$; $^1$H NMR (400 MHz, CDCl$_3$) δ 7.57-7.86 (m, 5H), 3.49-3.56 (m, 1H), 3.08 (dd, J=17.2, 2.0 Hz, 1H), 2.30-2.49 (m, 4H), 2.22 (s, 3H), 1.24-1.45 (m, 4H); $^{13}$C NMR (100 MHz, CCl$_3$) δ 210.1, 206.0, 135.3, 134.3, 130.8, 128.8, 72.5, 44.9, 38.6, 36.3, 30.3, 25.6, 14.1; HRMS (ES+) calcd. for C$_{15}$H$_{18}$O$_4$NaS (M+Na) 317.0824, found 317.0834.

Example 21

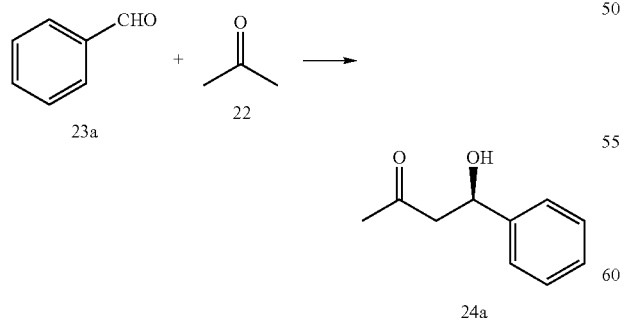

Aldol 24a: To a solution of 23a (53 mg, 0.5 mmol) in EtOH/DCE (1:99, 0.6 mL) was added sulfonamide 15 (42.2 mg, 0.1 mmol) and acetone (22, 0.29 g, 0.36 mL, 5 mmol) at room temperature. After stirring at same temperature for 72 hours, the reaction was loaded directly onto silica gel and was purified by chromatography, eluting with 10-30% EtOAc/hexanes, to give the known product 24a (62 mg, 0.378 mmol, 76%, 87% ee) as colorless oil. $[α]_D^{23}$=+52° (c=0.7, CHCl$_3$); $^1$H NMR (400 MHz, CDCl$_3$) δ 7.29-7.39 (m, 5H), 5.18 (d, J=9.2 Hz, 1H), 3.30 (s, 1H), 2.83-2.95 (m, 2H), 2.22 (s, 3H); $^{13}$C NMR (100 MHz, CDCl$_3$) δ 209.1, 142.7, 128.6, 127.7, 125.6, 69.9, 52.0, 30.8; HPLC: Daicel Chiralpak AD. Hexanes-i-PrOH, 90:10, 1 mL min$^{-1}$, 257 min: t$_R$ (major)=10.6 min; t$_R$ (minor)=11.4 min.

Example 22

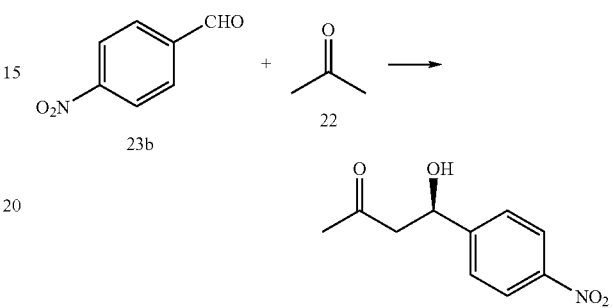

Aldol 24b: To a solution of 23b (75 mg, 0.5 mmol) in EtOH/DCE (1:99, 0.64 mL) was added sulfonamide 15 (42.2 mg, 0.1 mmol) and acetone (22, 0.29 g, 0.36 mL, 5 mmol) at room temperature. After stirring at same temperature for 48 hours, the reaction was loaded directly onto silica gel and was purified by chromatography, eluting with 10-30% EtOAc/hexanes, to give the product 24b (88 mg, 0.421 mmol, 84%, 83% ee) as yellow solids. $[α]_D^{23}$=+54° (c=0.55, CHCl$_3$); $^1$H NMR (400 MHz, CDCl$_3$) δ 8.23 (d, J=8.8 Hz, 2H), 7.56 (d, J=8.8 Hz, 2H), 5.27-5.31 (m, 1H), 3.60 (d, J=3.6 Hz, 1H), 2.82-2.92 (m, 2H), 2.25 (s, 3H); $^{13}$C NMR (100 MHz, CDCl$_3$) δ 208.5, 149.9, 147.4, 126.4, 123.8, 68.9, 51.5, 30.7; HPLC: Daicel Chiralpak OJ. Hexanes-i-PrOH, 90:10, 1 mL min$^{-1}$, 254 min: t$_R$ (major)=35.5 min; t$_R$ (minor)=40.8 min.

Example 23

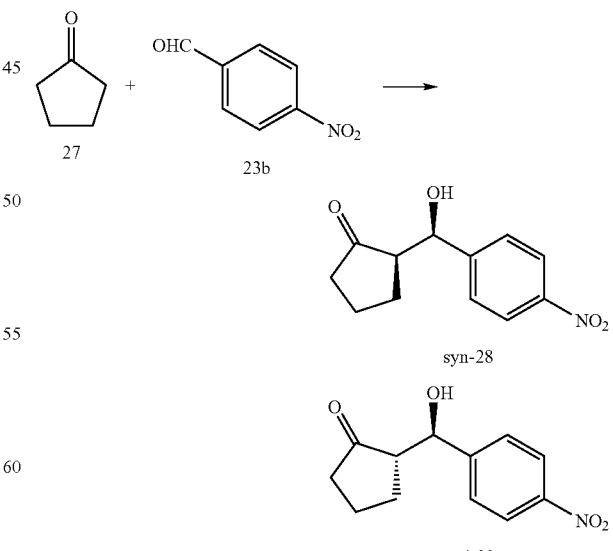

Aldol 28: To a solution of 23b (75 mg, 0.5 mmol) in EtOH/DCE (1:99, 0.6 mL) was added sulfonamide 15 (42.2 mg, 0.1 mmol) and cyclopentanone (27) (0.42 g, 0.44 mL, 5 mmol) at room temperature. After stirring at same temperature for 15 hours, the reaction was loaded directly onto silica gel and was purified by chromatography, eluting with CH$_2$Cl$_2$, to give the known products anti-28 (31 mg, 0.132 mmol, 26%, 80% ee) and syn-28 (84 mg, 0.357 mmol, 71%, 77% ee) as white solids. anti-28: $[\alpha]_D^{23}$=−77° (c=0.5, CHCl$_3$); $^1$H NMR (400 MHz, CDCl$_3$) δ 8.22 (d, J=8.8 Hz, 2H), 7.55 (d, J=8.4 Hz, 2H), 4.86 (d, J=9.2 Hz, 1H), 4.77 (s, 1H), 2.23-2.52 (m, 3H), 2.00-2.07 (m, 1H), 1.54-1.83 (m, 3H); $^{13}$C NMR (100 MHz, CDCl$_3$) δ 222.2, 148.7, 147.7, 127.4, 123.7, 74.4, 55.1, 38.6, 26.8, 20.4; HPLC: Daicel Chiralpak AD. Hexanes-i-PrOH, 90:10, 0.75 mL min$^{-1}$, 254 min: t$_R$ (major)=40.7 min; t$_R$ (minor)=38.2 min. syn-28: $[\alpha]_D^{23}$=+183° (c=0.6, CHCl$_3$); $^1$H NMR (300 MHz, CDCl$_3$) δ 8.22 (d, J=8.7 Hz, 2H), 7.54 (d, J=8.7 Hz, 2H), 5.44 (t, J=3.3 Hz, 1H), 2.37-2.65 (m, 3H), 1.70-2.23 (m, 5H); $^{13}$C NMR (100 MHz, CDCl$_3$) δ 219.8, 150.3, 147.1, 126.4, 123.6, 70.4, 56.1, 39.0, 22.4, 20.3; HPLC: Daicel Chiralpak AD. Hexanes-i-PrOH, 90:10, 1 mL min$^{-1}$, 254 min: t$_R$ (major)=21.5 min; t$_R$ (minor)=16.1 min.

Example 24

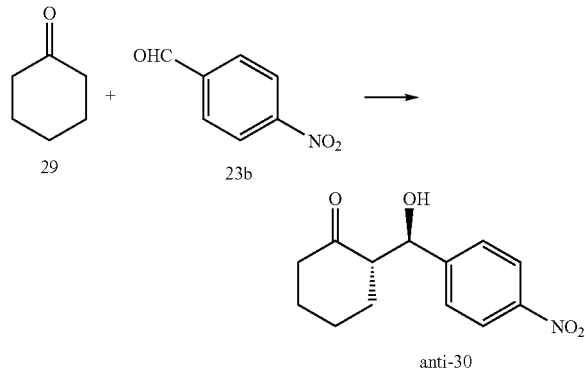

Aldol 30: To a solution of 23b (75 mg, 0.5 mmol) in EtOH/DCE (1:99, 0.5 mL) was added sulfonamide 15 (42.2 mg, 0.1 mmol) and cyclohexanone (29) (0.49 g, 0.52 mL, 5 mmol) at room temperature. After stirring at same temperature for 36 hours, the reaction was loaded directly onto silica gel and was purified by chromatography, eluting with 5-20% EtOAc/hexanes, to give the known product anti-30 (119 mg, 0.478 mmol, 96%, 97% ee) as white solids. $[\alpha]_D^{23}$=+8.0° (c=1.2, CHCl$_3$); $^1$H NMR (400 MHz, CDCl$_3$) δ 8.23 (d, J=8.7 Hz, 2H), 7.53 (d, J=8.7 Hz, 2H), 4.92 (dd, J=8.4, 3.2 Hz, 1H), 4.10 (d, J=3.2 Hz, 1H), 2.38-2.62 (m, 3H), 2.11-2.16 (m, 1H), 1.38-1.87 (m, 5H); $^{13}$C NMR (100 MHz, CDCl$_3$) δ 214.8, 148.4, 147.6, 127.9, 123.6, 74.0, 57.2, 42.7, 30.8, 27.7, 24.7; HPLC: Daicel Chiralpak AD. Hexanes-i-PrOH, 90:10, 1 mL min$^{-1}$, 254 min: t$_R$ (major)=41.1 min; t$_R$ (minor)=32.7 min.

Example 25

Sulfonamide 17, Scheme 3: To a solution of p-dodecylbenzenesulfonyl chloride (16) (1.25 g, 3.62 mmol) in CHCl$_3$ (6 mL) was NH$_4$OH (2.5 mL, 2.26 g, 18.1 mmol) at rt. After stirring vigorously for 2 hours, the reaction mixture was extracted with CHCl$_3$ (3×10 mL). The organic layer was dried over MgSO$_4$ and concentrated under reduced pressure to give the product 17 (1.17 g, 3.60 mmol, 99%). $^1$H NMR (400 MHz, CDCl$_3$) 7.86-7.88 (m, 2H), 7.29-7.35 (m, 2H), 5.03 (s, 2H), 0.78-1.68 (m, 25H); $^{13}$C NMR (100 MHz, CDCl$_3$) δ 139.2, 128.4, 127.8, 126.5, 47.9, 46.1, 40.0, 38.1, 36.7, 31.9, 29.7, 29.5, 29.2, 27.5, 22.7, 14.1.

Example 26

Cbz Proline Sulfonamide 19, Scheme 3: To a solution of Cbz-L-proline 18 (0.609 g, 2.45 mmol) in CH$_2$Cl$_2$ (24 mL) was added sulfonamide 17 (0.795 g, 2.45 mmol), DMAP (0.048 g, 0.391 mmol) and EDCl (0.470 g, 2.45 mmol) respectively. The reaction mixture was stirred at room temperature for 72 hours before being partitioned between EtOAc (30 mL) and aq. HCl (20 mL, 1N). The organic layer was washed with half-saturated brine. The dried (Na$_2$SO$_4$) extract was concentrated in vacuo and purified by chromatography over silica gel, eluting with 10% EtOAc/CH$_2$Cl$_2$, to give 19 (1.15 g, 2.06 mmol, 84%) as a colourless liquid. $[\alpha]_D^{23}$=−89° (c=2.5, CHCl$_3$); IR (neat) 3148, 2955, 2925, 2856, 1720, 1677, 1449, 1411, 1355, 1174, 1131, 1088, 826, 692 cm$^{-1}$; $^1$H NMR (300 MHz, CDCl$_3$) 10.4 (br s, 1H), 7.93-7.95 (m, 2H), 7.26-7.40 (m, 7H), 5.23 (s, 2H), 4.31 (br s, 1H), 3.42 (m, 2H), 2.45-2.57 (m, 1H), 0.85-1.87 (m, 28H); $^{13}$C NMR (75 MHz, CDCl$_3$) δ 169.0, 157.2, 135.9, 128.6, 128.4, 128.3, 128.1, 127.5, 68.1, 60.8, 47.2, 46.2, 38.8, 38.1, 36.6, 31.8, 29.6, 29.3, 27.5, 27.2, 26.7, 24.3, 22.7, 14.1; HRMS (EI+) calcd. for C$_{31}$H$_{45}$N$_2$O$_5$S (M+1), 557.3049 found 557.3067.

Example 27

Hua Cat 15, Scheme 3: To a solution of Cbz-L-sulfonamide 19 (1.02 g, 1.84 mmol) in MeOH (56 mL) was added 10% Pd/C (110 mg). The mixture was stirred at room temperature for 20 h under an atmosphere of hydrogen. After 24 hours, the reaction was filtered through Celite and silica gel pad, and the filtrate was concentrated in vacuo to give white solid. The crude product was purified by chromatography, eluting with 10% MeOH/CH$_2$Cl$_2$, to give the product 15 (0.699 g, 1.66 mmol, 90%) as a white solid. Mp: 184-186° C.; $[\alpha]_D^{23}$=−95° (c=1.0, CHCl$_3$); IR (neat) 3135, 2955, 2920, 2852, 1626, 1458, 1372, 1308, 1144, 1084, 843 cm$^{-1}$; $^1$H NMR (400 MHz, CDCl$_3$) 8.73 (br s, 1H), 8.06 (br s, 1H), 7.85 (d, J=8.0 Hz, 2H), 7.22-7.26 (m, 2H), 4.33 (t, J=8.0 Hz, 1H), 3.23-3.43 (m, 2H), 2.33-2.40 (m, 1H), 0.82-2.05 (m, 28H); $^{13}$C NMR (75 MHz, CDCl$_3$) δ 173.8, 140.4, 127.8, 127.2, 126.4, 62.8, 47.8, 39.9, 38.2, 36.8, 31.9, 31.8, 30.1, 29.7, 29.6, 29.3, 29.2, 27.6, 27.2, 24.5, 22.7, 14.1; HRMS (EI+) calcd. for C$_{22}$H$_{39}$N$_2$O$_3$S (M+1), 423.2681 found 423.2701.

Example 28

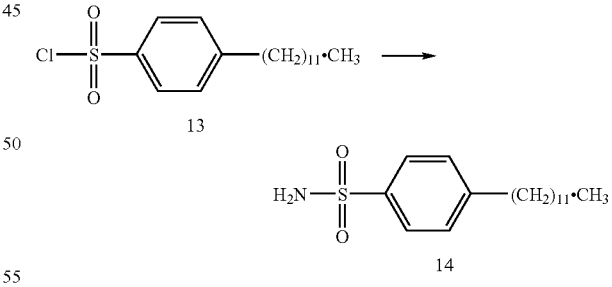

Sulfonamide 14. To a solution of p-dodecylbenzenesulfonyl chloride (13) (1.25 g, 3.62 mmol) in CHCl$_3$ (6 mL) was NH$_4$OH (2.5 mL, 2.26 g, 18.1 mmol) at rt. After stirring vigorously for 2 h, the reaction mixture was extracted with CHCl$_3$ (3×10 mL). The organic layer was dried over MgSO$_4$ and concentrated under reduced pressure to give the product 14 (1.17 g, 3.60 mmol, 99%). Compound 13 is sold as a mixture of isomers on the C$_{12}$H$_{25}$ alkyl chain. No attempt was made to separate the isomers in this sequence and the isomeric mixture does not appear to adversely affect the reactivity. $^1$H NMR (400 MHz, CDCl$_3$) 7.86-7.88 (m, 2H), 7.29-7.35 (m, 2H), 5.03 (s, 2H), 0.78-1.68 (m, 25H); $^{13}$C NMR (100 MHz, CDCl$_3$) δ 139.2, 128.4, 127.8, 126.5, 47.9, 46.1, 40.0, 38.1, 36.7, 31.9, 29.7, 29.5, 29.2, 27.5, 22.7, 14.1.

Example 29

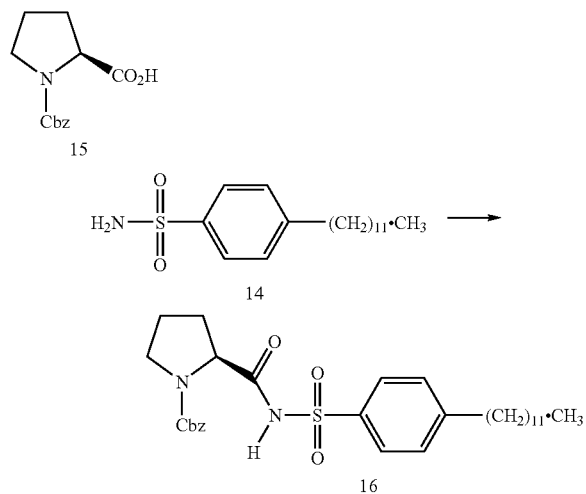

Cbz sulfonamide 16: To a solution of Z-L-proline 15 (3.16 g, 12.7 mmol) in CH$_2$Cl$_2$ (127 mL) was added sulfonamide 14 (4.13 g, 12.7 mmol), DMAP (0.248 g, 2.03 mmol) and EDCl (2.44 g, 12.7 mmol) respectively. The reaction mixture was stirred at room temperature for 72 h before being partitioned between EtOAc (180 mL) and aq. HCl (120 mL, 1 N). The organic layer was washed with half-saturated brine (2×50 mL). The dried (Na$_2$SO$_4$) extract was concentrated in vacuo and purified by chromatography over silica gel, eluting with 10% EtOAc/CH$_2$Cl$_2$, to give 16 (5.85 g, 10.5 mmol, 83%) as a colorless liquid. Compound 13 is sold as a mixture of isomers on the C$_{12}$H$_{25}$ alkyl chain. No attempt was made to separate the isomers in this sequence and the isomeric mixture does not appear to adversely affect the reactivity. [α]$_D^{23}$=+90° (c=2.2, CHCl$_3$); IR (neat) 3148, 2955, 2925, 2856, 1720, 1677, 1449, 1411, 1355, 1174, 1131, 1088, 826, 692 cm$^{-1}$; $^1$H NMR (300 MHz, CDCl$_3$) 10.4 (br s, 1H), 7.93-7.95 (m, 2H), 7.26-7.40 (m, 7H), 5.23 (s, 2H), 4.31 (br s, 1H), 3.42 (m, 2H), 2.45-2.57 (m, 1H), 0.85-1.87 (m, 28H); $^{13}$C NMR (100 MHz, CDCl$_3$) δ 169.0, 157.2, 135.9, 128.6, 128.4, 128.3, 128.1, 127.5, 68.1, 60.8, 47.2, 46.2, 38.8, 38.1, 36.6, 31.8, 29.6, 29.3, 27.5, 27.2, 26.7, 24.3, 22.7, 14.1; HRMS (EI+) calcd. for C$_{31}$H$_{45}$N$_2$O$_5$S (M+1), 557.3049 found 557.3067.

Example 30

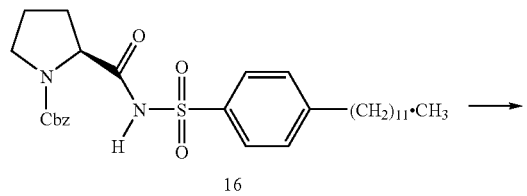

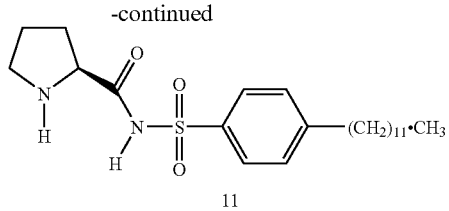

Sulfonamide 11: To a solution of Z-L-sulfamide 16 (4.99 g, 8.97 mmol) in MeOH (178 mL) was added Pd/C (536 mg, 10%). The mixture was stirred at rt for under an atmosphere of hydrogen. After 24 h, the reaction was filtered through Celite and silica gel pad, and the filtrate was concentrated in vacuo to give white solid. The crude product was purified by chromatography over silica gel, eluting with 10% MeOH/CH$_2$Cl$_2$, to give the product 11 (3.26 g, 7.73 mmol, 86%) as a white solid. Compound 13 is sold as a mixture of isomers on the C$_{12}$H$_{25}$ alkyl chain. No attempt was made to separate the isomers in this sequence and the isomeric mixture does not appear to adversely affect the reactivity. Mp: 184-186° C.; [α]$_D^{23}$=+94° (c=0.95, CHCl$_3$); IR (neat) 3135, 2955, 2920, 2852, 1626, 1458, 1372, 1308, 1144, 1084, 843 cm$^{-1}$; $^1$H NMR (400 MHz, CDCl$_3$) 8.73 (br s, 1H), 8.06 (br s, 1H), 7.85 (d, J=8.0 Hz, 2H), 7.22-7.26 (m, 2H), 4.33 (t, J=8.0 Hz, 1H), 3.23-3.43 (m, 2H), 2.33-2.40 (m, 1H), 0.82-2.05 (m, 28H); $^{13}$C NMR (100 MHz, CDCl$_3$) δ 173.8, 140.4, 127.8, 127.2, 126.4, 62.8, 47.8, 39.9, 38.2, 36.8, 31.9, 31.8, 30.1, 29.7, 29.6, 29.3, 29.2, 27.6, 27.2, 24.5, 22.7, 14.1; HRMS (EI+) calcd. for C$_{22}$H$_{39}$N$_2$O$_3$S (M+1), 423.2681 found 423.2701.

Procedure A—(DCE, 20 mol % catalyst): To a solution of aldehyde (0.5 mmol) and cyclohexanone (0.245 g, 0.26 mL, 2.5 mmol, 5 equiv.) in DCE (0.24 mL) was added sulfonamide 11 (42.2 mg, 0.1 mmol) and water (0.5 mmol, 9 mg, 1 equiv.) at 4° C. After stirring at same temperature, the reaction was loaded directly onto silica gel and was purified by chromatography, eluting with 10-30% EtOAc/hexanes, to give the corresponding aldol product.

Procedure B (neat, 2 mol % catalyst): To a solution of aldehyde (0.5 mmol) and cyclohexanone (0.098 g, 0.1 mL, 1.0 mmol, 2 equiv.) was added sulfonamide 11 (4.2 mg, 0.01 mmol) and water (0.5 mmol, 9 mg, 1 equiv.) at rt. After stirring at same temperature, reaction was loaded directly onto silica gel and was purified by chromatography, eluting with 10-30% EtOAc/hexanes, to give the corresponding aldol product.

Example 31

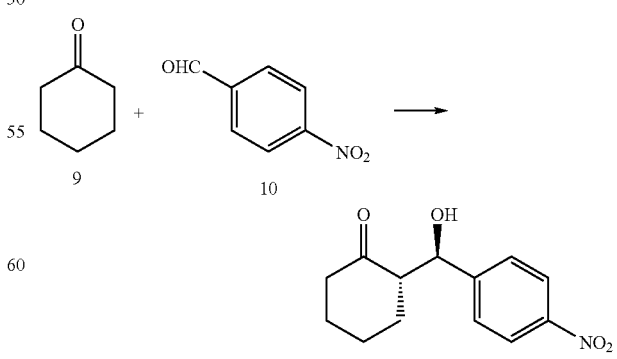

2-[Hydroxy-(4-nitro-phenyl)-methyl]-cyclohexan-1-one (12): (Procedure A: time 30 h, 118 mg, 95%, 99% ee, >99:1 dr. Procedure B: time 36 h, 119 mg, 96% ee, >99:1 dr) [α]$_D^{23}$=+8.0° (c=1.3, CHCl$_3$); $^1$H NMR (400 MHz, CDCl$_3$) δ 8.23 (d, J=8.7 Hz, 2H), 7.53 (d, J=8.7 Hz, 2H), 4.92 (dd, J=8.4, 3.2 Hz, 1H), 4.10 (d, J=3.2 Hz, 1H), 2.38-2.62 (m, 3H), 2.11-2.16 (m, 1H), 1.38-1.87 (m, 5H); $^{13}$C NMR (100 MHz, CDCl$_3$) δ 214.8, 148.4, 147.6, 127.9, 123.6, 74.0, 57.2, 42.7, 30.8, 27.7, 24.7; HPLC: Daicel Chiralpak AD. Hexanes-i-PrOH, 90:10, 1 mL min$^{-1}$, 254 nm: t$_R$ (major)=41.1 min; t$_R$ (minor)=32.7 min.

Large scale preparation of aldol product 12: To a solution of p-nitrobenzaldehyde (181 g, 1.2 mol) and cyclohexanone (235 g, 248 mL, 2.4 mol, 2 equiv.) was added sulfonamide 11 (10.1 g, 0.024 mol) and water (21.6 g, 21.6 mL, 1.2 mol) at rt. After stirring at same temperature for 48 h, the reaction mixture was filtered, and the solid filtrate 12 (163.6 g, 0.66 mol) was kept. The mother liquor recrystallized by dilution with hexanes and filtration to give additional material 12 (98.4 g, 39.5 mol-88% total yield, 97% ee, 98:1 dr). The catalyst was isolated via purification of the mother liquor through a small pad of silica gel (EtOAc –20% MeOH/CH$_2$Cl$_2$). The MeOH/CH$_2$Cl$_2$ solution was concentrated and recrystallized in MeOH to yield recovered catalyst 11 (6.42 g, 15.2 mmol, 63% recovery).

Example 32

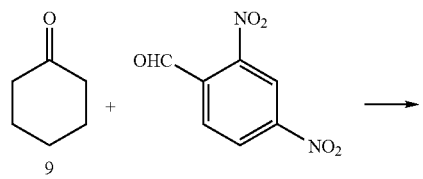

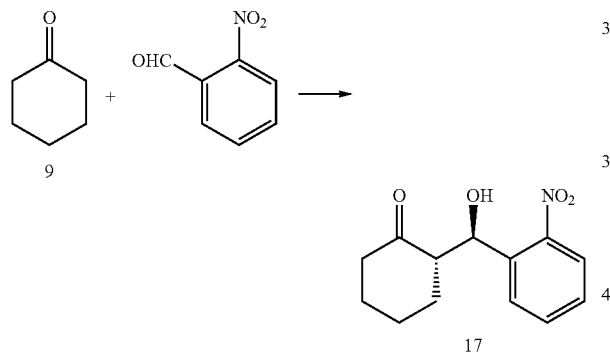

2-[Hydroxy-(2-nitro-phenyl)-methyl]-cyclohexan-1-one (17): (Procedure A: time 72 h, 113 mg, 91%, 99% ee, >99:1 dr) [α]$_D^{23}$=+16.3° (c=2.0, CHCl$_3$); $^1$H NMR (400 MHz, CDCl$_3$) δ 7.86 (dd, J=8.4, 1.6 Hz, 2H), 7.78 (dd, J=8.0, 2.4 Hz, 1H), 7.65 (td, J=8.0, 0.8 Hz, 1H), 7.44 (td, J=8.0, 1.6 Hz, 1H), 5.46 (d, J=6.8 Hz, 1H), 4.13 (br s, 1H), 2.74-2.79 (m, 1H), 2.34-2.48 (m, 2H), 2.09-2.13 (m, 1H), 1.58-1.88 (m, 5H); $^{13}$C NMR (100 MHz, CDCl$_3$) δ 215.0, 148.7, 136.6, 133.1, 129.0, 128.4, 124.1, 70.0, 57.3, 42.8, 31.1, 27.8, 25.0; HPLC: Daicel Chiralpak OJ. Hexanes-i-PrOH, 95:5, 1 mL min$^{-1}$, 254 nm: t$_R$ (major)=23.8 min; t$_R$ (minor)=21.8 min.

Example 33

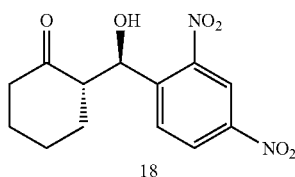

2-[Hydroxy-(2,4-dinitro-phenyl)-methyl]-cyclohexan-1-one (18): (Procedure A: time 72 h, 74.4 mg, 52%, 97% ee, >99:1 dr) [α]$_D^{23}$=+9.4° (c=2.3, CHCl$_3$); $^1$H NMR (400 MHz, CDCl$_3$) δ 8.75 (d, J=2.4 Hz, 1H), 8.48 (dd, J=8.4, 2.0 Hz, 1H), 8.09 (d, J=8.8 Hz, 1H), 5.53 (br s, 1H), 4.32 (d, J=4.0 Hz, 1H), 2.31-2.80 (m, 3H), 2.11-2.17 (m, 1H), 1.63-1.94 (m, 5H); $^{13}$C NMR (100 MHz, CDCl$_3$) δ 214.5, 148.2, 147.0, 143.9, 131.0, 127.1, 119.8, 70.1, 57.0, 42.9, 31.4, 27.7, 25.0; HPLC: Daicel Chiralpak AD. Hexanes-i-PrOH, 85:15, 1.0 mL min$^{-1}$, 254 nm: t$_R$ (major)=25.9 min; t$_R$ (minor)=23.0 min.

Example 34

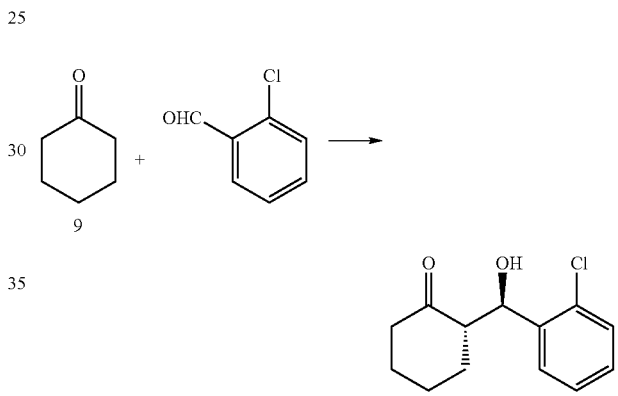

2-[Hydroxy-(2-chloro-phenyl)-methyl]-cyclohexan-1-one (19): (Procedure A: time 72 h, 94.2 mg, 79%, 98% ee, >99:1 dr. Procedure B: time 72 h, 79.7 mg, 67%, 99% ee, >99:1 dr) [α]$_D^{23}$=+21.2° (c=0.9, CHCl$_3$); $^1$H NMR (400 MHz, CDCl$_3$) δ 7.58 (dd, J=7.6, 1.6 Hz, 1H), 7.21-7.37 (m, 3H), 5.37 (dd, J=8.0, 3.6 Hz, 1H), 4.05 (d, J=4.0 Hz, 1H), 2.32-2.72 (m, 3H), 2.09-2.14 (m, 1H), 1.56-1.86 (m, 5H); $^{13}$C NMR (100 MHz, CDCl$_3$) δ 215.3, 139.1, 133.0, 129.2, 128.8, 128.3, 127.3, 70.5, 57.6, 42.8, 30.4, 27.8, 24.9; HPLC: Daicel Chiralpak OD. Hexanes-1-PrOH, 95:5, 0.8 mL min$^{-1}$, 220 nm: t$_R$ (major)=13.8 min; t$_R$ (minor)=17.3 min.

Example 35

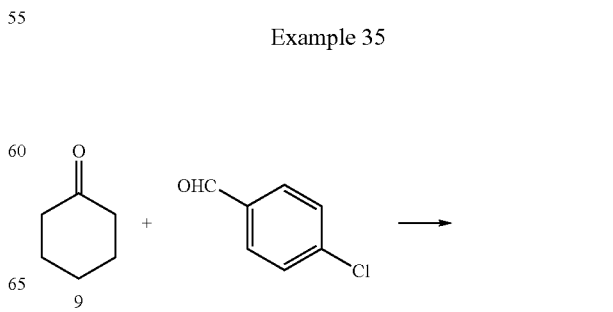

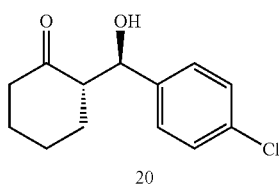

20

2-[Hydroxy-(4-chloro-phenyl)-methyl]-cyclohexan-1-one (20): (Procedure A: time 48 h, 81.0 mg, 68%, 99% ee, >99:1 dr). Procedure B: time 48 h, 57.1 mg, 49%, 92% ee, >99:1 dr) $[\alpha]_D^{23}$=+24.4° (c=0.96, CHCl$_3$); $^1$H NMR (400 MHz, CDCl$_3$) δ 7.34 (d, J=8.4 Hz, 2H), 7.28 (d, J=8.4 Hz, 2H), 4.78 (dd, J=8.8, 2.4 Hz, 1H), 4.01 (d, J=2.8 Hz, 1H), 2.37-2.61 (m, 3H), 2.07-2.14 (m, 1H), 1.28-1.84 (m, 5H); $^{13}$C NMR (100 MHz, CDCl$_3$) δ 215.3, 139.5, 133.6, 128.6, 128.4, 74.1, 57.4, 42.7, 30.8, 27.7, 24.7; HPLC: Daicel Chiralpak AD. Hexanes-i-PrOH, 90:10, 0.5 mL min$^{-1}$, 220 nm: $t_R$ (major)=35.7 min; $t_R$ (minor)=30.7 min.

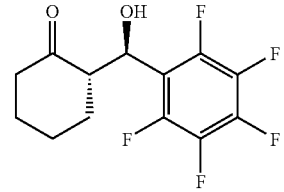

22

2-[Hydroxy-(pentafluorophenyl)-methyl]-cyclohexan-1-one (22): (Procedure A: time 36 h, 134 mg, 91%, >99% ee, >99:1 dr) $[\alpha]_D^{23}$=−17° (c=1.4, CHCl$_3$); $^1$H NMR (400 MHz, CDCl$_3$) δ 5.34 (dd, J=9.6, 3.2 Hz, 1H), 3.94 (d, J=3.2 Hz, 1H), 2.99-3.06 (m, 1H), 1.37-2.56 (m, 8H); $^{13}$C NMR (100 MHz, CDCl$_3$) δ 214.2, 145.3 (appt d, $J_{C-F}$=254 Hz), 140.9 (appt d, $J_{C-F}$=254 Hz), 137.6 (appt d, $J_{C-F}$=254 Hz), 113.7 (m), 66.0, 54.2, 42.4, 30.2, 27.5, 24.5; HPLC: Daicel Chiralpak AD. Hexanes-i-PrOH, 90:10, 0.5 mL min$^{-1}$, 254 nm: $t_R$ (major)= 17.8 min; $t_R$ (minor)=22.1 min.

Example 36

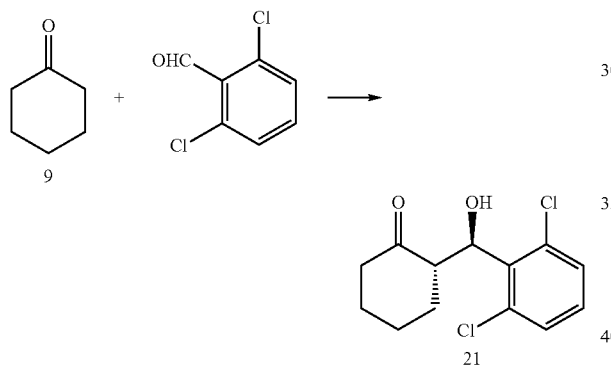

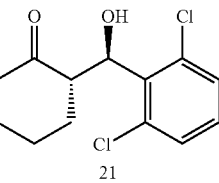

21

2-[Hydroxy-(2,4-dichloro-phenyl)-methyl]-cyclohexan-1-one (21): (Procedure A: time 48 h, 128 mg, 94%, 99% ee, >99:1 dr) $[\alpha]_D^{23}$=−41.5° (c=2.1, CHCl$_3$); $^1$H NMR (400 MHz, CDCl$_3$) δ 7.33 (d, J=8.0 Hz, 2H), 7.17 (t, J=8.0 Hz, 2H), 5.86 (d, J=9.6 Hz, 1H), 3.69 (br s, 1H), 3.49-3.55 (m, 1H), 2.38-2.55 (m, 2H), 2.07-2.14 (m, 1H), 1.34-1.86 (m, 5H); $^{13}$C NMR (100 MHz, CDCl$_3$) δ 214.5, 135.7, 134.7, 129.4, 70.6, 53.7, 42.7, 29.9, 27.6, 24.7; HPLC: Daicel Chiralpak OJ. Hexanes-i-PrOH, 95:5, 1.0 mL min-1, 254 nm: tR (major)= 12.6 min; tR (minor)=10.9 min.

Example 38

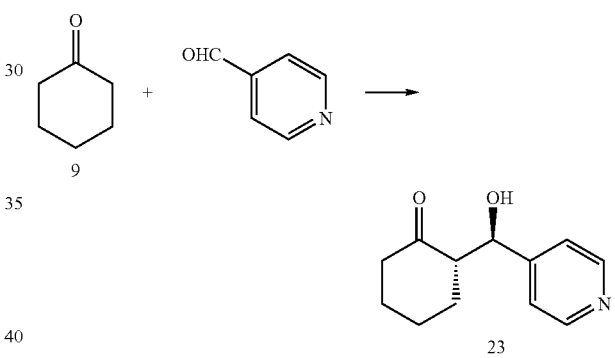

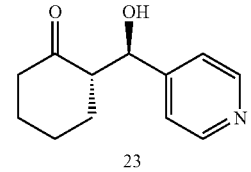

23

2-[Hydroxy-(pyridin-4-yl)-methyl]-cyclohexan-1-one (23): (Procedure A: time 24 h, 100 mg, 98%, 99% ee, 29:1 dr. Procedure B: time 36 h, 93.0 mg, 91%, 91% ee, 7:1 dr) $[c]_D^{23}$=+30.2° (c=0.96, CHCl$_3$); $^1$H NMR (400 MHz, CDCl$_3$) δ 8.55 (d, J=6.0 Hz, 2H), 7.25 (d, J=6.0 Hz, 2H), 4.80 (d, J=8.4 Hz, 1H), 4.29 (br s, 1H), 2.31-2.63 (m, 3H), 2.07-2.12 (m, 1H), 1.33-1.84 (m, 5H); $^{13}$C NMR (100 MHz, CDCl$_3$) δ 214.5, 150.1, 149.7, 122.1, 73.3, 56.9, 42.6, 30.7, 27.7, 24.7; HPLC: Daicel Chiralpak AD. Hexanes-i-PrOH, 90:10, 1.0 mL min$^{-1}$, 254 nm: $t_R$ (major)=24.5 min; $t_R$ (minor)=22.6 min.

Example 37

Example 39

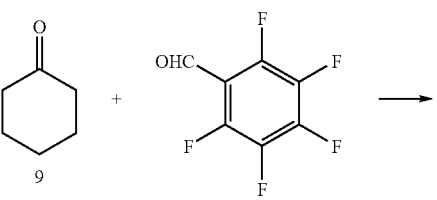

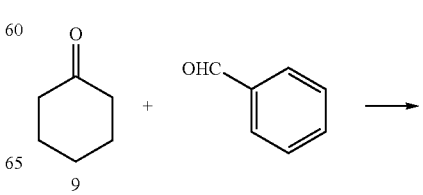

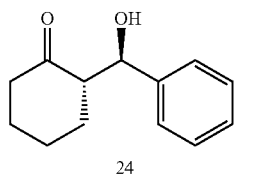

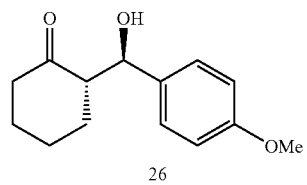

2-[Hydroxy-phenyl-methyl]-cyclohexan-1-one (24): (Procedure A: time 60 h, 61.4 mg, 60%, >99% ee, >99:1 dr). Procedure B: time 48 h, 76.8 mg, 75%, 99% ee, 55:1 dr) $[\alpha]_D^{23}$=+35.8° (c=1.1, CHCl$_3$); $^1$H NMR (400 MHz, CDCl$_3$) δ 7.29-7.39 (m, 5H), 4.92 (dd, J=8.8, 2.8 Hz, 1H), 3.98 (d, J=2.8 Hz, 1H), 2.34-2.68 (m, 3H), 2.08-2.14 (m, 1H), 1.25-1.83 (m, 5H); $^{13}$C NMR (100 MHz, CDCl$_3$) δ 215.5, 141.0, 128.4, 127.9, 127.0, 74.8, 57.5, 42.7, 30.9, 27.8, 24.7; HPLC: Daicel Chiralpak OJ. Hexanes-i-PrOH, 90:10, 1 mL min$^{-1}$, 254 nm: t$_R$ (major)=9.61 min; t$_R$ (minor)=11.5 min.

2-[Hydroxy-(4-methoxy-phenyl)-methyl]-cyclohexan-1-one (26): (Procedure A: time 72 h, 18.6 mg, 16%, 98% ee, 80:1 dr) $[\alpha]_D^{23}$=+17.8° (c=0.5, CHCl$_3$); $^1$H NMR (400 MHz, CDCl$_3$) δ 7.27 (d, J=8.4 Hz, 2H), 6.90 (d, J=8.8 Hz, 2H), 4.92 (d, J=7.6 Hz, 1H), 3.94 (d, J=2.4 Hz, 1H), 3.83 (s, 3H), 2.34-2.65 (m, 3H), 2.08-2.14 (m, 1H), 1.25-1.83 (m, 5H); $^{13}$C NMR (100 MHz, CDCl$_3$) δ 215.7, 159.3, 133.2, 128.2, 113.8, 74.3, 57.5, 55.3, 42.7, 30.9, 27.8, 24.8; HPLC: Daicel Chiralpak OJ. Hexanes-i-PrOH, 90:10, 1 mL min$^{-1}$, 230 nm: t$_R$ (major)=14.7 min; t$_R$ (minor)=19.3 min.

Example 40

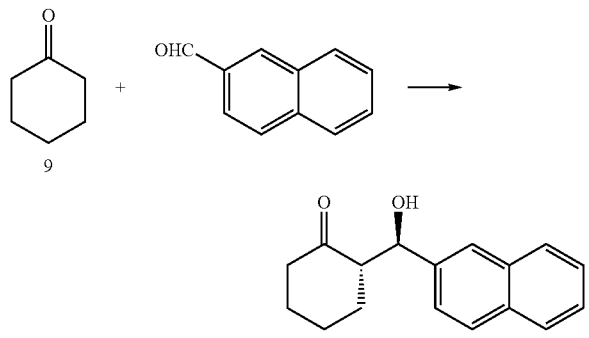

Example 42

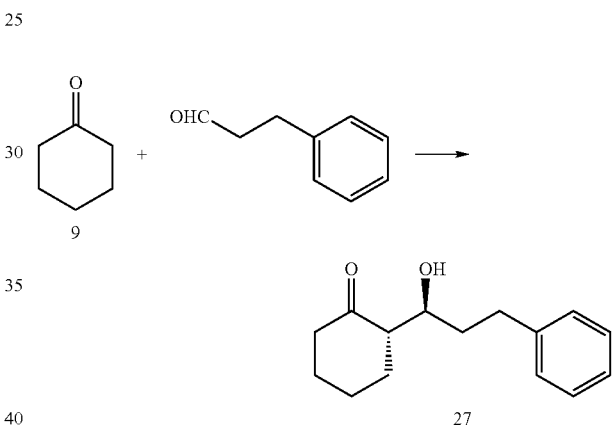

2-[Hydroxy-(naphthalen-2-yl)-methyl]-cyclohexan-1-one (25): (Procedure A: time 48 h, 65.0 mg, 63%, 99% ee, >99:1 dr) $[\alpha]_D^{23}$=+17.3° (c=0.8, CHCl$_3$); $^1$H NMR (400 MHz, CDCl$_3$) δ 7.85-7.88 (m, 2H), 7.78 (s, 1H), 7.48-7.52 (m, 3H), 4.99 (dd, J=8.8, 2.0 Hz, 1H), 4.09 (d, J=2.4 Hz, 1H), 2.51-2.78 (m, 2H), 2.40 (td, J=13.4, 6.0 Hz, 1H), 2.07-2.14 (m, 1H), 1.28-1.80 (m, 5H); $^{13}$C NMR (100 MHz, CDCl$_3$) δ 215.6, 138.3, 133.20, 133.16, 128.3, 128.0, 127.7, 126.3, 126.2, 126.0, 124.7, 74.9, 57.4, 42.7, 30.9, 27.8, 24.7; HPLC: Daicel Chiralpak OD. Hexanes-i-PrOH, 80:20, 1.0 mL min$^{-1}$, 254 nm: t$_R$ (major)=12.2 min; t$_R$ (minor)=10.1 min.

2-[Hydroxy-(phenyl)-propyl]-cyclohexan-1-one (27): (Procedure A (no H$_2$O was added, reaction performed at rt): time 72 h, 18.4 mg, 32%, 59% ee, 29:1 dr) $^1$H NMR (400 MHz, CDCl$_3$) δ 7.20-7.32 (m, 5H), 3.73-3.81 (m, 1H), 3.55 (d, J=6.4 Hz, 1H), 2.66-2.95 (m, 2H), 1.63-2.43 (m, 11H); $^{13}$C NMR (100 MHz, CDCl$_3$) δ 215.8, 142.3, 128.5, 128.4, 125.8, 70.9, 56.0, 42.9, 35.5, 31.6, 30.7, 27.8, 25.0; HPLC: Daicel Chiralpak AD. Hexanes-i-PrOH, 90:10, 1 mL min$^{-1}$, 254 nm: t$_R$ (major)=9.68 min; t$_R$ (minor)=10.6 min.

Example 43

Example 41

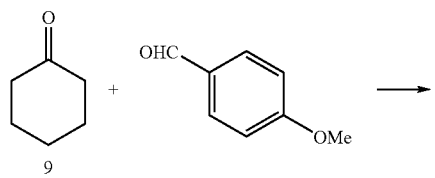

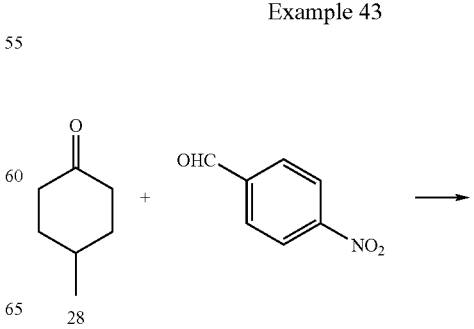

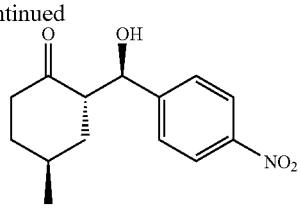

29

2-[Hydroxy-(4-nitro-phenyl)-methyl]-4-methylcyclohexan-1-one (29): (Procedure A: time 72 h, 122 mg, 93%, 97% ee, 49:1 dr) $[\alpha]_D^{23}=-48°$ (c=0.55, EtOAc); $^1$H NMR (400 MHz, CDCl$_3$) δ 8.21 (d, J=8.8 Hz, 2H), 7.51 (d, J=8.8 Hz, 2H), 4.94 (dd, J=8.4, 2.4 Hz, 1H), 3.96 (d, J=2.8 Hz, 1H), 2.38-2.79 (m, 3H), 1.26-2.11 (m, 5H), 1.06 (d, J=6.8 Hz, 3H); $^{13}$C NMR (100 MHz, CDCl$_3$) δ 214.9, 148.5, 147.6, 127.8, 123.7, 74.1, 52.9, 38.2, 36.1, 33.0, 26.6, 18.2; HPLC: Daicel Chiralpak AD. Hexanes-i-PrOH, 90:10, 1.0 mL min-1, 254 nm: tR (major)=33.4 min; tR (minor)=37.7 min.

Example 44

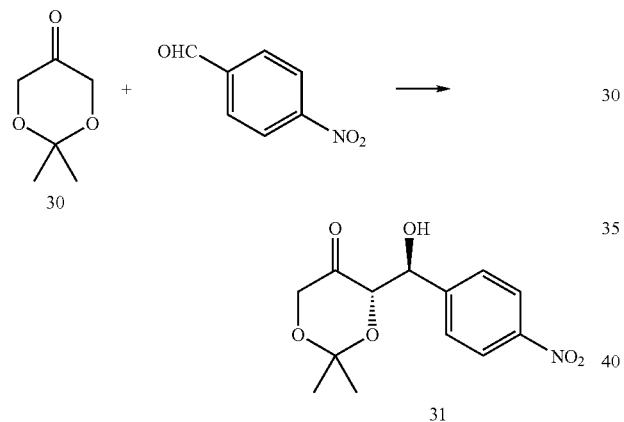

6-[Hydroxy-(4-nitro-phenyl)-methyl]-2,2-dimethyl-1,3-dioxan-5-one (31): (Procedure A: time 48 h, 140.2 mg, 99%, 78% ee, 11:1 dr) $[\alpha]_D^{23}=-139°$ (c=0.8, CHCl$_3$); $^1$H NMR (400 MHz, CDCl$_3$) δ 8.22 (d, J=8.8 Hz, 2H), 7.61 (d, J=8.8 Hz, 2H), 5.02 (d, J=6.4 Hz, 1H), 4.24-4.32 (m, 2H), 4.10 (d, J=17.6 Hz, 1H), 3.85 (s, 1H), 1.40 (s, 3H), 1.23 (s, 3H); $^{13}$C NMR (100 MHz, CDCl$_3$) δ 210.6, 147.7, 146.5, 127.9, 127.4, 123.5, 123.2, 101.4, 75.8, 71.7, 66.6, 23.5, 23.3; HPLC: Daicel Chiralpak OJ. Hexanes-i-PrOH, 90:10, 0.5 mL min$^{-1}$, 254 nm: $t_R$ (major)=18.5 min; $t_R$ (minor)=21.4 min.

Example 45

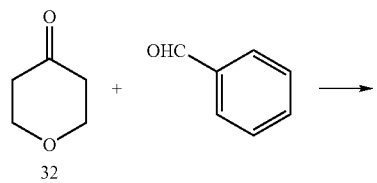

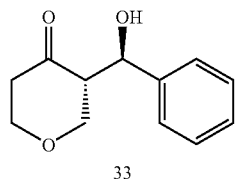

33

3-[(1'-Hydroxy-1'-phenyl)-methyl]-tetrahydropyran-4-one (33): (Procedure A (1.25 mmol 32): time 72 h, 24.0 mg, 47%, 94% ee, 41:1 dr) $[\alpha]_D^{23}=+6°$ (c=0.8, CHCl$_3$); $^1$H NMR (400 MHz, CDCl$_3$) δ 7.29-7.41 (m, 5H), 4.90 (dd, J=8.8, 2.8 Hz, 1H), 4.14-4.20 (m, 1H), 3.64-3.83 (m, 3H), 3.40 (dd, J=11.6, 9.6 Hz, 1H), 2.54-2.94 (m, 3H); $^{13}$C NMR (100 MHz, CDCl$_3$) δ 210.0, 140.1, 128.7, 128.4, 126.7, 72.1, 70.0, 68.4, 58.1, 42.7; HPLC: Daicel Chiralpak AD. Hexanes-i-PrOH, 85:15, 1.0 mL min$^{-1}$, 220 nm: $t_R$ (major)=16.4 min; $t_R$ (minor)=18.5 min.

Example 46

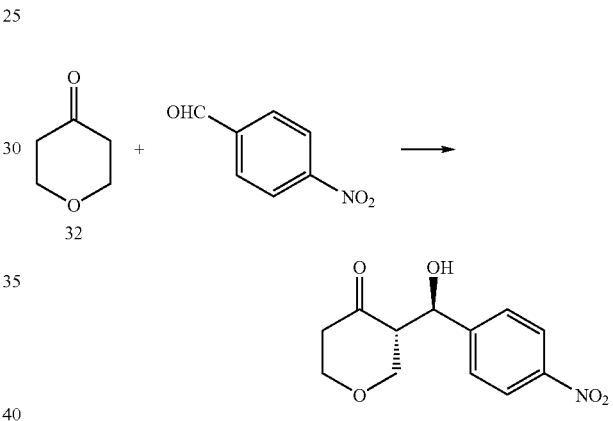

3-[(1'-Hydroxy-1'-(4"-nitrophenyl))methyl]-tetrahydropyran-4-one (34): (Procedure A (1.25 mmol 32): time 52 h, 57.9 mg, 92%, 96% ee, 5:1 dr) $[\alpha]_D^{23}=+1.3°$ (c=2.3, CHCl$_3$); $^1$H NMR (400 MHz, CDCl$_3$) δ 8.24 (d, J=8.8 Hz, 2H), 7.53 (d, J=8.8 Hz, 2H), 5.01 (dd, J=8.0, 3.2 Hz, 1H), 3.71-4.29 (m, 4H), 3.48 (t, J=11.2 Hz, 1H), 2.51-2.97 (m, 3H); $^{13}$C NMR (100 MHz, CDCl$_3$) δ 209.2, 147.8, 147.6, 127.5, 123.8, 71.3, 69.8, 68.4, 57.7, 42.8; HPLC: Daicel Chiralpak AD. Hexanes-i-PrOH, 80:20, 1.0 mL min$^{-1}$, 254 nm: $t_R$ (major)=27.4 min; $t_R$ (minor)=24.1 min.

Example 47

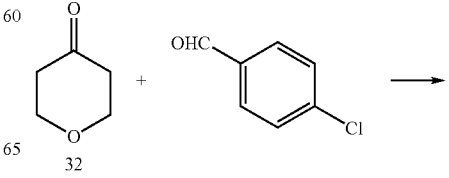

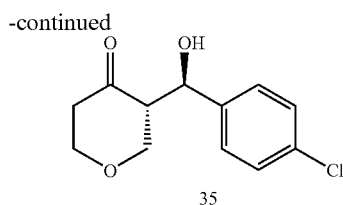

3-[(1'-Hydroxy-1'-(4''-chlorophenyl))methyl]-tetrahydro-pyran-4-one (35): (Procedure A (1.25 mmol 32): time 72 h, 36.0 mg, 60%, 97% ee, >99:1 dr) $[\alpha]_D^{23}=+3.4°$ (c=0.7, CHCl$_3$); $^1$H NMR (400 MHz, CDCl$_3$) δ 7.36 (d, J=8.4 Hz, 2H), 7.25 (d, J=8.4 Hz, 2H), 4.87 (dd, J=8.4, 2.8 Hz, 1H), 3.66-4.21 (m, 4H), 3.38 (t, J=9.6 Hz, 1H), 2.53-2.88 (m, 3H); $^{13}$C NMR (100 MHz, CDCl$_3$) δ 209.8, 138.7, 134.1, 128.9, 128.0, 71.5, 69.8, 68.4, 57.9, 42.8; HPLC: Daicel Chiralpak AD. Hexanes-i-PrOH, 90:10, 1.0 mL min$^{-1}$, 220 nm: $t_R$ (major)=28.5 min; $t_R$ (minor)=22.6 min.

Example 48

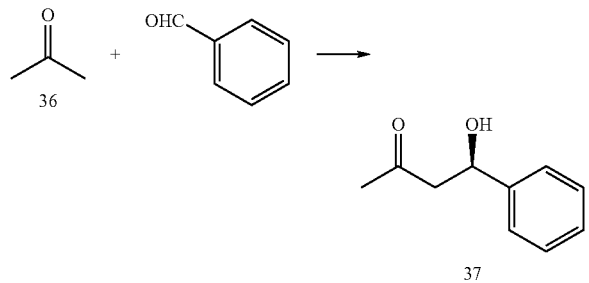

4-hydroxy-4-phenyl-butan-2-one (37): (Procedure A: time 72 h, 34.4 mg, 42%, 87% ee) $[\alpha]_D^{23}=+52°$ (c=0.7, CHCl$_3$); $^1$H NMR (400 MHz, CDCl$_3$) δ 7.29-7.39 (m, 5H), 5.18 (d, J=9.2 Hz, 1H), 3.30 (s, 1H), 2.83-2.95 (m, 2H), 2.22 (s, 3H); $^{13}$C NMR (100 MHz, CDCl$_3$) δ 209.1, 142.7, 128.6, 127.7, 125.6, 69.9, 52.0, 30.8; HPLC: Daicel Chiralpak AD. Hexanes-i-PrOH, 90:10, 1 mL min$^{-1}$, 257 nm: $t_R$ (major)=10.6 min; $t_R$ (minor)=11.4 min.

Example 49

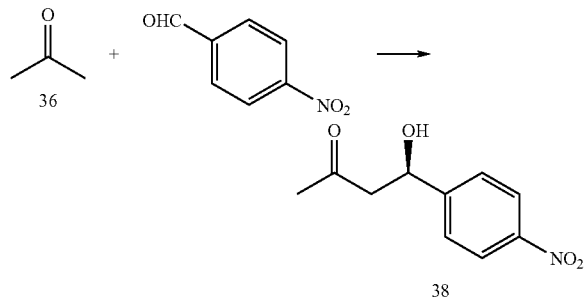

4-hydroxy-4-(4-nitrophenyl)-butan-2-one (38): (Procedure A: time 72 h, 67.4 mg, 64%, 83% ee) $[\alpha]_D^{23}=+54°$ (c=0.55, CHCl$_3$); $^1$H NMR (400 MHz, CDCl$_3$) δ 8.23 (d, J=8.8 Hz, 2H), 7.56 (d, J=8.8 Hz, 2H), 5.27-5.31 (m, 1H), 3.60 (d, J=3.6 Hz, 1H), 2.82-2.92 (m, 2H), 2.25 (s, 3H); $^{13}$C NMR (100 MHz, CDCl$_3$) δ 208.5, 149.9, 147.4, 126.4, 123.8, 68.9, 51.5, 30.7; HPLC: Daicel Chiralpak OJ. Hexanes-1-PrOH, 90:10, 1 mL min$^{-1}$, 254 nm: $t_R$ (major)=35.5 min; $t_R$ (minor)=40.8 min.

Example 50

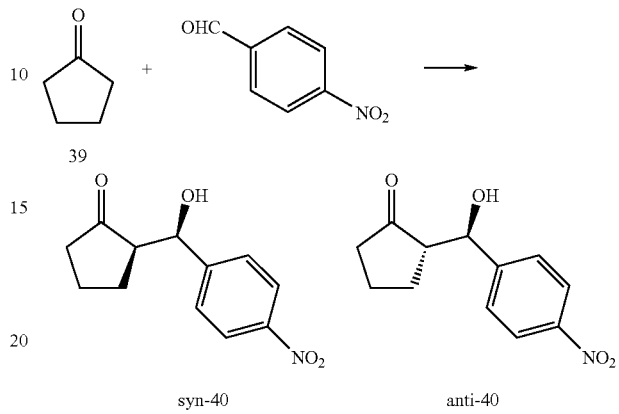

2-[Hydroxy-(4-nitro-phenyl)-methyl]-cyclopentan-1-one (40)

anti-40: (Procedure A: time 36 h, 34.1 mg, 29%, 92% ee) $[\alpha]_D^{23}=-77°$ (c=0.5, CHCl$_3$); $^1$H NMR (400 MHz, CDCl$_3$) δ 8.22 (d, J=8.8 Hz, 2H), 7.55 (d, J=8.4 Hz, 2H), 4.86 (d, J=9.2 Hz, 1H), 4.77 (s, 1H), 2.23-2.52 (m, 3H), 2.00-2.07 (m, 1H), 1.54-1.83 (m, 3H); $^{13}$C NMR (100 MHz, CDCl$_3$) δ 222.2, 148.7, 147.7, 127.4, 123.7, 74.4, 55.1, 38.6, 26.8, 20.4; HPLC: Daicel Chiralpak AD. Hexanes-i-PrOH, 90:10, 0.75 mL min$^{-1}$, 254 nm: $t_R$ (major)=40.7 min; $t_R$ (minor)=38.2 min.

syn-40: (Procedure A: time 36 h, 68.1 mg, 58%, 85% ee) $[\alpha]_D^{23}=+183°$ (c=0.6, CHCl$_3$); $^1$H NMR (300 MHz, CDCl$_3$) δ 8.22 (d, J=8.7 Hz, 2H), 7.54 (d, J=8.7 Hz, 2H), 5.44 (t, J=3.3 Hz, 1H), 2.37-2.65 (m, 3H), 1.70-2.23 (m, 5H); $^{13}$C NMR (100 MHz, CDCl$_3$) δ 219.8, 150.3, 147.1, 126.4, 123.6, 70.4, 56.1, 39.0, 22.4, 20.3; HPLC: Daicel Chiralpak AD. Hexanes-i-PrOH, 90:10, 1 mL min$^{-1}$, 254 nm: $t_R$ (major)=21.5 min; $t_R$ (minor)=16.1 min.

Example 51

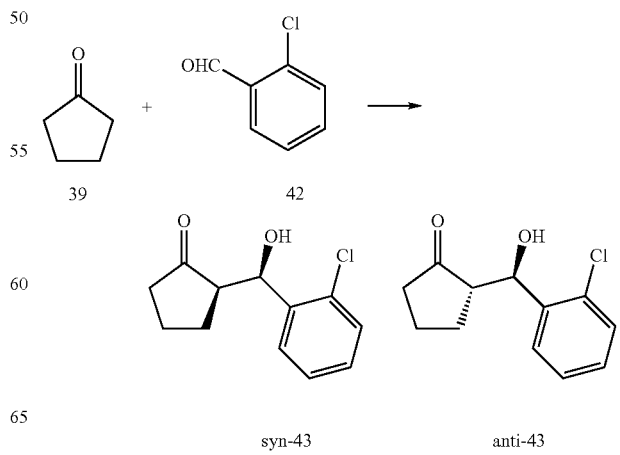

2-[Hydroxy-(2-chloro-phenyl)-methyl]-cyclopentan-1-one (43)

anti-43: (Procedure A: time 48 h, 23.0 mg, 20%, 93% ee) $^1$H NMR (400 MHz, CDCl$_3$) δ 7.61 (d, J=7.6 Hz, 1H), 7.22-7.37 (m, 3H), 5.33 (d, J=9.2 Hz, 1H), 4.55 (s, 1H), 2.28-2.52 (m, 3H), 2.03-2.07 (m, 1H), 1.71-1.80 (m, 3H); $^{13}$C NMR (100 MHz, CDCl$_3$) δ 222.9, 139.2, 132.4, 129.3, 128.9, 128.4, 127.4, 70.4, 55.6, 38.7, 26.4, 20.6; HPLC: Daicel Chiralpak AD. Hexanes-i-PrOH, 99.5:0.5, 1.0 mL min$^{-1}$, 220 nm: t$_R$ (major)=32.8 min; t$_R$ (minor)=36.3 min.

syn-43: (Procedure A: time 48 h, 34.4 mg, 31%, 81% ee) $^1$H NMR (400 MHz, CDCl$_3$) δ 7.62 (d, J=7.6 Hz, 1H), 7.21-7.36 (m, 3H), 5.71 (t, J=4.0 Hz, 1H), 2.68-2.73 (m, 1H), 1.72-2.48 (m, 7H); $^{13}$C NMR (100 MHz, CDCl$_3$) δ 220.0, 140.1, 131.1, 129.3, 128.4, 127.4, 126.9, 68.0, 53.5, 39.0, 22.6, 20.3; HPLC: Daicel Chiralpak AD. Hexanes-i-PrOH, 99.5:0.5, 1 mL min$^{-1}$, 220 nm: t$_R$ (major)=41.9 min; t$_R$ (minor)=49.8 min.

Example 52

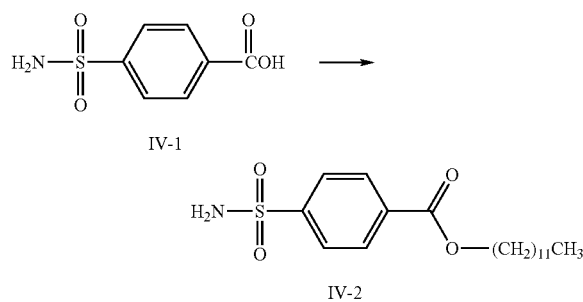

To a solution of carboxylic acid IV-1 (0.2 g, 1.0 mmol) in DMF (6 mL) was added 1-Dodecanol (0.392 g, 0.47 mL, 2.0 mmol), DMAP (66 mg, 0.54 mmol) and EDCl (0.192 g, 1.0 mmol) respectively. The reaction mixture was stirred at room temperature for 16 h before being partitioned between EtOAc (20 mL) and aq. HCl (10 mL, 1 N). The organic layer was washed with half-saturated brine (2×15 mL). The dried (Na$_2$SO$_4$) extract was concentrated in vacuo and purified by chromatography over silica gel, eluting with 5-30% EtOAc/CH$_2$Cl$_2$, to give ester IV-2 (0.195 g, 0.528 mmol, 53%) as a white solid. Mp: 105-106° C.; IR (neat) 3330, 2916, 2845, 1713, 1467, 1282, 1157, 1124, 1092, 906, 765, 738, 694 cm$^{-1}$; $^1$H NMR (400 MHz, CDCl$_3$) 8.20 (d, J=8.4 Hz, 2H), 8.02 (d, J=8.4 Hz, 2H), 4.99 (s, 2H), 4.38 (t, J=6.4 Hz, 2H), 1.79-1.83 (m, 2H), 1.29-1.46 (m, 19H), 0.90 (t, J=6.4 Hz, 3H); $^{13}$C NMR (100 MHz, CDCl$_3$) δ 165.2, 145.6, 134.4, 130.4, 126.5, 66.0, 31.9, 29.64, 29.58, 29.53, 29.4, 29.3, 28.6, 26.0, 22.7, 14.1.

Example 53

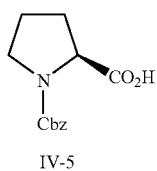

Example 54

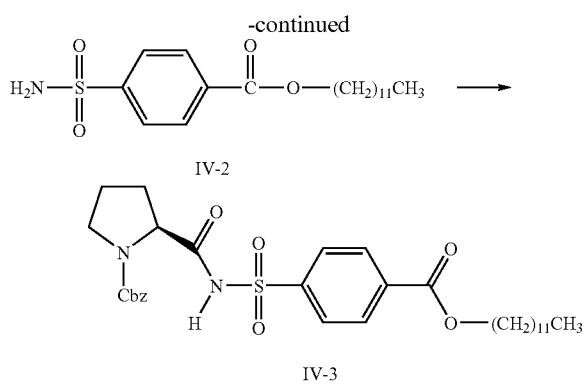

To a solution of Z-L-proline IV-5 (132 mg, 0.528 mmol) in CH$_2$Cl$_2$ (5.3 mL) was added sulfonamide IV-2 (195 mg, 0.528 mmol), DMAP (10.3 mg, 0.0844 mmol) and EDCl (101 mg, 0.528 mmol) respectively. The reaction mixture was stirred at room temperature for 7 d before being partitioned between DCM (15 mL) and aq. HCl (1 N, 10 mL). The organic layer was washed with half-saturated brine (2×10 mL). The dried (Na$_2$SO$_4$) extract was concentrated in vacuo and purified by chromatography over silica gel, eluting with 10% EtOAc/CH$_2$Cl$_2$, to give sulfonamide IV-3 (243 mg, 0.405 mmol, 78%) as a colorless liquid. [α]$_D^{23}$=−94.8° (c=3.1, CHCl$_3$); IR (neat) 3477, 2922, 2851, 1718, 1691, 1680, 1615, 1457, 1435, 1266, 1212, 1141, 1119, 1092, 988, 863, 825, 770, 738, 700, 618 cm$^{-1}$; $^1$H NMR (400 MHz, CDCl$_3$) 8.02 (d, J=8.0 Hz, 2H), 7.94 (d, J=7.6 Hz, 2H), 7.12-7.29 (m, 5H), 5.06 (d, J=12.4 Hz, 1H), 4.91 (d, J=12.4 Hz, 1H), 4.23-4.31 (m, 3H), 3.35-3.39 (m, 2H), 1.69-2.01 (m, 6H), 1.29-1.43 (m, 19H), 0.90 (t, J=6.4 Hz, 3H); $^{13}$C NMR (100 MHz, CDCl$_3$) δ 165.4, 156.2, 146.1, 136.3, 133.2, 129.6, 128.4, 127.9, 127.7, 127.0, 67.3, 65.5, 62.8, 46.9, 31.9, 29.65, 29.59, 29.4, 28.69, 26.0, 24.3, 22.7, 14.1.

Example 54

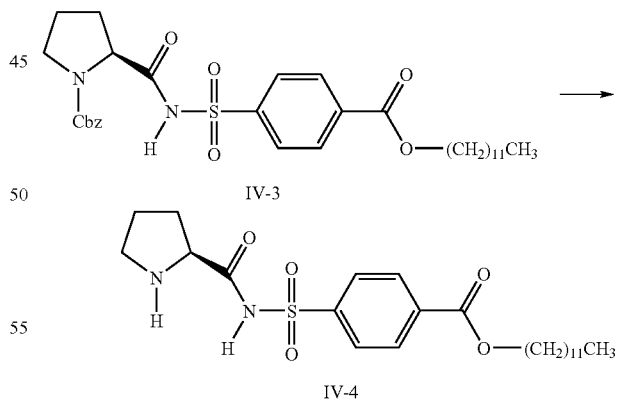

[HY8-11]. To a solution of Z-L-sulfamide IV-3 (200 mg, 0.333 mmol) in MeOH (10 mL) was added Pd/C (20 mg, 10%). The mixture was stirred at rt for under an atmosphere of hydrogen. After 16 h, the reaction was filtered through Celite and silica gel pad, and the filtrate was concentrated in vacuo to give white solid. The crude product was purified by chromatography over silica gel, eluting with 10% MeOH/CH$_2$Cl$_2$, to give the product IV-4 (133 mg, 0.285 mmol, 86%) as a white solid. Mp: 166-168° C.; $[\alpha]_D^{23}=-88.1°$ (c=0.7, CHCl$_3$); IR (neat) 3129, 3074, 2954, 2922, 2851, 1729, 1620, 1560, 1391, 1266, 1141, 1113, 1092, 858, 732, 694, 618 cm$^{-1}$; $^1$H NMR (400 MHz, CDCl$_3$) 8.67 (br s, 1H), 8.12 (d, J=8.4 Hz, 2H), 8.00 (d, J=8.4 Hz, 2H), 4.35 (t, J=6.8 Hz, 1H), 3.37-3.51 (m, 2H), 1.75-2.38 (m, 6H), 1.29-1.45 (m, 18H), 0.90 (t, J=7.2 Hz, 3H); $^{13}$C NMR (100 MHz, CDCl$_3$) δ 174.2, 165.6, 146.9, 133.3, 129.8, 126.5, 65.7, 63.0, 46.8, 31.9, 29.9, 29.63, 29.55, 29.35, 29.30, 28.7, 26.0, 24.6, 22.7, 14.1.

Example 55

General procedure for Mannich reaction in DCE: To a solution of aldimine (0.125 mmol) and cyclohexanone (61.1 mg, 64.5 μL, 0.625 mmol, 5 equiv.) in DCE (60 μL) was added HC (10.5 mg, 0.025 mmol) and water (2.3 mg 0.125 mmol,) at rt. After stirring at same temperature for 17 h to 72 h, the reaction was loaded directly onto silica gel and was purified by chromatography, eluting with 10-30% EtOAc/hexanes, to give the corresponding Mannich product.

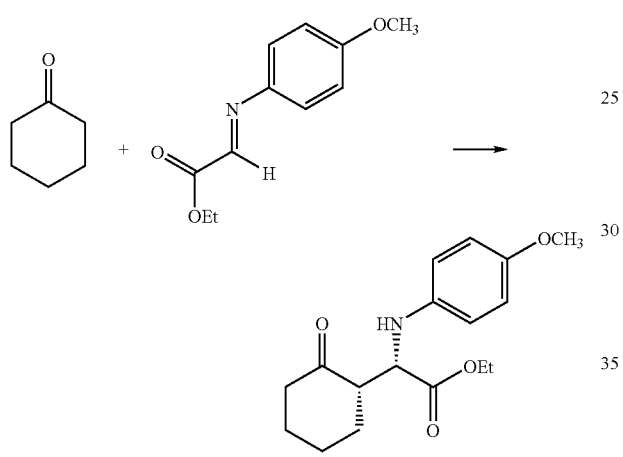

$[\alpha]_D^{23}=-41°$ (c=1.4, CHCl$_3$); $^1$H NMR (400 MHz, CDCl$_3$) δ 6.74-6.80 (m, 4H), 4.25 (d, J=4.8 Hz, 1H), 4.13-4.21 (m, 2H), 3.93 (br s, 1H), 3.75 (s, 3H), 2.83 (dt, J=12.4, 5.2 Hz, 1H), 1.67-2.50 (m, 8H), 1.24 (t, J=7.2 Hz, 3H); $^{13}$C NMR (100 MHz, CDCl$_3$) δ 210.1, 173.5, 153.1, 141.1, 116.1, 114.8, 61.1, 58.1, 55.7, 53.6, 41.9, 29.6, 26.9, 24.8, 14.2; HPLC: Daicel Chiralpak AD. Hexanes-i-PrOH, 92:8, 1 mL min$^{-1}$, 254 nm: t$_R$ (major)=23.1 min; t$_R$ (minor)=26.6 min.

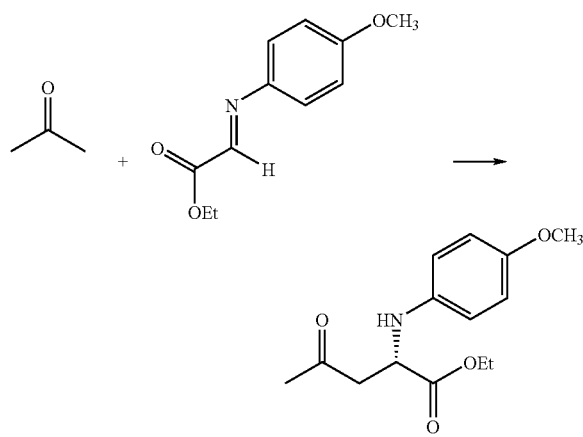

$^1$H NMR (400 MHz, CDCl$_3$) δ 6.78-6.80 (m, 2H), 6.66-6.92 (m, 2H), 4.36 (t, J=5.6 Hz, 1H), 4.20 (q, J=6.8 Hz, 2H), 3.77 (s, 3H), 2.99 (d, J=5.6 Hz, 1H), 2.21 (s, 3H), 1.26 (t, J=7.2 Hz, 3H); $^{13}$C NMR (100 MHz, CDCl$_3$) δ 205.9, 173.0, 153.1, 140.5, 115.8, 114.9, 61.5, 55.7, 54.3, 45.8, 30.4, 14.1; HPLC: Daicel Chiralpak AD. Hexanes-i-PrOH, 92:8, 1 mL min$^{-1}$, 254 nm: t$_R$ (major)=33.8 min; t$_R$ (minor)=29.3 min.

Example 56

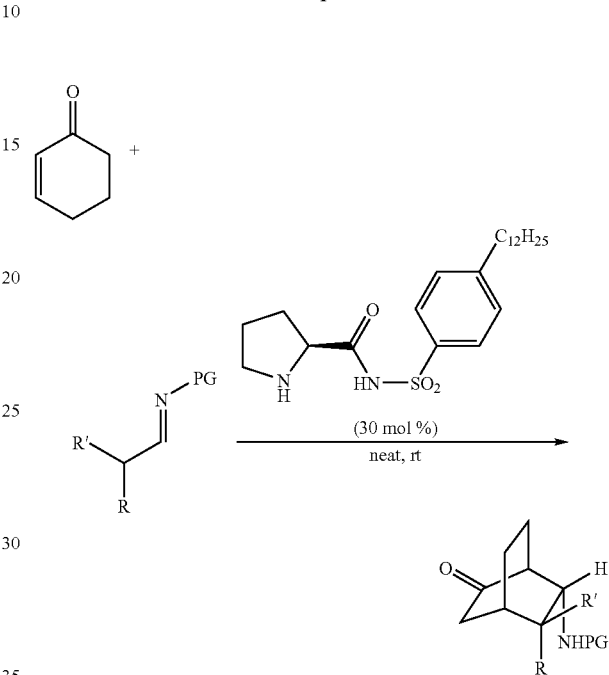

General procedure for formal aza-Diels-Alder reaction with cyclohexenone (30 mol % catalyst): To a solution of cyclohex-2-enone (2) (1.25 mmol, 0.12 mL, 10 equiv.) was added corresponding imine 3/5 (0.125 mmol) and sulfonamide 1 (15.8 mg, 0.375 mmol) at room temperature. After stirring at the same temperature for the denoted time, the reaction was loaded directly onto silica gel and was purified by chromatography, eluting with 2-20% EtOAc/hexanes, to give the corresponding product.

Example 57

3-(4-Chlorophenyl)-2-(3,4-dimethoxy-phenyl)-2-aza-bicyclo[2.2.2]octan-5-one (41): Reaction time 4 d. Purified by chromatography over silica gel, eluting with 2-20% EtOAc/hexanes, to give the bicycle 4f (29.1 mg, 63%, 99% ee, >99:1 dr, white solid). Enantiomeric excess was determined by chiral HPLC [4.6×250 mm Daicel OD column, 90:10 Hexanes/1-PrOH, 1.0 mL min-1, retention times 30.5 min (major) and 38.0 min (minor)] to be 99% ee: Mp: 42-43° C.; $[\alpha]^D_{23}=-86.4°$ (c=0.8, CHCl$_3$); IR (neat) 2943, 2867, 1729, 1511, 1244, 1026, 814, 759, 732 cm$^{-1}$; $^1$H NMR (400 MHz, CDCl$_3$) δ 7.36-7.41 (m, 4H), 6.73 (d, J=8.8 Hz, 1H), 6.20 (d, J=2.8 Hz, 1H), 6.13 (dd, J=8.4, 2.4 Hz, 1H), 4.73 (br s, 1H), 4.45 (br s, 1H), 3.79 (s, 3H), 3.68 (s, 3H), 2.79 (dt, J=19.2, 2.4 Hz, 1H), 2.64-2.66 (m, 1H), 2.42 (dd, J=18.4, 1.6 Hz, 1H), 2.27-2.32 (m, 1H), 1.62-1.97 (m, 3H); $^{13}$C NMR (100 MHz, CDCl$_3$) δ 213.2, 149.9, 143.0, 141.9, 139.0, 133.2, 129.1, 127.7, 113.1, 104.7, 99.4, 62.2, 56.5, 55.7, 50.9, 49.1, 42.1, 26.4, 16.2; HRMS (EI+) calcd. for C$_{21}$H$_{22}$NO$_3$Cl (M+), 371.1288 found 371.1281.

Example 58

3-(4-Chlorophenyl)-2-(2,4-dimethoxy-phenyl)-2-aza-bicyclo[2.2.2]octan-5-one (4g): Reaction time 4 d. Purified by chromatography over silica gel, eluting with 2-20% EtOAc/hexanes, to give the bicycle 4g (10.2 mg, 24%, 84% ee, >99:1 dr, colorless crystal). Enantiomeric excess was determined by chiral HPLC [4.6×250 mm Daicel OD column, 95: 5 Hexanes/1-PrOH, 1.0 mL min$^{-1}$, retention times 14.3 min (major) and 12.9 min (minor)] to be 84% ee: $[\alpha]_D^{23}$=+41.2° (c=1.1, CHCl$_3$); IR (neat) 2943, 1723, 1500, 1206, 836, 803, 738 cm$^{-1}$; NMR (400 MHz, CDCl$_3$) δ 7.40 (d, J=8.4 Hz, 2H), 7.26 (d, J=8.4 Hz, 2H), 6.87 (d, J=8.4 Hz, 1H), 6.49 (d, J=2.8 Hz, 1H), 6.31 (dd, J=8.8, 2.8 Hz, 1H), 5.18 (br s, 1H), 3.90 (s, 3H), 3.79 (br s, 1H), 3.74 (s, 3H), 2.79 (dt, J=18.8, 3.2 Hz, 1H), 2.46-2.55 (m, 2H), 2.24 (dd, J=18.8, 2.0 Hz, 1H), 1.84-1.90 (m, 1H), 1.59-1.71 (m, 2H); $^{13}$C NMR (100 MHz, CDCl$_3$) δ 215.3, 156.2, 154.7, 139.4, 132.7, 131.0, 128.5, 128.4, 121.7, 103.4, 100.2, 58.8, 55.5, 54.4, 55.0, 51.9, 42.4, 27.5, 16.4; HRMS (EI+) calcd. for C$_{21}$H$_{22}$NO$_3$Cl (M+), 371.1288 found 371.1290.

Example 59

3-(4-Methoxyphenylamino)-spiro[bicyclo[2.2.2]octane-2,1'-cyclohexane]-5-one (13a): Reaction time 48 h. Purified by chromatography over silica gel, eluting with 2-20% EtOAc/hexanes, to give the bicycle 13a (21.5 mg, 55%, 88% ee, >20:1 dr, light yellow oil). Enantiomeric excess was determined by chiral HPLC [4.6×250 mm Daicel OD column, 90:10 Hexanes/1-PrOH, 1.0 mL min$^{-1}$, retention times 17.4 min (major) and 23.1 min (minor)] to be 88% ee: Mp: 117-118° C.; $[\alpha]_D^{23}$=+40.9° (c=1.4, CHCl$_3$); IR (neat) 3374, 2856, 1723, 1511, 1462, 1239, 1184, 1043, 814, 765, 727 cm$^{-1}$; $^1$H NMR (400 MHz, CDCl$_3$) δ 6.77-6.79 (m, 2H), 6.56-6.59 (m, 2H), 3.76 (s, 3H), 3.32 (s, 1H), 3.24 (br s, 1H), 2.51 (dt, J=18.8, 2.8 Hz, 1H), 2.38-2.43 (m, 2H), 2.15 (dd, J=18.8, 2.4 Hz, 1H), 1.98-2.03 (m, 1H), 1.82-1.90 (m, 3H), 1.28-1.69 (m, 10H); $^{13}$C NMR (100 MHz, CDCl$_3$) δ 216.6, 152.2, 141.5, 115.2, 115.0, 64.2, 55.8, 49.4, 41.2, 39.1, 37.2, 32.1, 30.0, 25.9, 22.7, 22.1, 21.6, 20.2; HRMS (EI+) calcd. for C$_{20}$H$_{27}$NO$_2$ (M+), 313.2042 found 313.2031.

Example 60

3-(Benzylamino)-spiro[bicyclo[2.2.2]octane-2,1'-cyclohexane]-5-one (13b): Reaction time 8 h. Purified by chromatography over silica gel, eluting with 2-10% EtOAc/hexanes, to give the bicycle 13b (29.1 mg, 78%, 71% ee, 6:1 dr, colorless oil). Enantiomeric excess was determined by chiral HPLC [4.6×250 mm Daicel OD column, 99:1 Hexanes/1-PrOH, 1.0 mL min$^{-1}$, retention times 14.3 min (major) and 16.4 min (minor)] to be 71% ee: $[\alpha]_D^{23}$=+21.2° (c=1.9, CHCl$_3$); IR (neat) 3336, 2927, 2851, 1723, 1446, 1097, 738, 689 cm$^{-1}$; $^1$H NMR (400 MHz, CDCl$_3$) δ 7.24-7.39 (m, 5H), 3.95 (d, J=13.2 Hz, 1H), 3.59 (d, J=13.2 Hz, 1H), 2.50-2.62 (m, 3H), 1.24 (br s, 1H), 2.06 (dd, J=18.8, 2.8 Hz, 1H), 1.76-1.95 (m, 3H), 1.28-1.67 (m, 11H); $^{13}$C NMR (100 MHz, CDCl$_3$) δ 216.9, 140.4, 128.3, 128.2, 126.9, 65.8, 51.5, 47.8, 41.0, 38.4, 37.6, 30.1, 26.1, 22.8, 22.7, 21.1, 20.6; HRMS (EI+) calcd. for C$_{20}$H$_{27}$NO (M+), 297.2093 found 297.2098.

Example 61

3-(4-Chlorophenylamino)-spiro[bicyclo[2.2.2]octane-2,1'-cyclohexane]-5-one (13c): Reaction time 5 d. Purified by chromatography over silica gel, eluting with 2-20% EtOAc/hexanes, to give the bicycle 13c (18.6 mg, 47%, 87% ee, >20:1 dr, colorless crystal). Enantiomeric excess was determined by chiral HPLC [4.6×250 mm Daicel OD column, 90:10 Hexanes/1-PrOH, 1.0 mL min$^{-1}$, retention times 9.6 min (major) and 10.7 min (minor)] to be 87% ee: Mp: 139-141° C.; $[\alpha]_D^{23}$=+56.7° (c=0.9, CHCl$_3$); IR (neat) 3374, 2927, 2862, 1718, 1593, 1489, 1315, 1097, 808 cm$^{-1}$; $^1$H NMR (400 MHz, CDCl$_3$) δ 7.12 (d, J=8.8 Hz, 2H), 6.51 (d, J=8.8 Hz, 2H), 3.56 (d, J=10.0 Hz, 1H), 3.37 (dd, J=10.0, 2.4 Hz, 1H), 2.51 (dt, J=19.2, 3.2 Hz, 1H), 2.395-2.402 (m, 2H), 2.17 (dd, J=19.2, 2.8 Hz, 1H), 1.83-2.06 (m, 4H), 1.28-1.67 (m, 10H); $^{13}$C NMR (100 MHz, CDCl$_3$) δ 216.2, 145.9, 129.2, 121.9, 114.4, 62.7, 49.6, 41.2, 39.2, 37.5, 32.1, 30.1, 25.8, 22.6, 22.1, 21.5, 20.2; HRMS (EI+) calcd. for C$_{19}$H$_{24}$NOCl (M+), 317.1546 found 317.1556.

Example 62

5,5-dimethyl-6-(4-methoxyphenylamino)-bicyclo[2.2.2]octan-2-one (15): Reaction time 46 h. Purified by chromatography over silica gel, eluting with 2-20% EtOAc/hexanes, to give the bicycle 15 (21.2 mg, 62%, 87% ee, 14:1 dr, colorless crystal). Enantiomeric excess was determined by chiral HPLC [4.6×250 mm Daicel OD column, 95:5 Hexanes/1-PrOH, 1.0 mL min$^{-1}$, retention times 16.2 min (major) and 17.9 min (minor)] to be 87% ee: (time 46 h, 2-20% EtOAc/hexanes, 21.2 mg, 62%, 87% ee, 14:1 dr, light yellow solid); Mp: 59-60° C.; $[\alpha]_D^{23}$=+47.9° (c=0.8, CHCl$_3$); IR (neat) 3385, 2954, 2894, 1713, 1511, 1467, 1233, 1097, 1037, 819 cm$^{-1}$; $^1$H NMR (400 MHz, CDCl$_3$) δ 6.76-6.80 (m, 2H), 6.55-6.58 (m, 2H), 3.76 (s, 3H), 3.43 (d, J=2.0 Hz, 1H), 3.33 (br s, 1H), 2.60 (dt, J=18.8, 3.2 Hz, 1H), 2.39-2.40 (m, 1H), 2.10-2.18 (m, 2H), 1.81-1.98 (m, 3H), 1.58-1.65 (m, 1H), 1.13 (s, 3H), 1.03 (s, 3H); $^{13}$C NMR (100 MHz, CDCl$_3$) δ 216.3, 152.2, 141.5, 115.1, 114.9, 63.4, 55.8, 49.2, 42.2, 40.3, 36.9, 29.6, 22.7, 21.8, 21.1; HRMS (EI+) calcd. for C$_{17}$H$_{23}$NO$_2$ (M+), 273.1729 found 273.1719.

Example 63

5,5-diethyl-6-(4-methoxyphenylamino)-bicyclo[2.2.2]octan-2-one (17): Reaction time 4 d. Purified by chromatography over silica gel, eluting with 2-20% EtOAc/hexanes, to give the bicycle 17 (12.8 mg, 34%, 87% ee, 14:1 dr, white solid). Enantiomeric excess was determined by chiral HPLC [4.6×250 mm Daicel OD column, 90:10 Hexanes/1-PrOH, 1.0 mL min$^{-1}$, retention times 11.1 min (major) and 27.5 min (minor)] to be 87% ee: Mp: 88-90° C.; $[\alpha]_D^{23}$=+62.7° (c=1.0, CHCl$_3$); IR (neat) 3379, 2960, 1718, 1506, 1239, 1032, 819 cm$^{-1}$; $^1$H NMR (400 MHz, CDCl$_3$) δ 6.76-6.79 (m, 2H), 6.55-6.58 (m, 2H), 3.76 (s, 3H), 3.45 (br s, 1H), 3.29 (br s, 1H), 2.52 (dt, J=18.8, 3.2 Hz, 1H), 2.40-2.41 (m, 1H), 2.13 (dd, J=19.2, 2.4 Hz, 1H), 2.01-2.05 (m, 2H), 1.54-1.90 (m, 6H), 1.27-1.31 (m, 1H), 0.92 (t, J=7.2 Hz, 3H), 0.86 (t, J=7.2 Hz, 3H); $^{13}$C NMR (100 MHz, CDCl$_3$) δ 216.5, 152.4, 140.8, 115.5, 115.0, 63.7, 55.8, 48.8, 42.0, 40.9, 35.1, 29.8, 21.8, 20.9, 20.4, 8.55, 8.18; HRMS (EI+) calcd. for C$_{19}$H$_{27}$NO$_2$ (M+), 301.2042 found 301.2047.

Example 64

5-(4-Isopropylbenzyl)-5-methyl-6-(4-methoxyphenylamino)-bicyclo[2.2.2]octan-2-one (19): Reaction time 4 d. Purified by chromatography over silica gel, eluting with 2-20% EtOAc/hexanes, to give the bicycle 19 (13.2 mg, 27%, 91% ee, >20:1 dr, colorless oil). Enantiomeric excess was determined by chiral HPLC [4.6×250 mm Daicel OD column, 90:10 Hexanes/1-PrOH, 1.0 mL min⁻¹, retention times 11.6 min (major) and 16.2 min (minor)] to be 91% ee: $[\alpha]_D^{23}=-18.6°$ (c=1.2, CHCl₃); IR (neat) 3363, 2954, 1713, 1506, 1233, 1108, 1037, 814 cm⁻¹; ¹H NMR (400 MHz, CDCl₃) δ 7.15 (d, J=8.0 Hz, 2H), 7.09 (d, J=8.0 Hz, 2H), 6.79 (d, J=8.8 Hz, 2H), 6.59 (d, J=8.8 Hz, 2H), 3.77 (s, 3H), 3.52 (br s, 1H), 2.99 (d, J=13.2 Hz, 1H), 2.87 (d, J=13.2 Hz, 1H), 2.87-2.94 (m, 1H), 2.37-2.46 (m, 3H), 2.12 (dd, J=18.4, 2.0 Hz, 1H), 1.71-2.05 (m, 4H), 1.26 (d, J=7.2 Hz, 6H), 0.94 (s, 3H); ¹³C NMR (100 MHz, CDCl₃) δ 216.5, 152.6, 146.9, 141.0, 135.1, 130.4, 126.0, 115.9, 115.0, 65.0, 55.8, 48.3, 45.8, 41.9, 40.9, 35.3, 33.7, 24.0, 22.0, 20.8, 19.4; HRMS (EI+) calcd. for C₂₆H₃₃NO₂ (M+), 391.2511 found 391.2517.

Example 65

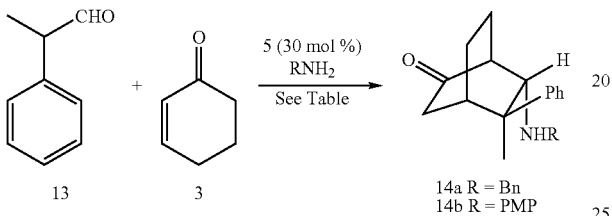

General Procedure for Three-Component Formal Aza-Diels-Alder Reaction with Cyclohexenone (30 mol % Catalyst)

The aldehyde (0.25 mmol) and amines (0.25 mmol) were dissolved in toluene (0.26 mL). After stirring at room temperature for 30 min, cyclohexenone (0.24 mL, 10 equiv.) and sulfonamide 15 (31.7 mg, 0.75 mmol) were added to it at 4° C. or room temperature. After stirring for the prescribed time, reaction was loaded directly onto silica gel and was purified by chromatography, eluting with 2-15% EtOAc/hexanes, to give the corresponding product.

Example 66

6-(Benzylamino)-5-methyl-5-phenyl-bicyclo[2.2.2]octan-2-one (14a)

Reaction time 3 d, 4° C. Purified by chromatography over silica gel, eluting with 2-6% EtOAc/hexanes, to give the bicycle 14a (57.5 mg, 72%, 93.3:6.7 er, >20:1 dr, colorless oil). Enantiomeric excess was determined by chiral HPLC [4.6×250 mm Daicel OD column, 99:1 Hexanes/1-PrOH, 1.0 mL min⁻¹, retention times 16.6 min (major) and 20.8 min (minor)] to be 93.3:6.7 er: $[U]_D^{23}=+40.1°$ (c=1.7, CHCl₃); IR (neat) 3330, 2949, 2867, 1718, 1495, 1457, 1113, 765, 694 cm⁻¹; ¹H NMR (400 MHz, CDCl₃) δ 7.41-7.42 (m, 4H), 7.37 (t, J=7.6 Hz, 2H), 7.26-7.31 (m, 3H), 7.20 (t, J=7.2 Hz, 1H), 4.09 (d, J=13.2 Hz, 1H), 3.76 (d, J=13.2 Hz, 1H), 3.51 (d, J=2.0 Hz, 1H), 2.70-2.71 (m, 3H), 2.29 (dd, J=19.6, 3.2 Hz, 1H), 1.37-1.86 (m, 5H), 1.22 (s, 3H); ¹³C NMR (100 MHz, CDCl₃) δ 216.5, 150.3, 140.2, 128.6, 128.4, 128.3, 127.1, 125.9, 125.7, 66.1, 51.5, 46.5, 44.7, 41.2, 37.1, 25.4, 21.7, 21.2; HRMS (CI+) calcd. for C₂₂H₂₅NO (M+), 319.1936 found 319.1926.

Example 67

6-(p-Methoxyphenylamino)-5-methyl-5-phenyl-bicyclo[2.2.2]octan-2-one (14b)

Reaction time 3 d. Purified by chromatography over silica gel, eluting with 2-10% EtOAc/hexanes, to give the bicycle 14b (40.6 mg, 53%, 98.3:1.7 er, >20:1 dr, colorless crystal). Enantiomeric excess was determined by chiral HPLC [4.6× 250 mm Daicel OD column, 92:8 Hexanes/1-PrOH, 1.0 mL min⁻¹, retention times 15.9 min (major) and 13.1 min (minor)] to be 98.3:1.7 er: Mp: 138-139° C.; $[\alpha]_D^{23}=+7.7°$ (c=1.0, CHCl₃); IR (neat) 3379, 2943, 1718, 1511, 1462, 1228, 1103, 1032, 819, 765, 705 cm⁻¹; ¹H NMR (400 MHz, CDCl₃) δ 7.53 (d, J=7.6 Hz, 2H), 7.36 (t, J=7.2 Hz, 2H), 7.26 (t, J=7.2 Hz, 1H), 6.81-6.84 (m, 2H), 6.66-6.68 (m, 2H), 4.24 (d, J=8.4 Hz, 1H), 3.79 (s, 3H), 3.66 (br s, 1H), 2.70-2.79 (m, 2H), 2.54 (s, 1H), 2.35 (dd, J=18.4, 2.0 Hz, 1H), 1.61-1.88 (m, 4H), 1.33 (s, 3H); ¹³C NMR (100 MHz, CDCl₃) δ 215.9, 152.7, 149.9, 140.2, 128.6, 126.2, 125.6, 115.7, 115.1, 63.4, 55.8, 47.6, 44.3, 41.2, 36.7, 25.1, 21.7, 21.1; HRMS (CI+) calcd. for C₂₂H₂₅NO₂ (M+), 335.1885 found 335.1874.

Example 68

6-(Benzylamino)-5-methyl-5-(4-methylphenyl)-bicyclo[2.2.2]octan-2-one (16a)

Reaction time 3 d, 4° C. Purified by chromatography over silica gel, eluting with 2-6% EtOAc/hexanes, to give the bicycle 16a (54.2 mg, 65%, 92.2:7.8 er, >20:1 dr, colorless oil). Enantiomeric excess was determined by chiral HPLC [4.6×250 mm Daicel OD column, 95:5 Hexanes/1-PrOH, 1.0 mL min⁻¹, retention times 10.5 min (major) and 12.7 min (minor)] to be 92.2:7.8 er: $[\alpha]_D^{23}=+34.2°$ (c=2.5, CHCl₃); IR (neat) 3341, 2943, 2867, 1718, 1457, 1113, 819, 700 cm⁻¹; ¹H NMR (400 MHz, CDCl₃) δ 7.43 (d, J=7.2 Hz, 2H), 7.37 (t, J=7.2 Hz, 2H), 7.29-7.32 (m, 3H), 7.10 (d, J=8.0 Hz, 2H), 4.09 (d, J=13.2 Hz, 1H), 3.76 (d, J=13.2 Hz, 1H), 3.50 (d, J=2.0 Hz, 1H), 2.64-2.71 (m, 3H), 2.26-2.38 (m, 5H), 1.46-1.86 (m, 4H), 1.21 (s, 3H); ¹³C NMR (100 MHz, CDCl₃) δ 216.6, 147.3, 140.2, 135.4, 129.0, 128.6, 128.4, 127.1, 125.6, 66.1, 51.5, 46.6, 44.3, 41.1, 37.2, 25.4, 21.7, 21.2, 20.9; HRMS (CI+) calcd. for C₂₃H₂₇NO (M+), 333.2093 found 333.2086.

Example 69

6-(Benzylamino)-5-(4-bromophenyl)-5-methyl-bicyclo[2.2.2]octan-2-one (16b)

The starting aldehyde 15b was prepared in accord with the literature procedure described by Baumann, Vogt; and Bräse in S. Eur. J. Org. Chem. 2007, 266-282. Reaction time 5 d, 4° C. Purified by chromatography over silica gel, eluting with 2-7% EtOAc/hexanes, to give the bicycle 16b (51.9 mg, 52%, 94.6:5.4 er, >20:1 dr, colorless oil). Enantiomeric excess was determined by chiral HPLC [4.6×250 mm Daicel OD column, 95:5 Hexanes/1-PrOH, 1.0 mL min⁻¹, retention times 14.2 min (major) and 19.3 min (minor)] to be 94.6:5.4 er: $[\alpha]_D^{23}=+34.4°$ (c=1.2, CHCl₃); IR (neat) 3342, 2945, 2875, 1719, 1490, 1451, 1112, 1077, 820, 727, 704 cm⁻¹; ¹H NMR (400 MHz, CDCl₃) δ 7.26-7.42 (m, 9H), 4.08 (d, J=12.8 Hz, 1H), 3.74 (d, J=13.2 Hz, 1H), 3.40-3.41 (m, 1H), 2.62-2.73 (m, 3H), 2.30 (dd, J=18.4, 1.2 Hz, 1H), 1.46-1.88 (m, 5H), 1.19 (s, 3H); ¹³C NMR (100 MHz, CDCl₃) δ 216.1, 149.4, 139.9, 131.3, 128.6, 128.4, 127.6, 127.3, 119.7, 66.0, 51.3, 46.2, 44.5, 41.1, 37.0, 25.1, 21.6, 21.1; HRMS (CI+) calcd. for C₂₂H₂₄ONBr (M+), 397.1041 found 397.1028.

Example 70

5-Methyl-5-(4-bromophenyl)-6-(4-methoxyphenylamino)-bicyclo[2.2.2]octan-2-one (16c)

The starting aldehyde 15b was prepared in accord with literature procedure described by Baumann, Vogt; and Bräse in S. *Eur. J. Org. Chem.* 2007, 266-282. Reaction time 3 d, rt. Purified by chromatography over silica gel, eluting with 2-10% EtOAc/hexanes, to give the bicycle 16c (51.9 mg, 51%, 95.4:4.6 er, >20:1 dr, colorless oil). Enantiomeric excess was determined by chiral HPLC [4.6×250 mm Daicel OD column, 95:5 Hexanes/1-PrOH, 1.0 mL min$^{-1}$, retention times 17.2 min (major) and 21.8 min (minor)] to be 95.4:4.6 er: [0]$_D^{23}$=−3.0° (c=1.0, CHCl$_3$); IR (neat) 3370, 2949, 1715, 1513, 1233, 1007, 824, 754, 719 cm$^{-1}$; $^1$H NMR (400 MHz, CDCl$_3$) 7.46 (d, J=8.8 Hz, 2H), 7.40 (d, J=8.8 Hz, 2H), 6.82 (d, J=8.8 Hz, 2H), 6.64 (d, J=8.8 Hz, 2H), 4.13 (d, J=10.0 Hz, 1H), 3.77 (s, 3H), 3.60 (d, J=11.2 Hz, 1H), 2.29-2.71 (m, 4H), 1.61-1.83 (m, 4H), 1.28 (s, 3H); $^{13}$C NMR (100 MHz, CDCl$_3$) δ 215.4, 152.9, 149.0, 139.9, 131.7, 127.5, 120.1, 115.8, 115.1, 63.5, 55.8, 47.5, 44.1, 41.1, 36.6, 24.9, 21.7, 21.1; HRMS (CI+) calcd. for C$_{22}$H$_{24}$NO$_2$Br (M+), 413.0990 found 413.0989.

Example 71

6-(Benzylamino)-5-(4-chlorophenyl)-5-methyl-bicyclo[2.2.2]octan-2-one (16d)

The starting aldehyde 15d was prepared in accord with literature procedure. described by Baumann, Vogt; and Bräse in S. *Eur. J. Org. Chem.* 2007, 266-282. Reaction time 3 d, 4° C. Purified by chromatography over silica gel, eluting with 2-6% EtOAc/hexanes, to give the bicycle 16d (61.1 mg, 69%, 94.3:5.7 er, >20:1 dr, colorless oil). Enantiomeric excess was determined by chiral HPLC [4.6×250 mm Daicel OD column, 92:8 Hexanes/1-PrOH, 1.0 mL min$^{-1}$, retention times 11.7 min (major) and 15.4 min (minor)] to be 94.3:5.7 er: [α]$_D^{23}$=+44.8° (c=1.5, CHCl$_3$); IR (neat) 3324, 2943, 1718, 1484, 1451, 1092, 1010, 825, 732, 705 cm$^{-1}$; $^1$H NMR (400 MHz, CDCl$_3$) δ 7.28-7.43 (m, 7H), 7.23 (d, J=8.8 Hz, 2H), 4.09 (d, J=12.8 Hz, 1H), 3.74 (d, J=13.2 Hz, 1H), 3.40 (d, J=2.0 Hz, 1H), 2.62-2.73 (m, 3H), 2.30 (d, J=18.4 Hz, 1H), 1.52-1.89 (m, 5H), 1.18 (s, 3H); $^{13}$C NMR (100 MHz, CDCl$_3$) δ 216.1, 148.8, 139.9, 131.6, 129.1, 128.6, 128.4, 128.3, 127.2, 66.0, 51.3, 46.3, 44.4, 41.1, 37.0, 25.2, 21.6, 21.1; FIRMS (CI+) calcd. for C$_{22}$H$_{24}$NOCl(M+), 353.1546 found 353.1536.

Example 72

6-(Benzylamino)-5-(3,4-dichlorophenyl)-5-methyl-bicyclo[2.2.2]octan-2-one (16e)

Reaction time 5 d, 4° C. Purified by chromatography over silica gel, eluting with 2-20% EtOAc/hexanes, to give the bicycle 16e (51.5 mg, 53%, 95.8:4.2 er, >20:1 dr, colorless oil). Enantiomeric excess was determined by chiral HPLC [4.6×250 mm Daicel OD column, 95:5 Hexanes/1-PrOH, 1.0 mL min$^{-1}$, retention times 15.9 min (major) and 23.2 min (minor)] to be 95.8:4.2 er: [α]$_D^{23}$=+26.4° (c=0.7, CHCl$_3$); IR (neat) 3341, 2949, 1718, 1473, 1457, 1135, 1026, 819, 705 cm$^{-1}$; $^1$H NMR (400 MHz, CDCl$_3$) δ 7.57 (s, 1H), 7.27-7.41 (m, 6H), 7.21 (d, J=8.4 Hz, 1H), 4.07 (d, J=12.8 Hz, 1H), 3.74 (d, J=12.8 Hz, 1H), 3.33 (br s, 1H), 2.59-2.74 (m, 3H), 2.29 (d, J=18.4 Hz, 1H), 1.49-1.90 (m, 6H), 1.18 (s, 3H); $^{13}$C NMR (100 MHz, CDCl$_3$) δ 215.7, 150.7, 139.6, 132.3, 130.1, 129.8, 128.7, 128.5, 128.2, 127.3, 125.2, 65.9, 51.2, 45.9, 44.5, 41.0, 36.9, 25.0, 21.6, 21.1; HRMS (CI+) calcd. for C$_{22}$H$_{23}$NOCl$_2$ (M+), 387.1157 found 387.1152.

Example 73

5-Allyl-5-(4-bromophenyl)-6-(4-methoxyphenylamino)-bicyclo[2.2.2]octan-2-one (16f)

Reaction time 3 d, rt. Purified by chromatography over silica gel, eluting with 2-15% EtOAc/hexanes, to give the bicycle 16f (34.6 mg, 31%, 90.6:9.4 er, >20:1 dr, colorless crystal). Enantiomeric excess was determined by chiral HPLC [4.6×250 mm Daicel AD column, 99:1 Hexanes/1-PrOH, 0.8 mL min$^{-1}$, retention times 60.9 min (major) and 55.7 min (minor)] to be 90.6:9.4 er: Mp: 68-69° C.; [α]$_D^{23}$=+3.4° (c=1.0, CHCl$_3$); IR (neat) 3363, 2949, 1718, 1598, 1506, 1446, 1228, 1043, 863, 814, 727 cm$^{-1}$; $^1$H NMR (400 MHz, CDCl$_3$) δ 7.47 (d, J=8.7 Hz, 2H), 7.41 (d, J=8.7 Hz, 2H), 6.82 (d, J=8.7 Hz, 2H), 6.67 (d, J=9.0 Hz, 2H), 5.31-5.38 (m, 1H), 4.96-5.00 (m, 2H), 4.07 (d, J=12.6 Hz, 1H), 3.84 (s, 3H), 3.62 (d, J=12.6 Hz, 1H), 2.28-2.76 (m, 6H), 1.75-1.90 (m, 4H); $^{13}$C NMR (100 MHz, CDCl$_3$) δ 215.4, 153.2, 146.6, 140.0, 133.4, 131.4, 128.5, 120.3, 118.1, 116.3, 115.2, 65.9, 55.8, 47.8, 46.5, 40.5, 40.4, 32.1, 22.0, 20.8; HRMS (CI+) calcd. for C$_{24}$H$_{26}$NO$_2$Br (M+), 439.1147 found 439.1139.

Example 74

5-Allyl-6-(benzylamino)-5-(4-bromophenyl)-bicyclo[2.2.2]octan-2-one (16 g)

Reaction time 6 d, rt. Purified by chromatography over silica gel, eluting with 2-8% EtOAc/hexanes, to give the bicycle 16g (48.8 mg, 46%, 88.0:12.0 er, >20:1 dr, colorless oil). Enantiomeric excess was determined by chiral HPLC [4.6×250 mm Daicel AS-H column, 96:4 Hexanes/1-PrOH, 1.0 mL min$^{-1}$, retention times 31.8 min (major) and 15.1 min (minor)] to be 88.0:12.0 er: [α]$_D^{23}$=+48.6° (c=1.8, CHCl$_3$); IR (neat) 3327, 2945, 1719, 1486, 1455, 1112, 1007, 910, 863, 735, 700 cm$^{-1}$; $^1$H NMR (400 MHz, CDCl$_3$) δ 7.28-7.43 (m, 9H), 5.27-5.37 (m, 1H), 4.89-4.93 (m, 2H), 4.09 (d, J=12.8 Hz, 1H), 3.71 (d, J=12.8 Hz, 1H), 3.32 (d, J=2.0 Hz, 1H), 2.53-2.71 (m, 4H), 2.22-2.29 (m, 2H), 1.40-1.92 (m, 5H); $^{13}$C NMR (100 MHz, CDCl$_3$) δ 216.1, 147.0, 139.8, 134.1, 130.9, 128.64, 128.59, 128.46, 127.3, 119.9, 117.6, 68.5, 51.7, 47.0, 46.5, 40.44, 40.35, 32.1, 21.8, 20.9; HRMS (CI+) calcd. for C$_{24}$H$_{26}$BrNO (M+), 423.1198 found 423.1217.

Example 75

6-(Allylamino)-5-methyl-5-phenyl-bicyclo[2.2.2]octan-2-one (16h)

Reaction time 3 d, rt. Purified by chromatography over silica gel, eluting with 2-7% EtOAc/hexanes, to give the bicycle 16h (44.6 mg, 66%, 88.8:11.2 er, >20:1 dr, colorless oil). Enantiomeric excess was determined by chiral HPLC [4.6×250 mm Daicel OD column, 98:2 Hexanes/1-PrOH, 0.8 mL min$^d$, retention times 14.5 min (major) and 16.1 min (minor)] to be 88.8:11.2 er: [α]$_D^{23}$=−9.5° (c=1.5, CHCl$_3$); IR (neat) 3330, 2949, 1718, 1440, 1233, 1108, 923, 754, 700 cm$^{-1}$; $^1$H NMR (400 MHz, CDCl$_3$) δ 7.53 (d, J=7.6 Hz, 2H), 7.35 (t, J=7.6 Hz, 2H), 7.23 (t, J=7.2 Hz, 1H), 5.94-6.04 (m, 1H), 5.24 (d, J=17.2 Hz, 1H), 5.14 (d, J=10.0 Hz, 1H), 3.53 (dd, J=13.6, 5.6 Hz, 1H), 3.49 (d, J=1.6 Hz, 1H), 3.25 (dd, J=13.6, 6.0 Hz, 1H), 2.59-2.69 (m, 3H), 2.27 (dd, J=19.6, 2.8 Hz, 1H), 1.40-1.83 (m, 5H), 1.20 (s, 3H); $^{13}$C NMR (100 MHz, CDCl$_3$) δ 216.6, 150.3, 136.9, 128.4, 125.9, 125.7, 116.3, 66.1, 50.1, 46.5, 44.5, 41.2, 37.1, 25.2, 21.6, 21.2; HRMS (CI+) calcd. for C$_{18}$H$_{24}$NO (M+1), 270.1858 found 270.1849.

Example 76

5-Methyl-5-phenyl-6-(propargylamino)-bicyclo[2.2.2]octan-2-one (16i)

Reaction time 3 d, rt. Purified by chromatography over silica gel, eluting with 2-8% EtOAc/hexanes, to give the bicycle 16i (42.2 mg, 63%, 92.8:7.2 er, >20:1 dr, colorless oil). Enantiomeric excess was determined by chiral HPLC [4.6×250 mm Daicel AD column, 98:2 Hexanes/1-PrOH, 1.0 mL min$^d$, retention times 16.3 min (major) and 19.6 min (minor)] to be 86% ee: [α]$_D^{23}$=−29.2° (c=1.4, CHCl$_3$); IR (neat) 2943, 2878, 1718, 1113, 765, 705 cm$^{-1}$; $^1$H NMR (400 MHz, CDCl$_3$) δ 7.55 (d, J=7.6 Hz, 2H), 7.36 (t, J=7.6 Hz, 2H), 7.23 (t, J=7.2 Hz, 1H), 3.81 (d, J=2.0 Hz, 1H), 3.60 (qd, J=17.2, 2.4 Hz, 2H), 2.67-2.71 (m, 2H), 2.57-2.58 (m, 1H), 2.24-2.31 (m, 2H), 1.54-1.83 (m, 5H), 1.20 (s, 3H); $^{13}$C NMR (100 MHz, CDCl$_3$) δ 216.2, 149.9, 128.4, 126.0, 125.8, 81.7, 72.0, 64.1, 46.0, 44.2, 41.1, 37.6, 35.6, 25.6, 21.28, 21.26; HRMS (CI+) calcd. for C$_{18}$H$_{21}$NO (M+), 267.1623 found 267.1621.

Example 77

6-(Benzylamino)-5-(4-isopropylbenzyl)-5-methyl-bicyclo[2.2.2]octan-2-one (18)

Reaction time 7 d, 4° C. Purified by chromatography over silica gel, eluting with 2-10% EtOAc/hexanes, to give the bicycle 18 (36.6 mg, 39%, 88.3:11.7 er, 9:1 dr, colorless oil). Enantiomeric excess was determined by chiral HPLC [4.6× 250 mm Daicel AD column, 99:1 Hexanes/1-PrOH, 1.0 mL min$^{-1}$, retention times 14.0 min (major) and 10.9 min (minor)] to be 88.3:11.7 er: [α]$_D^{23}$=−20.5° (c=2.5, CHCl$_3$); IR (neat) 3341, 2960, 2927, 1713, 1451, 1112, 825, 738, 700 cm$^{-1}$; $^1$H NMR (400 MHz, CDCl$_3$) δ 7.22-7.34 (m, 4H), 7.17 (d, J=8.0 Hz, 2H), 7.10 (d, J=8.0 Hz, 2H), 3.90 (d, J=13.2 Hz, 1H), 3.57 (d, J=13.2 Hz, 1H), 2.92 (p, J=6.8 Hz, 1H) 2.86 (d, J=2.0 Hz, 1H), 2.79 (d, J=13.2 Hz, 1H), 2.72 (d, J=13.2 Hz, 1H), 2.58 (q, J=2.4 Hz, 1H), 2.48 (dt, J=18.8, 3.2 Hz, 1H), 2.23-2.31 (m, 1H), 2.09 (dd, J=18.8, 1.6 Hz, 1H), 1.88-1.93 (m, 3H), 1.64-1.69 (m, 1H), 1.28 (d, J=6.8 Hz, 6H), 0.93 (s, 3H); $^{13}$C NMR (100 MHz, CDCl$_3$) δ 216.8, 146.8, 140.3, 135.6, 130.4, 128.27, 128.23, 126.9, 126.0, 66.9, 51.7, 47.1, 46.0, 41.9, 40.6, 36.8, 33.7, 24.1, 21.9, 20.9, 19.4; HRMS (CI+) calcd. for C$_{26}$H$_{34}$NO (M+1), 376.2640 found 376.2644.

Example 78

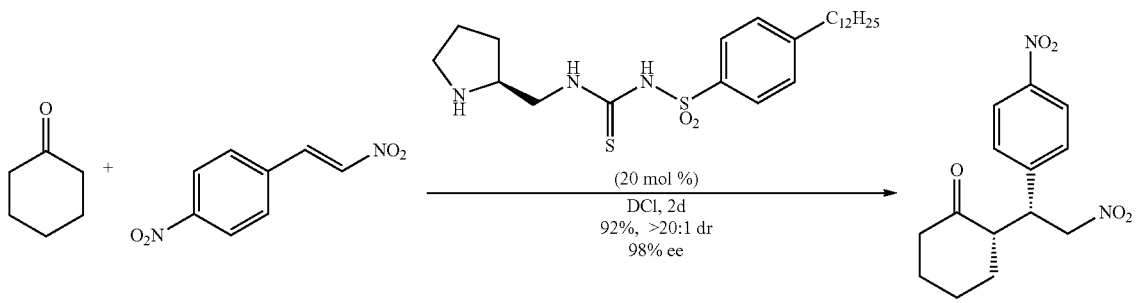

A derivative of the present invention can construct chiral centers via Michael reaction of cyclic ketones and various Michael acceptors. This example illustrates reaction of cyclohexanone with a nitro-aryl Michael acceptor to produce the substituted cyclohexanone.

Example 79

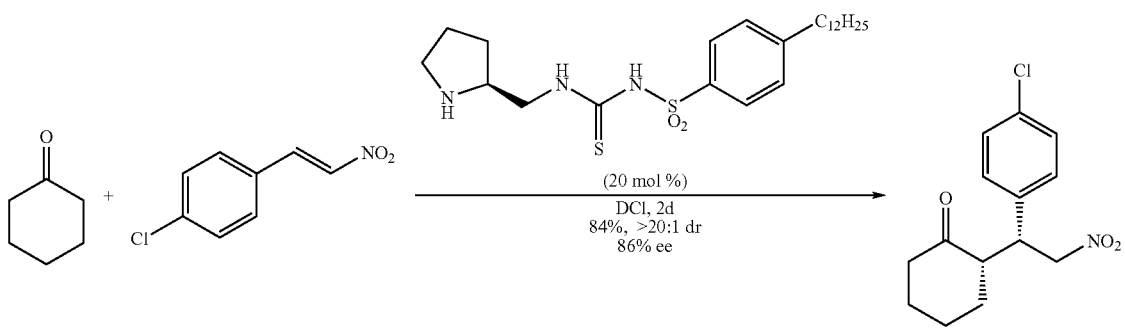

This example illustrates reaction of cyclohexanone with a chlorinated-aryl Michael acceptor to produce the substituted cyclohexanone.

Example 80

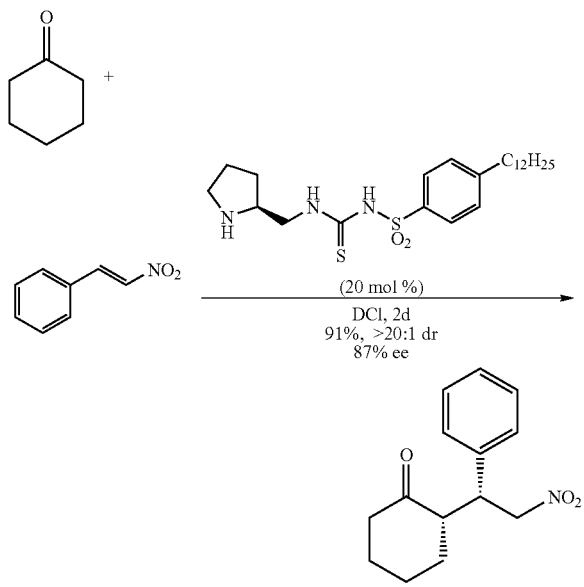

This example illustrates reaction of cyclohexanone with an aryl Michael acceptor to produce the substituted cyclohexanone.

Example 81

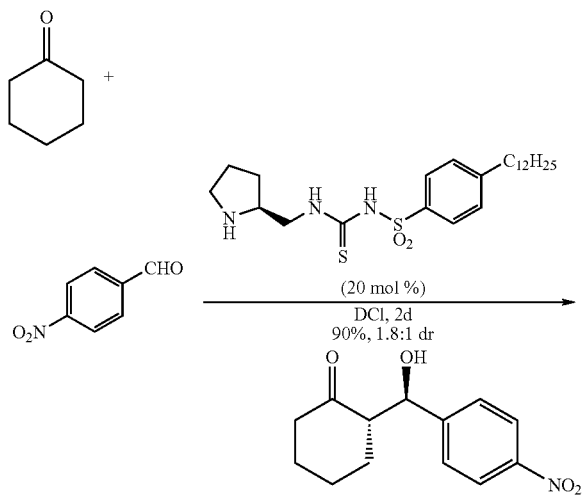

This example illustrates reaction of cyclohexanone with a nitro-substituted benzaldehyde derivative to produce the substituted cyclohexanone.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

19. The catalyst according to claim 5 having a structure
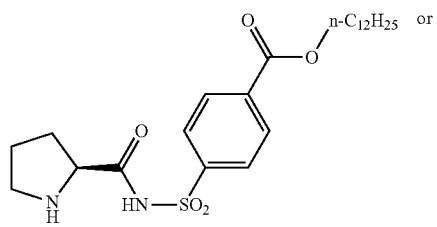 or
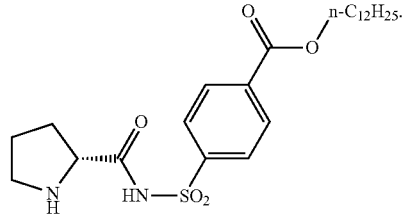

We claim:

1. A catalyst for making compounds having an enantiomeric excess of at least about 70%, the catalyst having a formula

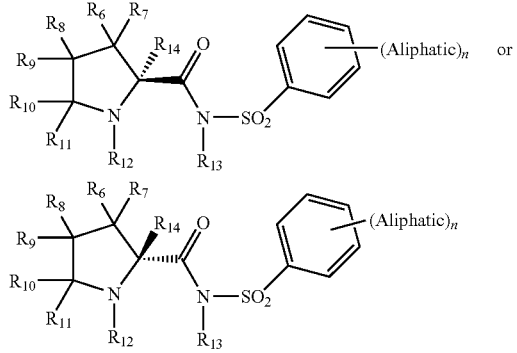

where $R_6$-$R_{11}$ independently are selected from aliphatic, substituted aliphatic, alkoxy, substituted alkoxy, amine, substituted amine, amide, substituted amide, aryl, substituted aryl, aryl alkyl, substituted aryl alkyl, azide, cyclic, substituted cyclic, ester, ether, formyl, halogen, heterocyclic, substituted heterocyclic, heteroaryl, substituted heteroaryl, pyrrolidine, hydrogen, hydroxyl, ketone, substituted ketone, nitro, nitroso, protecting groups, silyl, silyl ether, silyl ester, thiol, thiol ether, thiol ester, or are bonded together to form a ring; $R_{12}$-$R_{14}$ are independently selected from hydrogen and lower alkyl: n is from 1-5; and each of the aliphatic substituents as 4 or more carbon atoms.

2. The catalyst according to claim 1 having formula

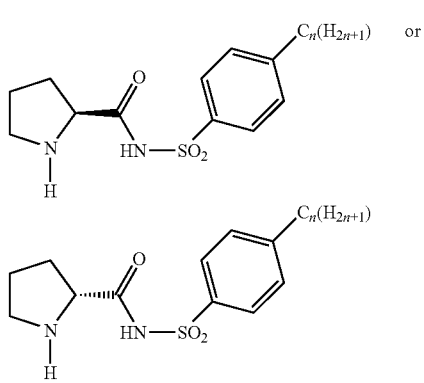

where n is from 8-24.

3. The catalyst according to claim 1 having formula

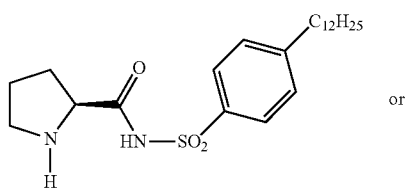

-continued

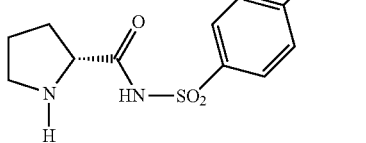

4. A catalyst for making compounds having an enantiomeric excess of at least about 70%, the catalyst having a structure

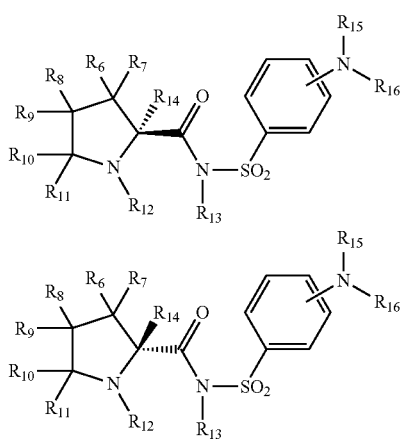

where $R_6$-$R_{11}$ independently are selected from aliphatic, substituted aliphatic, alkoxy, substituted alkoxy, amine, substituted amine, amide, substituted amide, aryl, substituted aryl, aryl alkyl, substituted aryl alkyl, azide, cyclic, substituted cyclic, ester, ether, formyl, halogen, heterocyclic, substituted heterocyclic, heteroaryl, substituted heteroaryl, pyrrolidine, hydrogen, hydroxyl, ketone, substituted ketone, nitro, nitroso, protecting groups, silyl, silyl ether, silyl ester, thiol, thiol ether, thiol ester, or are bonded together to form a ring; $R_{12}$-$R_{14}$ are independently selected from hydrogen and lower alkyl; and $R_{15}$ and $R_{16}$ are alkyl comprising 4 or more carbon atoms.

5. A catalyst for making compounds having an enantiomeric excess of at least about 70%, the catalyst having a structure

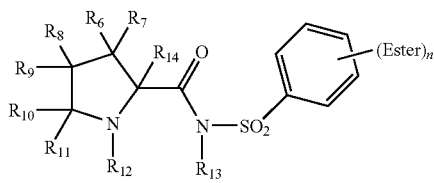

where $R_6$-$R_{11}$ independently are selected from aliphatic, substituted aliphatic, alkoxy, substituted alkoxy, amine, substituted amine, amide, substituted amide, aryl, substituted aryl, aryl alkyl, substituted aryl alkyl, azide, cyclic, substituted cyclic, ester, ether, formyl, halogen, heterocyclic, substituted heterocyclic, heteroaryl, substituted heteroaryl, pyrrolidine, hydrogen, hydroxyl, ketone, substituted ketone, nitro, nitroso, protecting groups, silyl, silyl ether, silyl ester, thiol, thiol ether, thiol ester, or are bonded together to form a ring; $R_{12}$-$R_{14}$ are independently selected from hydrogen and lower alkyl; and n is from 1 to 5.

6. The catalyst according to claim 5 where at least one ester is an alkyl ester having from 4 to 24 carbon atoms.

7. The catalyst according to claim 5 where at least one ester is p-dodecyl ester.

8. A catalyst for making compounds having an enantiomeric excess of at least about 70%, the catalyst having a structure

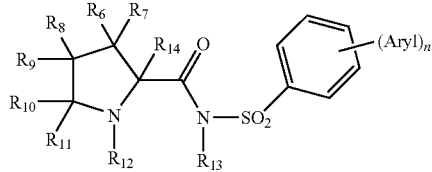

where $R_6$-$R_{11}$ independently are selected from aliphatic, substituted aliphatic, alkoxy, substituted alkoxy, amine, substituted amine, amide, substituted amide, aryl, substituted aryl, aryl alkyl, substituted aryl alkyl, azide, cyclic, substituted cyclic, ester, ether, formyl, halogen, heterocyclic, substituted heterocyclic, heteroaryl, substituted heteroaryl, pyrrolidine, hydrogen, hydroxyl, ketone, substituted ketone, nitro, nitroso, protecting groups, silyl, silyl ether, silyl ester, thiol, thiol ether, thiol ester, or are bonded together to form a ring; $R_{12}$-$R_{14}$ are independently selected from hydrogen and lower alkyl: and n is from 1 to 5.

9. A catalyst for making compounds having an enantiomeric excess of at least about 70%, the catalyst having a structure

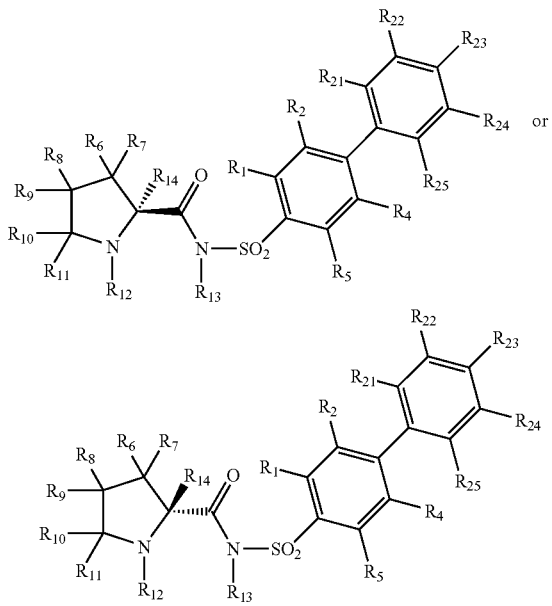

where $R_1$, $R_2$, $R_4$, and $R_5$ independently are selected from aliphatic, substituted aliphatic, alkoxy, substituted alkoxy, amine, substituted amine, amide, substituted amide, aryl, substituted aryl, aryl alkyl, substituted aryl alkyl, cyclic, substituted cyclic, ester, ether, formyl, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, or a polymer support; $R_6$-$R_{11}$ independently are selected from aliphatic, substituted aliphatic, alkoxy, substituted alkoxy, amine, substituted amine, amide, substituted amide, aryl, substituted aryl, aryl alkyl, substituted aryl alkyl, azide, cyclic, substituted cyclic, ester, ether, formyl, halogen, heterocyclic, substituted heterocyclic, heteroaryl, substituted heteroaryl, pyrrolidine, hydrogen, hydroxyl, ketone, substituted ketone, nitro, nitroso, protecting groups, silyl, silyl ether, silyl ester, thiol, thiol ether, thiol ester, or are bonded together to form a ring; $R_{12}$-$R_{14}$ are independently selected from hydrogen and lower alkyl: and $R_{21}$-$R_{25}$ are independently selected from aliphatic, substituted aliphatic, alkoxy, substituted alkoxy, amine, substituted amine, amide, substituted amide, aryl, substituted aryl aryl alkyl, substituted aryl alkyl, cyclic, substituted cyclic, ester, ether, halogen, heterocyclic, substituted heterocyclic, heteroaryl, substituted heteroaryl, hydrogen, hydroxyl, ketone, substituted ketone, nitro, nitroso, silyl, or are bonded together to form a ring.

10. A catalyst for making compounds having an enantiomeric excess of at least about 70%, the catalyst having a structure

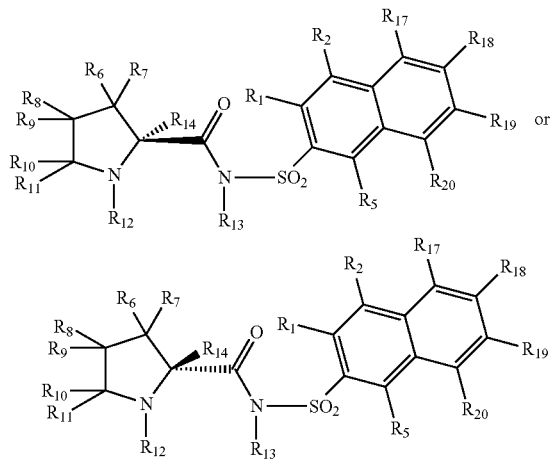

where $R_1$, $R_2$, and $R_5$ independently are selected from aliphatic, substituted aliphatic, alkoxy, substituted alkoxy, amine, substituted amine, amide, substituted amide, aryl, substituted aryl, aryl alkyl, substituted aryl alkyl, cyclic, substituted cyclic, ester, ether, formyl, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, or a polymer support; $R_6$-$R_{11}$ independently are selected from aliphatic, substituted aliphatic, alkoxy, substituted alkoxy, amine, substituted amine, amide, substituted amide, aryl, substituted aryl, aryl alkyl, substituted aryl alkyl, azide, cyclic, substituted cyclic, ester, ether, formyl, halogen, heterocyclic, substituted heterocyclic, heteroaryl, substituted heteroaryl, pyrrolidine, hydrogen, hydroxyl, ketone, substituted ketone, nitro, nitroso, protecting groups, silyl, silyl ether, silyl ester, thiol, thiol ether, thiol ester, or are bonded together to form a ring; $R_{12}$-$R_{14}$ are independently selected from hydrogen and lower alkyl: $R_{17}$-$R_{20}$ are independently selected from aliphatic, substituted aliphatic, alkoxy, substituted alkoxy, amine, substituted amine, amide, substituted amide, aryl, substituted aryl, aryl alkyl, cyclic, substituted cyclic, ester, halogen, heterocyclic, substituted heterocyclic, heteroaryl, substituted heteroaryl, hydrogen, hydroxyl, ketone, nitro, nitroso, or are bonded together to form a ring; and where at least one of $R_1$, $R_2$, $R_5$-$R_{14}$, and $R_{17}$-$R_{20}$ is other than hydrogen.

11. The catalyst according to claim 10 where $R_1$-$R_2$, $R_5$ and $R_{17}$-$R_{20}$ independently are alkyl, hydrogen or halogen.

12. A catalyst for making compounds having an enantiomeric excess of at least about 70%, the catalyst having a structure

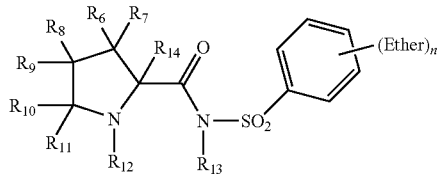

where $R_6$-$R_{11}$ independently are selected from aliphatic, substituted aliphatic, alkoxy, substituted alkoxy, amine, substituted amine, amide, substituted amide, aryl, substituted aryl, aryl alkyl, substituted aryl alkyl, azide, cyclic, substituted cyclic, ester, ether, formyl, halogen, heterocyclic, substituted heterocyclic, heteroaryl, substituted heteroaryl, pyrrolidine, hydrogen, hydroxyl, ketone, substituted ketone, nitro, nitroso, protecting groups, silyl, silyl ether, silyl ester, thiol, thiol ether, thiol ester, or are bonded together to form a ring; $R_{12}$-$R_{14}$ are independently selected from hydrogen and lower alkyl: n is from 1 to 5; and at least one ether functional group comprises 4 or more carbon atoms and is aliphatic, substituted aliphatic, aryl, substituted aryl, aryl alkyl, substituted aryl alkyl, cyclic, substituted cyclic, heterocyclic or substituted hetereocyclic.

13. A catalyst for making compounds having an enantiomeric excess of at least about 70%, the catalyst having a structure

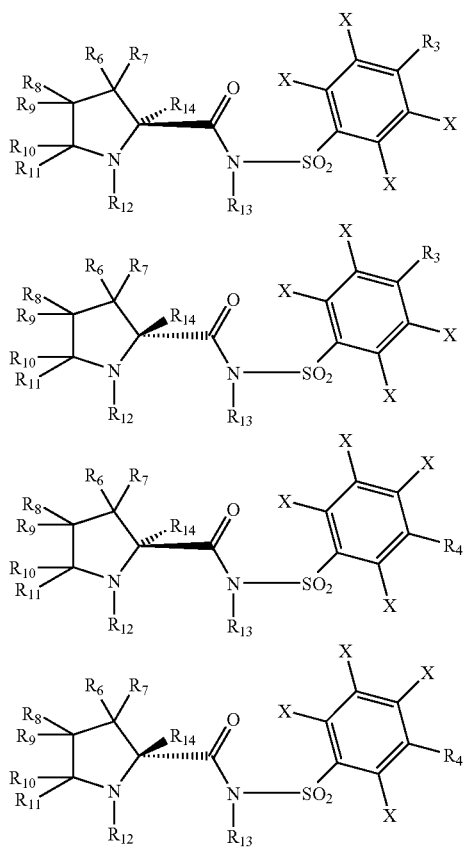

-continued

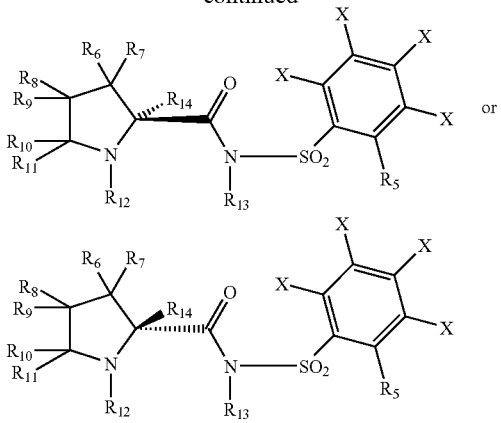

where $R_6$-$R_{11}$ independently are selected from aliphatic, substituted aliphatic, alkoxy, substituted alkoxy, amine, substituted amine, amide, substituted amide, aryl, substituted aryl, aryl alkyl, substituted aryl alkyl, azide, cyclic, substituted cyclic, ester, ether, formyl, halogen, heterocyclic, substituted heterocyclic, heteroaryl, substituted heteroaryl, pyrrolidine, hydrogen, hydroxyl, ketone, substituted ketone, nitro, nitroso, protecting groups, silyl, silyl ether, silyl ester, thiol, thiol ether, thiol ester, or are bonded together to form a ring; $R_{12}$-$R_{14}$ are independently selected from hydrogen and lower alkyl: X is a halogen; and $R_3$-$R_5$ are selected from aliphatic, substituted aliphatic, alkoxy, substituted alkoxy, amine substituted amine, amide, substituted amide, aryl, substituted aryl, aryl alkyl, substituted aryl alkyl, cyclic, substituted cyclic, ester, ether, halogen, heterocyclic, substituted heterocyclic, heteroaryl, substituted heteroaryl, hydrogen, hydroxyl, ketone, substituted ketone, nitro, nitroso, or silyl.

14. A catalyst for making compounds having an enantiomeric excess of at least about 70%, the catalyst having a structure

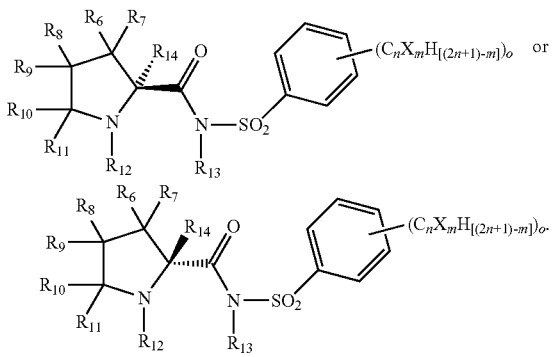

15. A catalyst for making compounds having an enantiomeric excess of at least about 70%, the catalyst having a structure

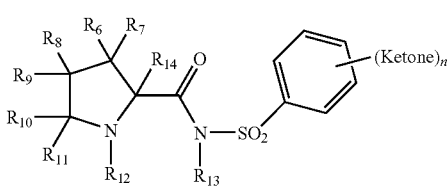

where $R_6$-$R_{11}$ independently are selected from aliphatic, substituted aliphatic, alkoxy, substituted alkoxy, amine, substituted amine, amide, substituted amide, aryl, substituted aryl, aryl alkyl, substituted aryl alkyl, azide, cyclic, substituted cyclic, ester, ether, formyl, halogen, heterocyclic, substituted heterocyclic, heteroaryl, substituted heteroaryl, pyrrolidine, hydrogen, hydroxyl, ketone, substituted ketone, nitro, nitroso, protecting groups, silyl, silyl ether, silyl ester, thiol, thiol ether, thiol ester, or are bonded together to form a ring; $R_{12}$-$R_{14}$ are independently selected from hydrogen and lower alkyl; n is from 1 to 5; and at least one ketone has 4 or more carbon atoms.

16. The catalyst according to claim 1 having a formula

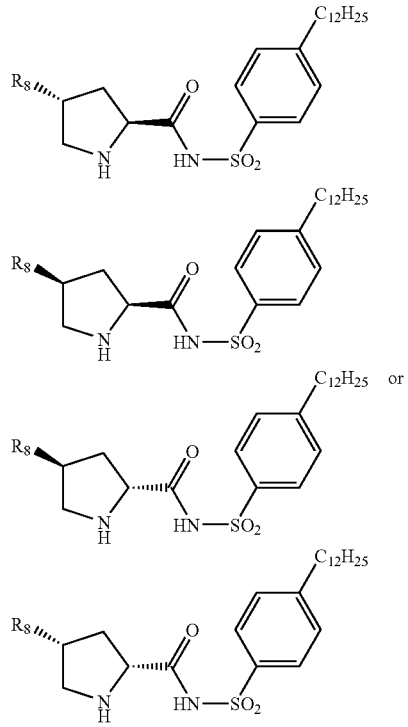

where $R_8$ is selected from aliphatic, substituted aliphatic, alkoxy, substituted alkoxy, amine, substituted amine, amide, substituted amide, aryl, substituted aryl, aryl alkyl, substituted aryl alkyl, azide, cyclic, substituted cyclic, ester, ether, formyl, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, or is an atom in a ring.

17. A catalyst for making compounds having an enantiomeric excess of at least about 70%, the catalyst having a formula

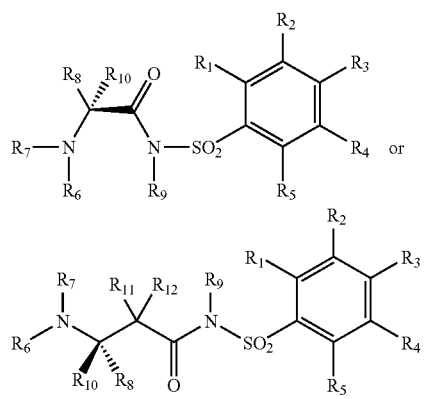

where $R_1$-$R_5$ are independently selected from aliphatic, substituted aliphatic, alkoxy, substituted alkoxy, amine, substituted amine, amide, substituted amide, aryl, substituted aryl, aryl alkyl, substituted aryl alkyl, cyclic, substituted cyclic, ester, ether, formyl, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, or are bonded together to form a ring; at least one of such substitutes comprise 4 or more carbon atoms, at least one of $R_1$ and $R_5$ is hydrogen or halogen, and if $R_1$-$R_5$ is aryl, the aryl group is directly bonded to a carbon atom bearing one of $R_1$-$R_5$; $R_6$-$R_7$ independently are selected from aliphatic and hydrogen; $R_8$ is selected from substitutes defining naturally occurring amino acids; $R_9$-$R_{10}$ are independently aliphatic, or hydrogen; and $R_{11}$ and $R_{12}$ are independently selected from alphatic, substituted alphatic, alkoxy, substituted alkoxy, amine, substituted amine, amide, substituted amide, aryl, substituted aryl, aryl alkyl, substituted aryl alkyl, cyclic, substituted cyclic, ester, ether, formyl, halogen, heterocyclic, substituted heterocyclic, heteroaryl, substituted heteroaryl, hydrogen, hydroxyl, ketone, substituted ketone, nitro, nitroso, protecting groups, silyl, silyl ether, silyl ester, thiol, thiol ether, thiol ester, or are atoms in a ring.

18. The catalyst according to claim 17 having a formula

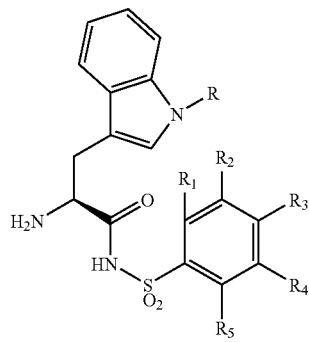

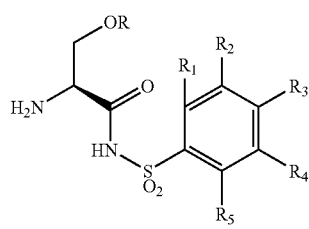

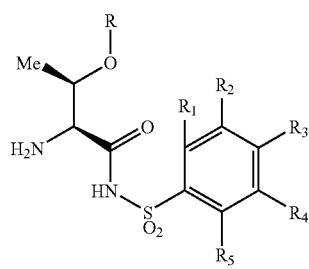

-continued

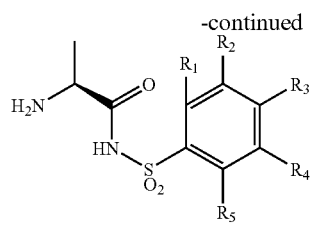

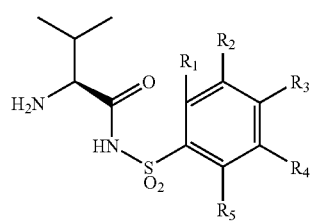

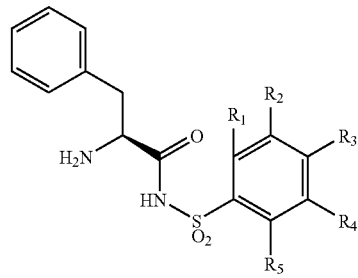

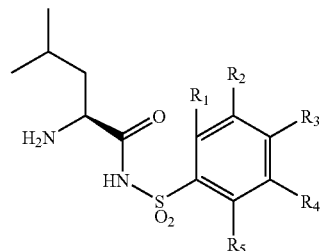

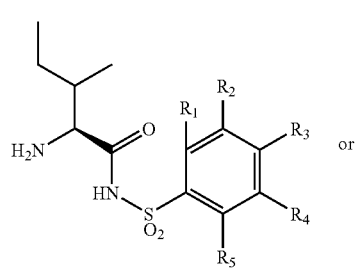

or

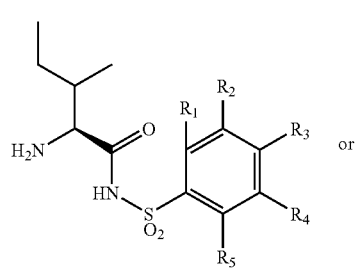

where each R is selected from hydrogen, lower alkyl, carbamate, acyl, or silyl.